United States Patent [19]
Crabbe et al.

[11] 3,879,438
[45] Apr. 22, 1975

[54] 4,5,13-PROSTATRIENOIC ACID DERIVATIVES

[75] Inventors: Pierre Crabbe, Grenoble, France; John H. Fried, Palo Alto, Calif.

[73] Assignee: Syntex (U.S.A.), Inc., Palo Alto, Calif.

[22] Filed: June 11, 1973

[21] Appl. No.: 368,983

Related U.S. Application Data

[63] Continuation-in-part of Ser. No. 338,325, March 5, 1973, abandoned, which is a continuation-in-part of Ser. No. 306,414, Nov. 14, 1972, abandoned, which is a continuation-in-part of Ser. No. 204,769, Dec. 3, 1971, abandoned.

[52] U.S. Cl..... 260/468 D; 260/240 R; 260/243.05; 260/345.7; 260/345.8; 260/347.3; 260/347.4; 260/410; 260/448 R; 260/448.8 R; 260/468 R; 260/468 G; 260/469; 260/473 G; 260/471 R; 260/484 R; 260/485 L; 260/486 R; 260/487; 260/488 R; 260/501.1; 260/501.11; 260/501.17; 260/514 D; 424/305; 424/317

[51] Int. Cl........................ C07c 61/36; C07c 69/74

[58] Field of Search.......................... 260/468 D, 514

[56] References Cited
UNITED STATES PATENTS
3,728,382  4/1973  Bundy.................................. 260/514

OTHER PUBLICATIONS
Crabbe et al., Chem. Comm. 904, (1972).

*Primary Examiner*—Robert Gerstl
*Attorney, Agent, or Firm*—Gerard A. Blaufarb; Leon Simon; William B. Walker

[57] ABSTRACT

Novel prostaglandin dehydro analogs of the PGE$_2$ and PGF$_{2\alpha}$ series possessing diethylenic unsaturation in the carboxylic acid chain which may be further substituted at C-4, C-6 and/or C-15 by a methyl, ethyl or propyl group, the C-20 nor- or bisnor- derivatives, and certain C-20 alkyl derivatives thereof, processes for the production of such compounds and novel and useful intermediates obtained thereby. Also included are the pharmaceutically acceptable, non toxic esters and salts of the carboxylic acid function and the pharmaceutically acceptable, non toxic esters and/or ethers of the secondary hydroxyl groups. These compounds possess prostaglandin-like activities and thus are useful in the treatment of mammals, where prostaglandins are indicated.

86 Claims, No Drawings

4,5,13-PROSTATRIENOIC ACID DERIVATIVES

CROSS REFERENCE TO RELATED APPLICATIONS

This application is a continuation-in-part of our application Ser. No. 338,325, filed Mar. 5, 1973 which in turn is a continuation-in-part of application Ser. No. 306,414, filed Nov. 14, 1972, a continuation-in-part of application Ser. No. 204,769, filed Dec. 3, 1971, all now abandoned and the above applications are herewith incorporated by reference and made a part hereof.

DESCRIPTION OF THE INVENTION

The present invention relates to certain novel prostaglandin derivatives, to a process for the production thereof and to certain novel intermediates obtained by this process.

More particularly, the present invention relates to prosta-4,5,13-trans-trienoic acid derivatives having oxygenated functions at C–9 and C–15 or at C–9, C–11 and C–15 positions of the molecule, which may be further substituted at C–4, C–6 and/or C–15 by a methyl, ethyl or propyl group, to the C–20 nor- and bisnor-derivatives thereof or the C–20-alkyl derivatives thereof, the alkyl group being of a straight chain and containing from 1 to 5 carbon atoms inclusive. Also encompassed are the corresponding pharmaceutically acceptable, non-toxic esters, ethers and salts.

Prostaglandins are members of a new hormonal system with a remarkable range of biological and pharmaceutical properties. These compounds belong to a group of chemically related 20-carbon chain hydroxy fatty acids containing a five membered ring in the structure and different degrees of unsaturation, a number of which have been reported in the literature. For a review on prostaglandins and the definition of primary prostaglandins, see for example S. Bergstrom, *Recent Progress in Hormone Research*, 22, pp. 153–175 (1966) and *Science*, 157, page 382, (1967) by the same author.

Prostaglandins are widely distributed in mammalian tissues and have been isolated from natural sources in very small amounts. In addition, a number of the naturally occurring prostaglandins have been prepared by chemical synthesis; note for example, *J. Am. Chem. Soc.*, 91, page 5,675, (1969); *J. Am. Chem. Soc.* 92, page 2,586, (1970) and *J. Am. Chem. Soc.*, 93, pages 1,489–1,493, (1971) and references cited therein, W. P. Schneider, et al., *J. Am. Chem. Soc.*, 90, page 5,895, (1968); U. Axen, et al., *Chem. Commun.*, page 303, (1969) and W. P. Schneider, *Chem. Commun.*, page 304, (1969).

Because of the remarkable range of biological and pharmacological properties exhibited by this family of compounds a great deal of interest has focused upon such compounds, and the preparation of analogs of such compounds; accordingly, we have discovered processes and intermediates for preparing modified prostaglandins and derivatives thereof.

The novel prostaglandin derivatives of the present invention can be represented by the following formulas:

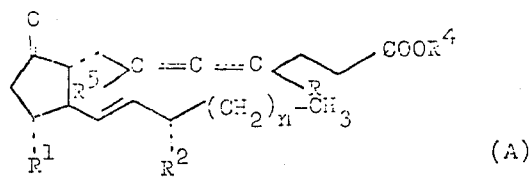

(A)

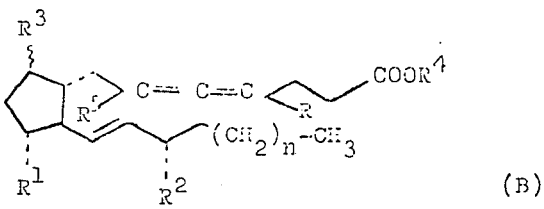

(B)

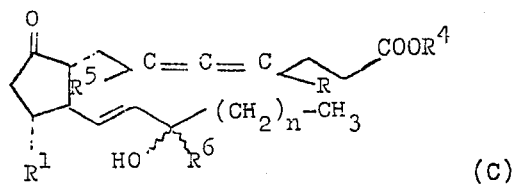

(C)

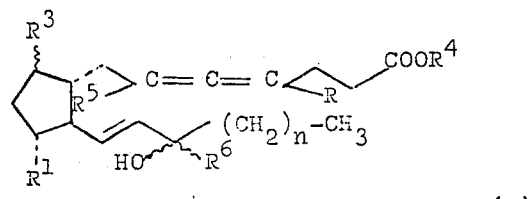

(D)

wherein each of R and $R^5$ represents hydrogen, methyl, ethyl or propyl;

$R^1$ represents hydrogen, hydroxy or a conventionally hydrolyzable ester or ether thereof;

each of $R^2$ and $R^3$ represents hydroxy or a conventionally hydrolyzable ester or ether thereof;

$R^6$ represents methyl, ethyl or propyl, $R^4$ represents hydrogen, a lower alkyl group of 1 to 3 carbon atoms or the pharmaceutically acceptable, nontoxic salts of compounds in which $R^4$ is hydrogen and $n$ is an integer of from 2 to 9;

provided that when $R^6$ is $\alpha$, the hydroxyl group, attached to the same carbon atom as $R^6$, is $\beta$; and when $R^6$ is $\beta$, the hydroxyl group, attached to the same carbon atom as $R^6$, is $\alpha$.

The dotted lines shown in the above formulas and in the formulas below indicate that the substituents are in $\alpha$ configuration, i.e., below the plane of the cyclopentane ring.

The wavy lines ($\{$) indicate the $\alpha$ or $\beta$ configuration, or mixtures thereof.

The double bond at C–13 in the compounds of the present invention has the same configuration as in natural prostaglandin of the $PGE_1$, $PGE_2$, $PGF_{1\alpha}$ or $PGF_{2\alpha}$ series, that is, the trans configuration.

The preferred meaning of $n$ is 4, i.e., the preferred compounds of the invention are those having the usual C–20 carbon unit structure of natural prostaglandins.

These novel compounds possess asymmetric centers and thus can be produced as racemic mixtures. The racemic mixtures can be resolved if desired, at appropriate stages by methods known to those skilled in the art, to obtain the respective individual antimers. It is to be understood that the individual 8R-antimers as well as mixtures of both antimers are encompassed within the scope of the present invention.

Thus, compounds of formula (A) are mixtuures in equal proportions of the compounds of the indicated structure and its mirror image represented by the formula:

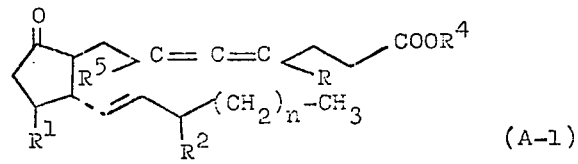

(A-1)

Compounds of formula (B) are mixtures in equal proportions of compounds of formulas:

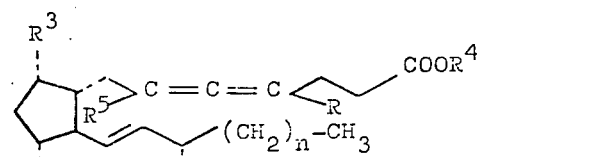

(B-1)

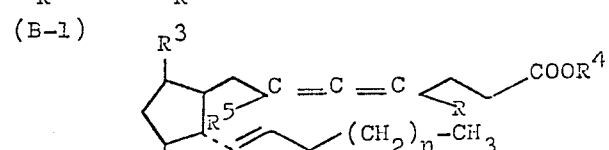

(B-2)

or mixtures in equal proportions of compounds of formulas:

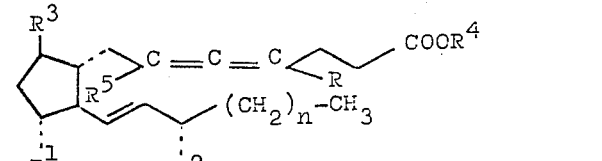

(B-3)

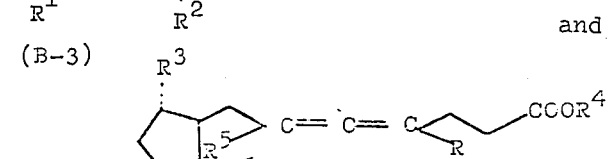

(B-4)

Compounds of formula (C) are mixtures in equal proportions of compounds of formulas:

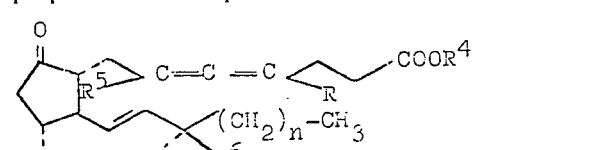

(C-1)

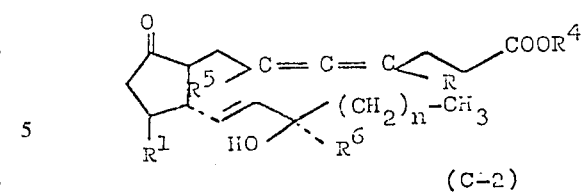

(C-2)

or mixtures in equal proportions of compounds of formulas:

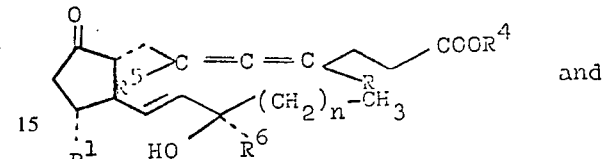

and (C-3)

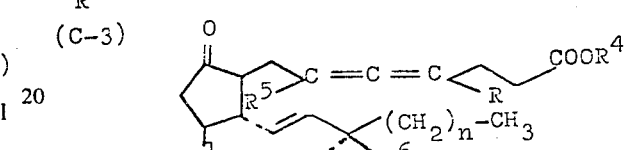

(C-4)

and compounds of formula (D) are mixtures in equal proportions of compounds of formulas:

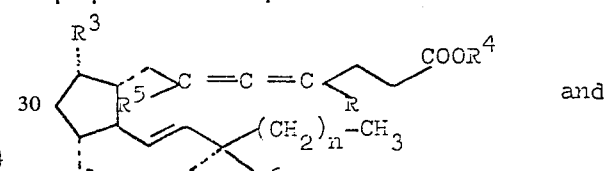

and (D-1)

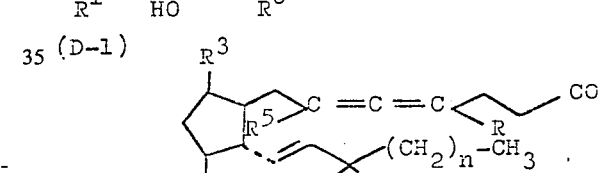

(D-2)

or mixtures in equal proportions of formulas:

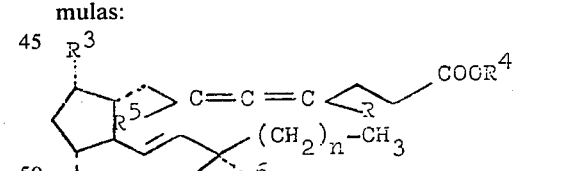

and (D-3)

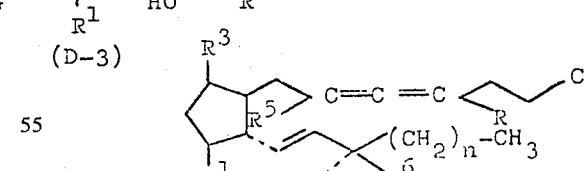

(D-4)

or mixtures in equal proportions of compounds of formulas:

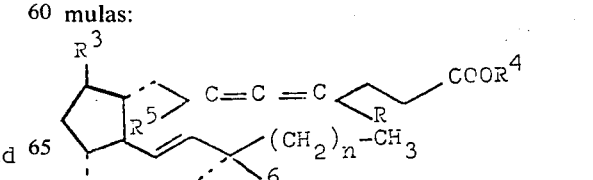

and (D-5)

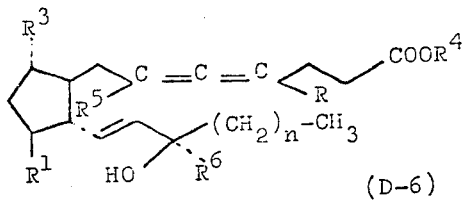

(D-6)

or mixtures in equal proportions of compounds of formulas:

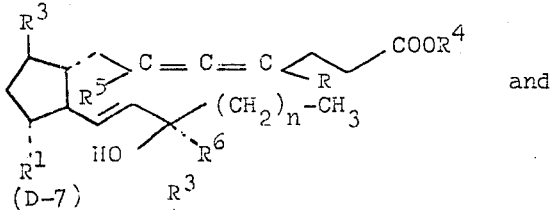

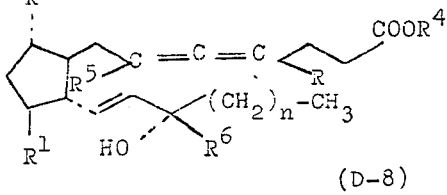

(D-8)

When the compounds of the present invention are racemic mixtures, they are produced starting from racemates, while when the compounds of the invention are individual antimers the compounds are preferably obtained starting from the appropriate individual antimer.

For the sake of simplicity only one antimer of each pair will be depicted in the description of the process and Claims; however, it is to be understood that the mirror images for the racemic mixtures and the individual antimers are also encompassed thereby.

The use of the symbol "R" preceding a substituent designates the absolute stereochemistry of that substituent according to the Cahn-Ingold-Prelog rules [see Cahn, et al., Angew. Chem. Inter. Edit., Vol. 5, p. 385, (1966), errata p. 511; Cahn, et al., Angew. Chem., Vol. 78, p. 413, (1966); Cahn and Ingold, J. Chem. Soc. (London), 1951, p. 612; Cahn, et al., Experientia, Vol. 12, p. 81, (1956); Cahn. J. Chem. Educ., Vol 41, p. 116, (1964)]. Because of the interrelation of the designated substituent with the other substituents in the compound having α or β prefixes, the designation of the absolute configuration of one substituent fixes the absolute configuration of all substituents in the compound and thus the absolute configuration of the compound as a whole.

The term "conventionally hydrolyzable esters or ethers," as used herein, refers to those physiologically acceptable hydrolyzable ester and ether groups employed in the pharmaceutical art which do not significantly adversely affect the pharmaceutical properties of the parent compound. The conventionally hydrolyzable esters are derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic, can be of straight chain, branched chain, or cyclic structure, and preferably contain from one to 12 carbon atoms. In addition, they can be substituted by functional groups, for example, hydroxy, alkoxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitro-benzoate, aminoacetate, diethylaminoacetate, piperidinoacetate, β-chloropropionate, trichloroacetate, β-chlorobutyrate, bicyclo-[2.2.2]-octane-1-carboxylate, 4-methyl-bicyclo-[2.2.2]-oct-2-ene-1-carboxylate, and the like. The preferred conventional hydrolyzable ester is acetate.

"Conventional hydrolyzable ethers" include the tetrahydrofuran-2-yl, tetrahydropyran-2-yl and 4-methoxytetrahydropyran-4-yl ethers.

The addition salts are derived from pharmaceutically acceptable basic salts, including metal salts such as sodium, potassium, calcium, magnesium, aluminum and the like, as well as organic amine salts such as ammonium, triethylamine, 2-dimethylamino ethanol, 2-diethylamino ethanol, lysine, arginine, caffeine, procaine, N-ethylpiperidine, hydrabamine and the like. The term "pharmaceutically acceptable" refers to salts which do not significantly adversely affect the properties of the parent compound.

The novel prostaglandin derivatives of the present invention except those which are further substituted at C-15 by a methyl, ethyl or propyl group can be obtained by a process illustrated by the following sequence of reactions:

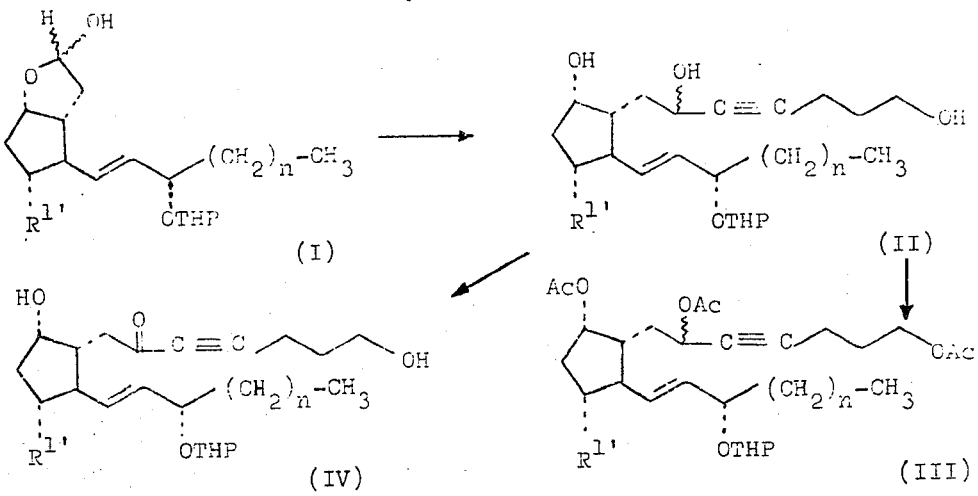

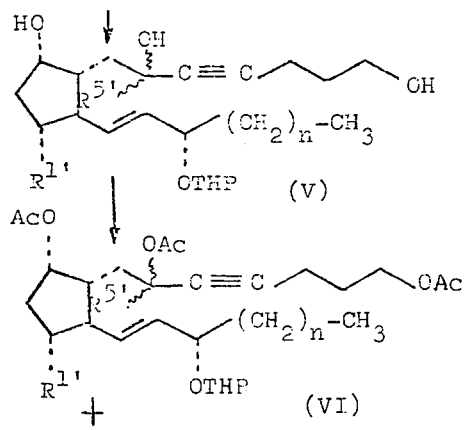
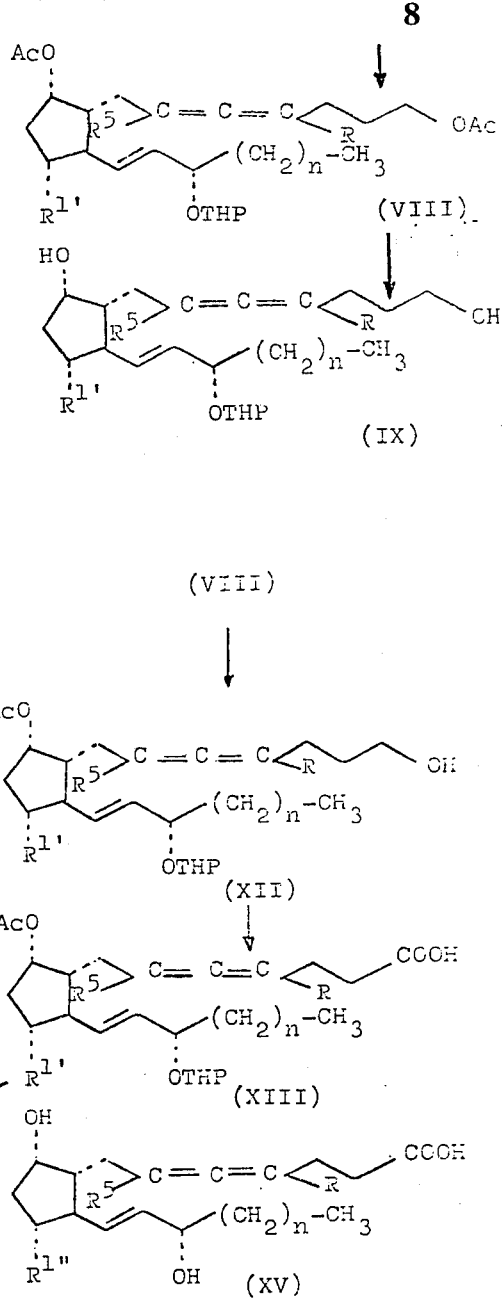

wherein R, $R^5$ and n have the above-indicated meaning;
$R^{1\prime}$ is hydrogen or tetrahydropyranyloxy;
$R^{1\prime\prime\prime}$ is hydrogen or hydroxy;
$R^{5\prime}$ is methyl, ethyl or propyl;
Ac is a lower acyl group containing from 1 to 4 carbon atoms, particularly acetyl and THP is tetrahydropyranyl.

In practicing the above illustrated process the starting materials of formula I (racemates or individual antimers) are treated with an excess of the dilithium salt of pent-4-yn-1-ol, in a suitable inert organic solvent to produce the corresponding trihydroxyacetylenic compound of formula II.

The dilithium salt of pent-4-yn-1-ol reagent is used in amounts comprised between about 5 to about 15 molar equivalents per molar equivalent of starting hemiacetal, using preferably about 10 molar equivalents. This reagent is prepared by reaction of pent-4-yn-1-ol and methyllithium in ether solution, at a temperature of about −78° to −50°C., under an inert atmosphere, such as provided by nitrogen or argon, for a period of between 15 to 24 hours, preferably for about 18 hours. The reagent thus prepared is combined with a solution of the hemiacetal of formula I in an ethereal solvent, maintaining the reaction mixture at a temperature comprised between 10° to 30°C for about 4 to 10 hours, the reaction time depending upon the temperature used. In the preferred embodiments the reaction is conducted at room temperature (about 25°C.) for approximately 6 hours.

Suitable solvents for this reaction are dimethyl ether, diethyl ether, dipropyl ether, dimethoxyethane and the like, particularly diethyl ether.

The product is isolated by dilution with water, extraction with an organic solvent immiscible with water and evaporation of the solvent under reduced pressure, taking care that the temperature does not exceed 20°C. The trihydroxylated compound is purified by column chromatography to separate it from the undesired nonpolar by-products. There is obtained a mixture of the 6α and 6β-hydroxy isomers, which can be separated into the individual isomers by thin layer chromatographic techniques, if desired.

The compound of formula II is then esterified under conventional conditions, i.e., using a carboxylic acid chloride or carboxylic acid anhydride in pyridine solution to produce the corresponding triester, the compounds of formula III. The preferred esterifying agent is acetyl chloride, conducting the reaction at room temperature for about 6 hours. In the case of using a carboxylic anhydride, e.g., acetic anhydride, the esterification is slower, requiring reaction times of the order of 12 to 18 hours or higher temperatures to obtain complete esterification.

Upon selective oxidation of the trihydroxyacetylenic compound of formula II with manganese dioxide or 2,-3-dichloro-5,6-dicyano-1,4-benzoquinone in a suitable inert organic solvent, e.g., chloroform or tetrahydrofuran, there is produced the corresponding dihydroxy-keto-acetylenic compound of formula IV. This reaction is conducted at room temperature for a period of time of about 4 to 6 hours under vigorous stirring, using a large excess of the oxidizing agent. The oxidizing agent is then separated by filtration and the reaction product isolated by conventional techniques, such as evaporation of the solvent and purification of the residue by thin layer chromatography.

The compounds of formula IV are converted into the corresponding 6-alkylated derivatives of formula V by reaction with methyl-, ethyl-, or propyllithium or the corresponding alkylmagnesium halides. The reaction is effected at a temperature in the range of 10° to 30°C., preferably at room temperature using an excess of about 2 to 10 molar equivalents of the alkylating agent per mole of starting material, and preferably about 4 molar equivalents, in a suitable inert organic solvent, using particularly ethereal solvents such as diethyl ether, tetrahydrofuran and the like, for a period of time of about 30 minutes to 2 hours, depending upon the temperature used. The course of the reaction can be followed by t.l.c. The product is isolated from the reaction mixture by conventional means, such as dilution with water, extraction with an organic solvent immiscible with water and evaporation of the solvent under vacuo, at low temperature, followed by purification by thin layer chromatography, obtaining a mixture of the 6α-hydroxy-6β-alkyl- and 6β-hydroxy-6α-alkyl compounds of formula V.

The compounds of formula V are then esterified via formation of the lithium salts, followed by reaction with a carboxylic acid chloride in pyridine solution, to produce the corresponding triester of formula VI, in mixture with the diesterified compound of formula VII, which are separated by chromatographic techniques. Thus, the compounds of formula V are allowed to react at room temperature with at least 3 molar equivalents of methyllithium in diethyl ether solution, for a period of time of the order of 1 to 5 hours, preferably for about 3 hours, after which time there is added an excess of the acyl chloride, using particularly acetyl chloride and pyridine, maintaining the reaction mixture at room temperature for several hours to effect esterification, preferably for about 12 to 18 hours. The esterified products are then isolated from the reaction mixture in a conventional manner, preferably by dilution with water, extraction with a solvent immiscible with water, evaporation and separation of the triesterified and diesterified compounds of formulas VI and VII respectively, by chromatography.

The allenic compounds of formula VIII, substituted or unsubstituted at C-4 and unsubstituted at C-6 (VIII, R = H, Me, Et or Pr and $R^5$ = H) can be obtained by reaction of a triacyloxy acetylenic compound of formula III with a lithium dialkylcopper reagent. The reaction is conducted under an inert atmosphere, i.e., under argon or nitrogen atmosphere in an ether solvent. The dialkylcopper reagents used are those wherein the alkyl moieties are the same, each alkyl group containing from 1 to 3 carbon atoms, e.g., lithium dimethylcopper, lithium diethylcopper, and lithium dipropylcopper, particularly lithium dimethylcopper. These reagents can be prepared by reaction of cuprous iodide with an alkyllithium in diethyl ether as solvent, as described for example by P. Rona et al., in *J. Am. Chem. Soc.* 91, 3289 (1969).

In this transformation, the reaction conditions and the amount of the lithium dialkylcopper used determine the product obtained. Thus, when the reaction is conducted at very low temperatures, i.e., at temperatures of the order of −50° to −78°C for about 3 to 7 hours, using four molar equivalents of the dialkylcopper reagent, employing especially lithium dimethylcopper as reagent, there is obtained the allenic compound unsubstituted at C-4 and C-6 (VIII, R and $R^5$ = H). The reaction can be followed by t.l.c.; at temperatures of about −70°C the reaction is complete within about 5 hours. When the reaction is effected at about 0°C. for the same reaction time, but using only about one molar equivalent of the organocopper reagent there are obtained the 4-alkyl substituted allenes (VIII, R = Me, Et, Pr; $R^5$ = H) in which the alkyl group corresponds to the alkyl group of the reagent.

In any case, the allenic compounds are isolated from the reaction mixture via conventional techniques, such as dilution with ammonium chloride solution, extraction, evaporation of the solvent and purification by chromatography, avoiding temperatures higher than room temperature.

When the above described reactions and a lithium dialkylcopper are effected upon the 6-alkyl-triesters of formula VI, there are obtained the corresponding 6-alkyl or 4,6-dialkyl allenes of formula VIII (R = H, Me, Et, Pr; $R^5$ = Me, Et, Pr), the 6-monoalkylated compounds being obtained when the reaction is conducted using about 4 molar equivalents of dimethylcopper as reagent, at about −70°C, and the dialkyl derivatives when there is used about 1 molar equivalent of the organocopper reagent, at about 0°C, as described hereinbefore for the 6-unsubstituted compounds.

The acyloxy groups in any of the allenic compounds represented by formula VIII are then hydrolyzed under alkaline conditions, using a dilute solution of an alkali metal hydroxide or alkali metal carbonate in a lower aliphatic alcohol, at room temperature or below for a period of time sufficient to complete the reaction, ranging from about 12 to about 24 hours. The preferred reagent used is anhydrous (calcinated) potassium carbonate using methanol as solvent, for a period of time of about 6 to 18 hours, thus obtaining the corresponding dihydroxy compound of formula IX.

Upon oxidation of a dihydroxy compound of formula IX with chromium trioxide, using particularly the stoichiometric amount of an 8N solution of chromic acid in acetone solution in the presence of sulfuric acid (Jones' reagent) there is produced the corresponding keto acid derivative of formula X, whose tetrahydropyranyloxy groups are hydrolyzed under mild acidic conditions, to yield the prostatrienoic acid compounds of formula XI, e.g., racemic or individual antimer 9-keto-11α,15α-dihydroxyprosta-4,5,13-trans-trienoic acid and 9-keto-15α-hydroxyprosta-4,5,13-trans-trienoic acid, the 4 or 6-methyl, ethyl or propyl- and 4,6-dialkyl derivatives thereof, in which the alkyl groups can be alike or different, as well as the C-20 nor or bisnor compounds or the C-20 alkylated derivatives thereof. This hydrolysis is carried out using a weak acid such as acetic acid, oxalic acid, tartaric acid, and the like, in the presence of water. Conveniently, the crude compound of formula X is dissolved in an organic solvent miscible with water, e.g., tetrahydrofuran, dioxane and the like before addition of the acid reagent. The reaction is conducted at a temperature comprised between 20° to 50°C, for a period of time of about 4 to 18 hours, depending upon the temperature used. The preferred reagent is aqueous acetic acid, at concentrations of 40 to 80 percent. It is particularly convenient to use a 65:35 acetic acid-water mixture; however, other concentrations are also practical.

By reaction of the diacyloxy allenic compounds of formula VIII with 1.1 molar equivalents of anhydrous potassium carbonate in methanol solution, at about 0°C., there is selectively saponified the primary acyloxy group. This selective hydrolysis can be followed by t.l.c.; generally, it is complete in about 90 minutes to about 2 hours. The compounds of formula XII thus-obtained are oxidized with 8N chromic acid as described hereinabove for the dihydroxylated allenes, to produce the corresponding carboxylic acid, i.e., the compound of formula XIII. The protecting groups are in turn hydrolyzed by the above-described methods, i.e., the acyloxy group is hydrolyzed under alkaline conditions, using preferably anhydrous potassium carbonate in methanol, at room temperature or below, to yield the compounds of formula XIV, in which the tetrahydropyranyloxy groups are cleaved by mild acid treatment, using particularly 65 percent aqueous acetic acid, thus obtaining the trihydroxy prostatrienoic acid derivatives of formula XV, e.g., 9α,11α,15α-trihydroxyprosta-4,5,13-trans-trienoic acid and 9α,15-α-dihydroxyprosta-4,5,13-trans-trienoic acid, the 4 or 6-methyl, ethyl or propyl and the 4,6-dialkyl derivatives thereof in which the alkyl group can be the same or different, as well as the C-20 nor or bisnor compounds or the C-20 alkylated derivatives thereof.

In order to obtain the 9β-hydroxy isomers of compounds of formula XV, a compound of formula XI is esterified with ethereal diazomethane, in a conventional manner, and the methyl ester thus obtained reduced with sodium borohydride in a lower aliphatic alcohol such as methanol or ethanol, at about room temperature for a period of time of about 30 minutes to 1 hour, to produce a mixture of the corresponding 9α and 9β-hydroxy compounds, which are separated by chromatography on silica gel, obtaining approximately equal amounts of each isomer. The methyl ester group can be hydrolyzed by chemical or enzymatic methods, as described hereinafter in detail.

The novel prostaglandin derivatives of the present invention further substituted at C-15 by a methyl, ethyl or propyl group can be obtained by a process illustrated by the following sequence of reactions:

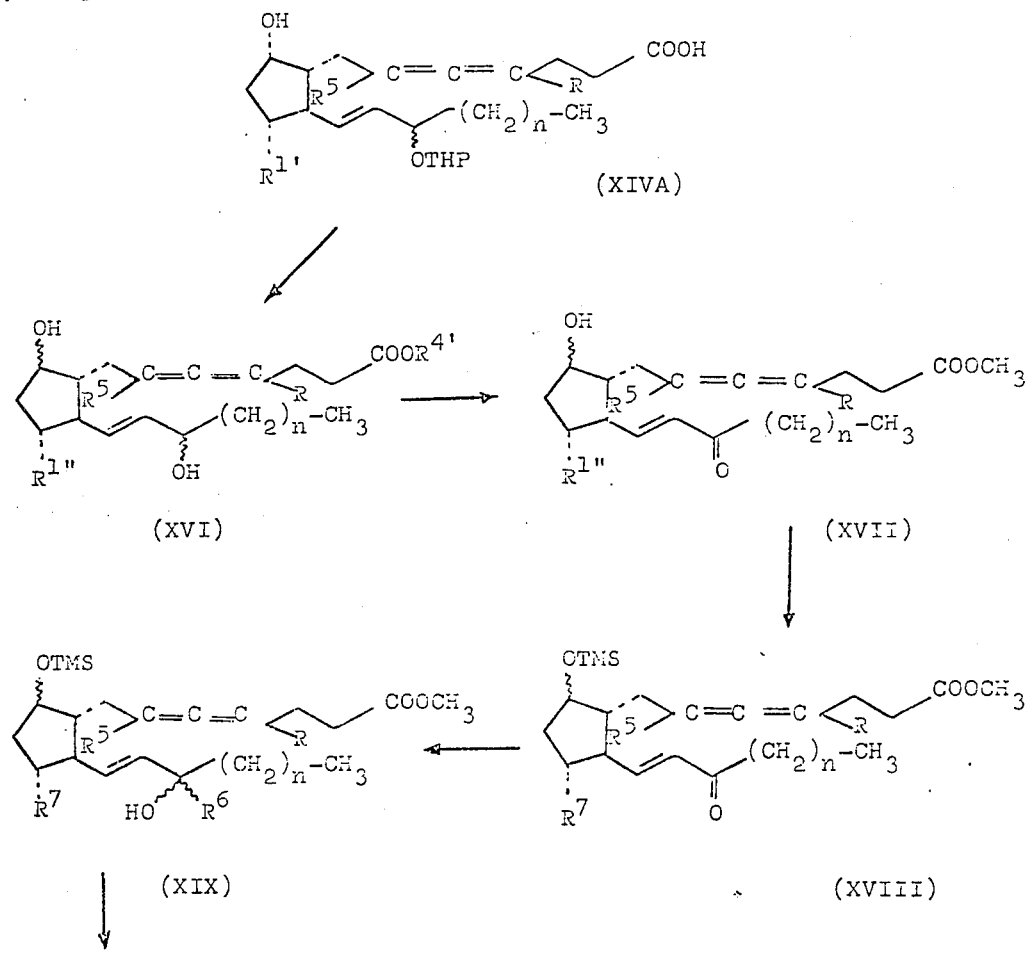

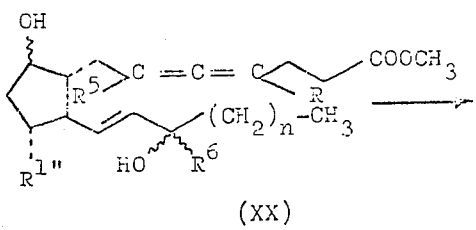 (XX)
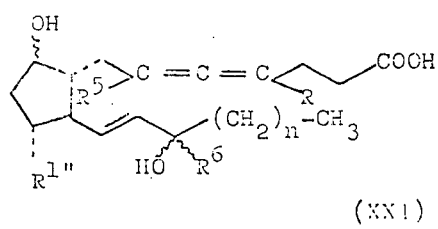 (XXI)

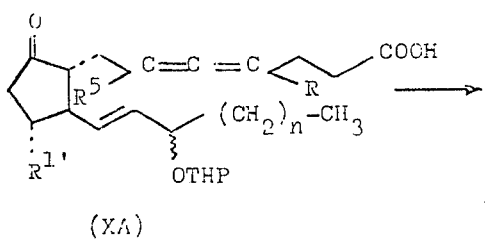 (XA)
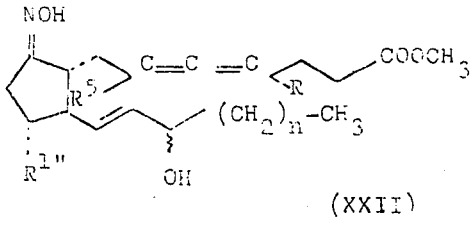 (XXII)

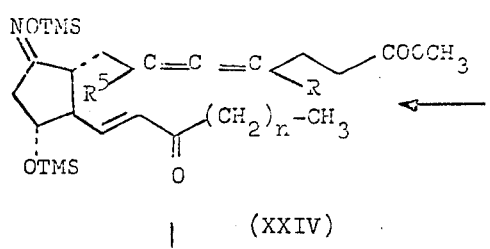 (XXIV)
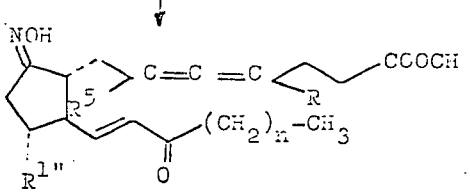 (XXIII)

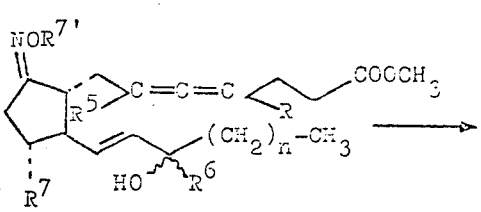 (XXV)
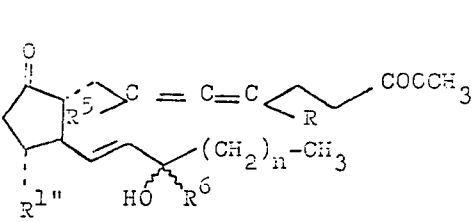 (XXVI)

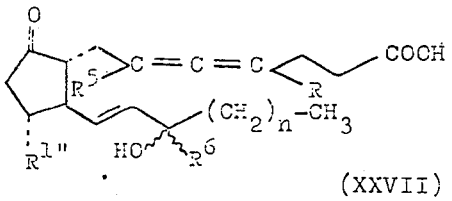 (XXVII)

wherein R, $R^{1'}$, $R^{1''}$, $R^5$, $R^6$ and n have the above-indicated meaning;
$R^{4'}$ is hydrogen or methyl;
$R^7$ is hydrogen or trimethylsilyloxy;
$R^{7'}$ is hydrogen or trimethylsilyl and
TMS is trimethylsilyl ($Si[CH_3]_3$);
provided that when $R^6$ is $\alpha$, the hydroxyl group, attached to the same carbon atom as $R^6$, is $\beta$; and when $R^6$ is $\beta$, the hydroxyl group, attached to the same carbon atom as $R^6$ is $\alpha$.

In practicing the process illustrated above, a compound of formula XIVA (racemic or individual antimer) in which the hydroxyl group at C-15 is in $\alpha$ or $\beta$-configuration, or mixtures thereof, the $\beta$-isomer being prepared by the above described process (I through VIII → XII → XIV) but starting from the corresponding 3''$\beta$-tetrahydropyranyloxy isomer of compound of formula I, is converted into an alkyl ester, preferably into the methyl ester, by reaction with diazomethane in ether solution, and thereafter the tetrahydropyranyloxy groups present hydrolyzed with 65 percent aqueous acetic acid, as described hereinabove to yield the corresponding compound of formula XVI, ($R^4$ = Me), in which the hydroxyl group at C-9 is in $\alpha$ configuration. The 9β-hydroxy isomers of compounds of formula XVI are obtained from compounds of formula XI or the 15β-hydroxy isomers thereof, via esterification with diazomethane and reduction of the 9-keto group, as described hereinabove in detail. A compound of formula XVI is then selectively oxidized at C–15 with an excess of manganese dioxide or 2,3-dichloro-5,6-dicyano- 1,4-benzoquinone in a suitable inert organic solvent, e.g., chloroform, tetrahydrofuran, dioxane and the like to produce the corresponding 15-keto compound of formula XVII. When manganese dioxide is used as reagent, this reaction is conducted at room temperature, for a period of time of about 18 to 40 hours, under vigorous stirring, using preferably chloroform or tetrahydrofuran as solvents. The oxidizing agent is added portionwise at 4–6 hours intervals. When the oxidation is effected using 2,3-dichloro-5,6-dicyano-1,4-benzoquinone as reagent, the reaction is preferably conducted at a temperature above room temperature, i.e., at about 40° to 50°C. using particularly dioxane as solvent, for a period of time of the order of 14 to 20 hours, preferably for about 18 hours. In any case the course of the reaction can be followed by thin layer chromatography or by periodic determination of the ultraviolet spectrum. When the reaction is complete the oxidizing agent is separated by filtration and the reaction product isolated by conventional techniques such as evaporation of the solvent and purification of the residue by thin layer chromatography or chromatography on Florisil.

Compound XVII is then converted into the corresponding mono- or ditrimethylsilyl ether of formula XVIII by procedures known in the art, see for example Pierce, "Silylation of Organic Compounds," Pierce Chemical Co., Rockford, Ill. (1968). Conveniently, this reaction can be done by using a mixture of hexamethyldisilazane and trimethylchlorosilane or N-trimethylsilyldiethylamine as etherifying agents.

Upon reaction of the trimethylsilyloxy compound with a slight molar excess of an alkyllithium or an alkylmagnesium halide, using particularly methyl-, ethyl- or propyllithium or methyl-, ethyl- or propylmagnesium bromides as reagents there are obtained the corresponding 15}-alkyl-15}-hydroxy compounds of formula XIX. In the preferred embodiments, the reaction is carried out using preferably 1.1 to 1.2 molar equivalents of the alkyllithium, or from 6 to 12 molar equivalents of the alkylmagnesium halide per molar equivalent of starting compound, using ether or tetrahydrofuran as solvent, at a temperature comprised between −78°C. to room temperature, for a period of time of the order of 2 to 10 hours and under an inert atmosphere, preferably under argon atmosphere. The silyloxy groups of the crude mixture of alkylated compounds are immediately hydrolyzed to afford the compounds of formula XX. This hydrolysis is effected by following known methods for transforming silyl ethers into alcohols, and preferably by dissolving the compound of formula XIX in a lower aliphatic alcohol-water mixture, e.g., 50–80 percent aqueous methanol or ethanol, maintaining the solution at a temperature of between 0°C, to room temperature for a period of time of about 18 hours to several days, the reaction time depending upon the temperature at which the hydrolysis takes place. This hydrolysis can be optionally done in the presence of a small amount of an organic or inorganic acid, or in the presence of carbon dioxide which will hasten the cleavage of the trimethylsilyloxy groups.

The mixture of 15α-hydroxy-15β-alkyl- and 15β-hydroxy-15α-alkyl compounds of formula XX is separated at this stage by thin-layer chromatographic techniques, and the methyl ester group in the individual isomers is in turn saponified by chemical or enzymatic methods, to yield the corresponding 15α-hydroxy-15β-alkyl and 15β-hydroxy-15α-alkyl-prostatrienoic acids of formula XXI.

When this hydrolysis is effected chemically, the alkyl ester compound of formula XX is dissolved in a lower aliphatic alcohol such as methanol or ethanol and treated with an aqueous solution of an alkali metal carbonate, e.g., sodium carbonate or potassium carbonate at a temperature above room temperature, of the order of about 30° to 50°C., preferably at about 40°C. for a period of time of about 12 to 20 hours, preferably for about 16 hours, thus yielding, after acidification, the corresponding prostatrienoic acid compound of formula XXI. This hydrolysis is preferably conducted under an inert atmosphere, i.e., under nitrogen or argon atmosphere.

Compound XX can be alternatively hydrolyzed by using enzymes in aqueous solutions. For this enzymatic hydrolysis, there is preferably used a crude pancreatic lipase commercially available (Sigma Steapsin), however, other enzyme systems which are known as useful for the hydrolysis of compounds unstable to alkaline or acid conditions can also be practical. Other lipases obtainable from bacterial sources, such as the partially purified lipase obtained from *Corynebacterium acnes* culture supernatant can also be used, or a lipase of those that are known to act on water insoluble esters of long chain fatty acids (L. Sarda, et al., *Biochem. Biophys. Acta.* 23:264 (1957)), or baker's yeast (C. J. Sih, et al., *J. C. S. Chem. Comm.* 240 (1972)).

The hydrolysis of compound XX with the crude pancreatic lipase can be conducted in a buffered aqueous solution containing sodium chloride and calcium chloride, at a neutral or almost neutral pH, at a temperature of between 22° to 30°C., preferably at about 25° to 27°C., adjusting the pH of the reaction mixture to 7.2 to 7.4 by addition of, for example dilute sodium hydroxide solution, at intervals. Compound of formula XX is dissolved in the previously prepared buffered lipase aqueous solution by sonication at about 37°C. using from about 0.5 ml. to about 1 ml. of the lipase solution per milligram of substrate. The methyl ester group is readily hydrolyzed within a short period of time, of the order of 5 minutes to 1 hour. The course of the reaction can be followed by thin layer chromatography; when the hydrolysis is complete, the free acid can be isolated from the reaction mixture by conventional techniques, such as acidification with a dilute acid solution, e.g., using dilute hydrochloric acid, extraction with a solvent immiscible with water such as diethyl ether, ethyl acetate, chloroform, methylene chloride, and the like, evaporation of the solvent and purification of the residue by column chromatography, thin layer chromatography or liquid chromatography; good results in the separation of the acid XXI from the lipase have been obtained by column chromatography on Florisil.

By esterification of the carboxylic acid function of compounds of formula X or the 15β-tetrahydropyranyloxy epimers (both represented by formula XA), with an ethereal solution of diazomethane followed by hydrolysis of the tetrahydropyranyloxy functions present in the molecule with aqueous acetic acid, as described hereinbefore, and protection of the 9-keto group as the oxime by known methods, i.e., by reaction with hydroxylamine hydrochloride in aqueous methanol and in the presence of sodium acetate, conducting the reaction at room temperature for about 16 to 24 hours, there is obtained the corresponding compound of formula XXII. This compound is then oxidized with manganese dioxide or 2,3-dichloro-5,6-dicyano-1,4-benzoquinone as described hereinabove in detail for the obtention of compound XVII, to produce the corresponding 15-keto compound of formula XXIII.

By reaction of a compound of formula XXIII, ($R^{1'''}$ = hydroxy) with a silylating agent, using particularly a mixture of hexamethyldisilazane and trimethylchlorosilane or N-trimethylsilyldiethylamine as reagent there is produced the corresponding trimethylsilyloxy derivative represented by formula XXIV.

Treatment of compound XXIII ($R^{1'''}$ = H) or compound XXIV with a slight molar excess of an alkyl (methyl-, ethyl-or propyl) lithium or the corresponding alkylmagnesium halide, there is obtained the corresponding 15{-alkyl-15{-hydroxy compound of formula XXV. This reaction is preferably carried out in ether or tetrahydrofuran solution, using preferably from 1.1 to 1.2 molar equivalents of the alkyllithium or from 6 to 12 molar equivalents of the alkylmagnesium halide per molar equivalent of starting compound. The reaction is effected at a temperature of between −78°C. to room temperature, for a period of time of 2 to 10 hours, under an inert atmosphere.

The mixture of 15α-hydroxy-15β-alkyl and 15β-hydroxy-15α-alkyl compounds is separated into the individual isomers by thin layer chromatography, (previous hydrolysis of the trimethylsilyloxy group when present with aqueous methanol) and thereafter the oxime is hydrolyzed to regenerate the 9-keto function, thus producing the separated 9-keto-15α-hydroxy-15β-alkyl and 9-keto-15β-hydroxy-15α-alkyl prostatrienoic acid ester compounds of formula XXVI. The deoximation reaction is effected under mild conditions, for example by the methods described by E. J. Corey, et al., in *J. Am. Chem. Soc.* 92, 5276, (1970) or A. McKillop, et al., *J. Am. Chem. Soc.* 93, 4918, (1971) and references cited therein.

The first method involves the conversion of the oxime into the O-acetate derivative followed by reaction with an excess, using at least 2 molar equivalents, of chromous acetate in 90 percent aqueous tetrahydrofuran, at a temperature of the order of 25° to 65°C. for about 10 to 24 hours.

The second method comprises treatment of the oxime with thallium (III) nitrate, using about 1 to 1.1 molar equivalents of the reagent per mol of starting compound. The reaction is conducted at room temperature or below for a short period of time, of the order of 5 to 30 minutes, in an inert organic solvent, followed by filtration of the thallium (I) nitrate which precipitates, and brief treatment of the filtrate with dilute acid to decompose the intermediate nitroso compound. In accordance with our invention, this reaction is conducted in methanol solution, at about 20°C. using aqueous acetic acid to decompose the nitroso intermediate.

Hydrolysis of the oxime can also be effected using titanium trichloride as described by Timms and Wilsmith, *Tetrahedron Letters*, 195, (1971).

Alternatively the compounds of formula XXVI (wherein $R^{1'''}$ is hydrogen) are obtained by oxidation of the compounds of formula XX (wherein $R^{1'''}$ is hydrogen) with chromium trioxidedipyridine complex [prepared as described by J. C. Collins et al., Tetrahedron Letters, 3363 (1968)]

Alternatively, the compounds of formula XXVI (wherein $R^{1'''}$ is hydrooxyl) are obtained by treating the compounds of formula XX (wherein $R^{1'''}$ is hydroxyl) according to the method disclosed by E. W. Yankee, et al., *J. A. C. S.*, 94, 3651, (1972); namely, selective silylation at the 11-position of XX (wherein $R^{1'''}$ is hydroxyl), followed by oxidation with Collins' reagent and subsequent hydrolysis with aqueous methanol containing a trace of acetic acid to yield the compounds of formula XXVI (wherein $R^{1'''}$ is hydroxyl).

Alternatively, the hydrolysis of the oxime can be effected on the mixture of the 15α and 15β-hydroxy isomers, separating the individual isomers afterwards by thin layer chromatography.

The alkyl ester group in compounds of formula XXVI is hydrolyzed by chemical or enzymatic methods, e.g., by reaction with potassium carbonate in aqueous methanol or with a crude pancreatic lipase, respectively, as described hereinbefore in detail for the 9α-hydroxylated compounds, thus producing the free acids of formula XXVII.

The hydroxyl groups in compounds of formulas XI and XV and the secondary hydroxyl groups in compounds of formulas XXI and XXVII can be esterified or etherified in a conventional manner, to produce mono-, di-, or triesters, or mono-, di- or triethers, depending upon the particular prostaglandin derivatives. Esterification can be accomplished by reaction of the hydroxylated compound with a carboxylic acid anhydride or chloride of less than 12 carbon atoms in pyridine solution.

Etherification can also be carried out by conventional techniques. For example, reaction with dihydropyran, dihydrofuran or 4-methoxy-5,6-dihydro-2H-pyran in an inert solvent such as, for example, methylene chloride or benzene and in the presence of an acid catalyst (e.g., p-toluenesulfonic acid, p-toluenesulfonyl chloride) produces the tetrahydropyran-2'-yloxy, tetrahydrofuran-2'-yloxy or 4'-methoxytetrahydropyran-4'-yloxy derivatives, respectively.

Although the esterification or etherification reactions are usually effected using an excess of the esterifying or etherifying agents, it is preferable to use at least one molar equivalent of said reagents per hydroxyl group present in the starting compound.

The alkyl esters of the carboxylic acid function can be prepared by treatment of the free acid with an excess of a diazoalkane such as diazomethane, diazoethane or diazopropane in ether or methylene chloride solution, in a conventional manner, or by reaction with the desired lower alkyl iodide in the presence of lithium carbonate, at room temperature.

The salt derivatives of the prostanoic acids of the present invention can be prepared by treating the corresponding free acids with about one molar equivalent of a pharmaceutically acceptable base per molar equivalent of free acid. Suitable pharmaceutically acceptable bases include, for example, sodium hydroxide, trimethylamine, triethylamine, tripropylamine, β-(dimethylamino) ethanol, β-(diethylamino) ethanol, arginine, lysine, caffeine, procaine and the like. Typically, the reaction is conducted in an aqueous solution, alone or in combination with an inert water miscible organic solvent, at a temperature of about from 0° to 30°C preferably at room temperature. Typical inert, water miscible organic solvents include methanol, ethanol, isopropanol, butanol, dioxane and the like. When divalent metal salts are prepared such as the calcium salts or magnesium salts, the free acid starting material is treated with at least one half molar equivalent of the pharmaceutically acceptable base.

When the above-described processes are effected using racemic mixtures as starting materials, each and every intermediate and final product will be a racemate, while when starting with an R-antimer, each and every intermediate and final product will be an R-antimer.

The compounds of formula I used as starting materials in the above described processes can be obtained by the following sequence of reactions:

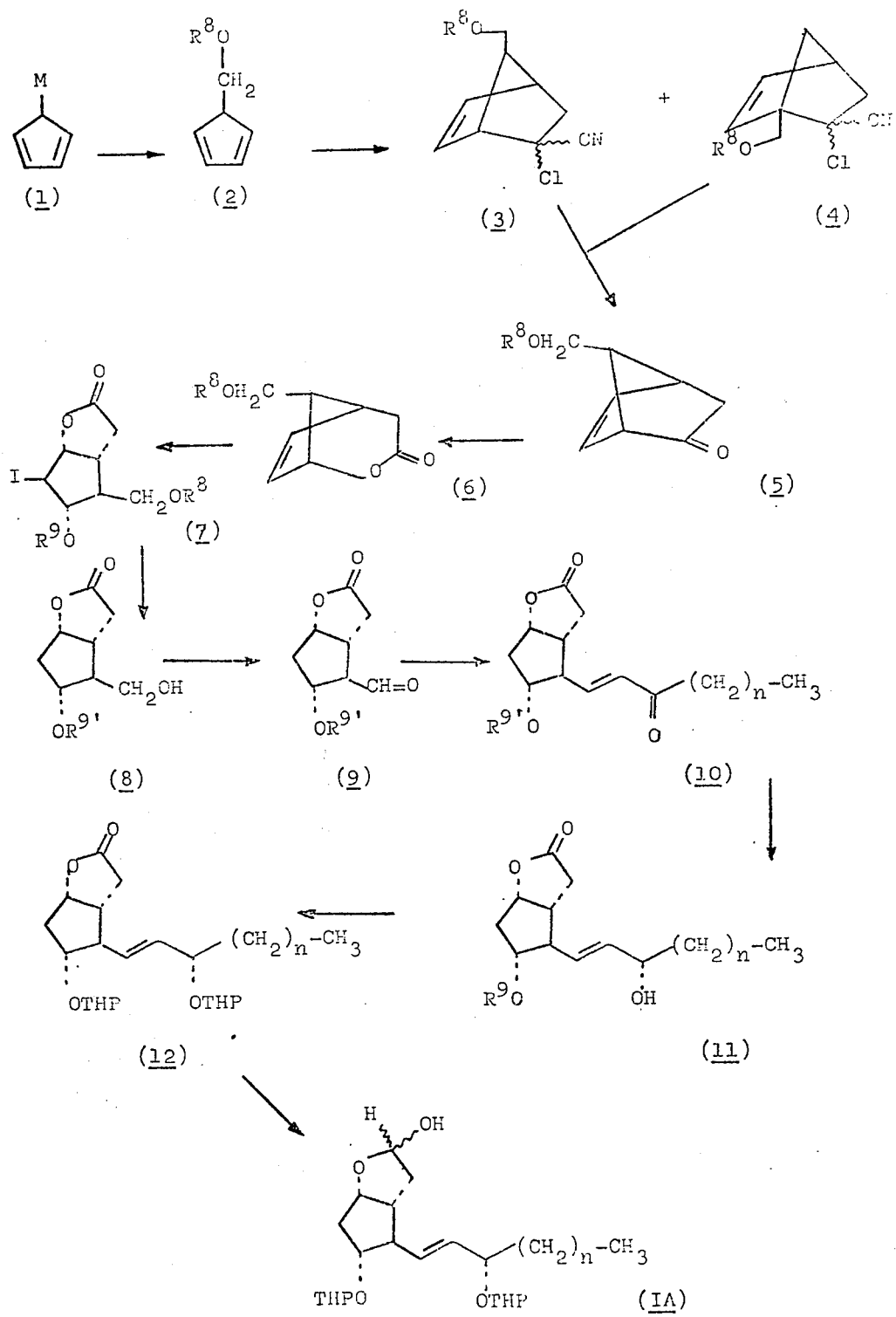

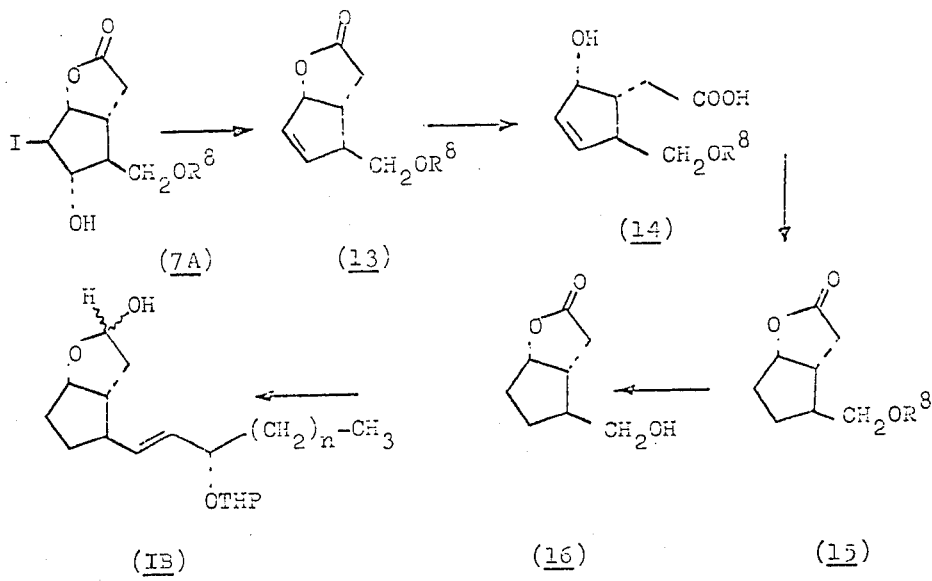

wherein $R^8$ represents methyl or benzyl;
$R^{9'}$ represents hydrogen or p-phenylbenzoyl; $R^9$ represents p-phenylbenzoyl,
M represents sodium or thallium, and
$n$ is as defined above.

In the above reaction scheme, compounds of formulas (8) through (I-A) and (7A) through (IB) can be in the form of racemates or as the corresponding individual antimers, in particular the R-antimers. The 1'R-antimers of 7A, ($R^8$ = benzyl) and (8) have been described by E. J. Corey et al, in *J. Am. Chem. Soc.* 93, 1491 (1971), while the 1'R-antimer of 7A, ($R^8$ = methyl) has been described by E. J. Corey, et al., in *J. Am. Chem. Soc.* 92, 397 (1970).

Briefly, the method for the obtention of the starting materials comprises the reaction of cyclopentadienyl sodium or cyclopentadienyl thallium (1), obtained by reaction
of cyclopentadiene with sodium hydride or aqueous thallous sulfate in the presence of potassium hydroxide (E. J. Corey, et al., *J. Am. Chem. Soc.* 93, 1489, (1971)), with a slight excess of chloromethyl methyl ether or chloromethyl benzyl ether in tetrahydrofuran at approximately −55°C., to yield respectively the 5-methoxymethyl-1,3-cyclopentadiene 2 ($R^8$ = methyl) or 5-benzyloxymethyl-1,3-cyclopentadiene 2 ($R^8$ = benzyl) which are subjected to the Diels Alder reaction with an excess (about 5 molar equivalents) of 2-chloroacrylonitrile in the presence of cupric fluoroborate as catalyst to yield a mixture of the endo-exo cyano nitriles of formulas (3) and (4) ($R^8$ = methyl or benzyl, respectively). This mixture of stereoisomeric nitriles is treated with potassium hydroxide in dimethyl sulfoxide to yield the anti-bicyclic ketones of formula (5), i.e.,
7-syn-methoxymethyl-2-norbornen-5-one ($R^8$ = methyl) or 7-syn-benzyloxymethyl-2-norbornen-5-one ($R^8$ = benzyl) respectively, which upon reaction with a slight molar excess of m-chloroperbenzoic acid in methylene chloride in the presence of sodium bicarbonate results in selective Baeyer-Villiger oxidation to form the corresponding lactone (6), namely 2-oxa-3-oxo-$\Delta^5$-8-syn-methoxy-methylbicyclo (3.2.1) octane ($R^8$ = methyl) and 2-oxa-3-oxo-$\Delta^5$-8-syn-benzyloxymethylbicyclo (3.2.1) octane ($R^8$ = benzyl). Saponification of the foregoing lactones of formula (6) with 2.5 equivalents of sodium hydroxide in aqueous methanol, followed by neutralization with carbon dioxide and treatment with 2.5 equivalents of aqueous potassium triiodide solution at 0°–5°C. produce the respective hydroxy-iodolactones of formula (7), namely (2'$\alpha$,4'$\alpha$-dihydroxy-3'$\beta$-iodo-5'$\beta$-methoxymethylcyclopent-1'$\alpha$-yl) -acetic acid 1,2'-lactone ($R^8$ = methyl, $R^9$ = H) and (2'$\alpha$,4'$\alpha$-dihydroxy-3'$\beta$-iodo-5'$\beta$-benzyloxymethylcyclopent-1'$\alpha$-yl)-acetic acid 1,2'-lactone ($R^8$ = benzyl, $R^9$ = H) which are esterified with p-biphenylcarboxylic acid chloride in pyridine, under conventional conditions to yield the corresponding p-phenylbenzoates (7, $R^9$ = p-phenylbenzoyl).

These compounds are then submitted to deiodination using tri-n-butyl tin hydride in the presence of catalytic amounts of azobisisobutyronitrile in benzene solution, and thence to cleavage of the 5'$\beta$-benzyloxymethyl or 5'$\beta$-methoxymethyl group to produce the hydroxymethyl compound (8).

The benzyloxymethyl group is cleaved by hydrogenolysis in the presence of palladium-charcoal and perchloric acid as catalysts, in a suitable organic solvent; the methoxymethyl group is hydrolyzed by reaction with boron tribromide in methylene chloride, at a temperature comprised between about −78° to 0°C.

As mentioned above, the 1'R-antimer of (8) i.e., 1'R-(2'α-hydroxy-4'α-p-phenylbenzoyloxy-5'β-hydroxymethylcyclopent-1'α-yl)-acetic acid 1,2'-lactone is obtained as described by E. J. Corey et al in *J. Am. Chem. Soc.* 93, 1491, (1971) via base catalyzed hydrolysis of the lactone (6) ($R^8$ = benzyl) to the corresponding hydroxyacid, resolution of the hydroxyacid as the (+)-amphetamine salt followed by iodolactonization of the resolved 1'R-antimer, esterification with p-phenylbenzoylchloride, deiodination with tri-n-butyltin hydride and hydrolysis of the benzyloxymethyl group.

Oxidation of a racemic hydroxymethyl compound (8) or the 1'R-antimer with chromium trioxide-dipyridine complex (prepared as described by J. C. Collins, et al., in *Tetrahedron Letters* 3363, (1968)) in methylene chloride, at about 0°C. affords the aldehyde (9), (racemic mixture or R-antimer) which without purification is transformed stereospecifically into the corresponding trans-enone lactone of formula (10). This transformation involves a modified Wittig reaction, which comprises treatment of the aldehyde of formula (9) with the sodium anion of a dimethyl-2-oxo-n-alkylphosphonate of the formula:

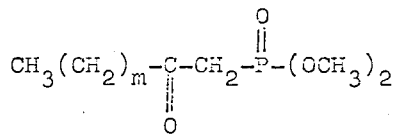

wherein *m* is an integer of from 2 to 9, in dimethoxy ethane solution. The reagents used are: dimethyl 2-oxopentylphosphonate, dimethyl 2-oxohexylphosphonate, dimethyl 2-oxoheptylphosphonate, dimethyl 2-oxo-octylphosphonate, dimethyl 2-oxononylphosphonate, dimethyl 2-oxodecylphosphonate, dimethyl 2-oxoundecylphosphonate and dimethyl 2-oxododecylphosphonate. These reagents are conveniently prepared in accordance with the method described by E. J. Corey, et al., in *J. Am. Chem. Soc.* 88, 5654, (1966) from dimethyl α-lithiomethanephosphonate and a methyl or ethyl ester of a n-alkanoic acid containing from 4 to 10 carbon atoms, e.g., ethyl n-butanoate, methyl n-hexanoate, and ethyl n-decanoate. The reaction is conducted at temperatures of the order of 0° to 40°C, preferably at room temperature or below for about 1 to 4 hours, under an inert atmosphere, using at least one molar equivalent of the reagent per mole of aldehyde, and preferably 1.2 to 2 moles.

Treatment of the racemic enone (10) or the 1'R-antimer with an excess of zinc borohydride in dimethoxyethane, at room temperature for about 1 hour produces a mixture of the corresponding α and β-hydroxy compounds, which is separated by thin layer chromatography on silica gel to obtain the desired α-hydroxylated compound in pure form (11, $R^9$ = p-phenylbenzoyl). The p-phenylbenzoyloxy group is then hydrolyzed under alkaline conditions, using preferably anhydrous potassium carbonate in methanol, and the diol is etherified with dihydropyran in methylene chloride solution and in the presence of p-toluenesulfonic acid, to give the bistetrahydropyranyloxy compound (12), (racemic mixture or 1'R-antimer) which by reduction with diisobutylaluminum hydride in toluene, at about −60°C produces the lactol of formula (IA), e.g., [2'α-hydroxy-4'α-tetrahydropyranyloxy-5'β-(3''α-tetrahydropyranyloxyoct-1''(t)-en-1''-yl)-cyclopent-1'α-yl]-acetaldehyde-1,2'-hemiacetal, (IA, n = 4), [2-'α-hydroxy-4'α-tetrahydropyranyloxy-5'β-(3''α-tetrahydropyranyloxyhex-1''(t)-en-1''-yl)-cyclopent-1'α-yl]-acetaldehyde 1,2'-hemiacetal, (IA, n = 2) and [2'α-hydroxy-4'α-tetrahydropyranyloxy-5'β-(3''α-tetrahydropyranyloxytridec-1''(t)-en-1''-yl)-cyclopent-1'α-yl]-acetaldehyde 1,2'-hemiacetal, (IA, n = 9) or the 1'R-antimers thereof.

By reaction of a racemic hydroxy iodolactone of formula (7A) or the 1'R-antimers thereof with freshly distilled phosphorous oxychloride in pyridine solution, first at 0°C and thereafter at room temperature there is obtained the corresponding dehydrolactone compound (racemic or 1'R-antimer) of formula (13).

The 1'R-antimers of (7A), namely 1'R-(2'α,4'α-dihydroxy-3'β-iodo-5'β-benzyloxymethylcyclopent-1'α-yl) acetic acid 1,2'-lactone (7A, $R^8$ = benzyl) and 1'R-(2'α,4'α-dihydroxy-3'β-iodo-5'β-methoxymethylcyclopent-1'α-yl)-acetic acid 1,2'-lactone (7A, $R^8$ = methyl) are obtained as described by E. J. Corey, et al., in *J. Am. Chem. Soc.* 93, 1491 (1971) and in *J. Am. Chem. Soc.* 92, 397, (1970) respectively, via base catalyzed hydrolysis of the corresponding lactone (6) to the hydroxyacid, resolution of the hydroxyacid as the (+)-amphetamine salt for the benzyloxymethyl compound or as the (−)-ephedrine salt for the methoxymethyl compound and iodolactonization of the respective 1'R-antimeric acid). In order to prevent hydrogenolysis of the allylic hydroxyl during the reduction of the double bond, the lactone group in a compound of formula (13) is opened by treatment with 2N methanolic sodium hydroxide followed by careful neutralization with 3N hydrochloric acid in ethyl acetate to pH 6, to produce the hydroxyacid (14) (racemic mixture or 1'R-antimer). Catalytic reduction of this hydroxyacid with Raney nickel in methanol solution followed by brief exposure to acid produces the corresponding lactone (15), which is hydrolyzed to the corresponding hydroxymethyl compound (16) (racemic or 1'R-antimer) by the above-mentioned methods, i.e., by hydrogenolysis in the case of the benzyloxymethyl compound (15, $R^8$ = benzyl) or by reaction with boron tribromide for the methoxymethyl derivative (15, $R^8$ = methyl).

A hydroxymethyl compound of formula (16) is then converted into the desired lactol of formula (IB) by oxidation with chromium trioxide-dipyridine complex to the aldehyde, condensation of the aldehyde with the sodium anion of a dimethyl 2-oxo-n-alkylphosphonate of the type previously mentioned to produce the corresponding trans-enone lactone, selective reduction of the keto group with zinc borohydride to yield a mixture of the α and β-hydroxy isomers, separation of the isomers by thin layer chromatography, etherification of the 3''α-hydroxy compound with dihydropyran and reduction of the lactone ring with diisobutylaluminum hydride, as described in detail hereinbefore with regard to the transformation of a compound (8) into a compound (IA).

The compounds, esters and salts of the invention exhibit prostaglandin-like biological activities and thus are useful in the treatment of mammals where the use of prostaglandins are indicated. The compounds, esters and salts of the invention are bronchodilators and thus are useful in treating mammals for bronchial spasm or wherever strong bronchodilators are indicated. These compounds are also useful in controlling or palliating hypertension in mammals and further exhibit central nervous system depressant activity in mammals, and are useful as sedatives. In addition, the compounds are useful for inducing labor, in pregnancy, and for inducing menses to correct or reduce menstrual abnormalities.

The compounds and/or salts, of the invention, can be administered in a wide variety of dosage forms, either alone or in combination with other pharmaceutically compatible medicaments, in the form of pharmaceutical compositions suited for oral or parenteral administration or inhalation in the case of bronchodilators. The compounds are typically administered as pharmaceutical compositions consisting essentially of the compounds and/or salts, of the invention, and a pharmaceutical carrier. The pharmaceutical carrier can be either a solid material, liquid or aerosol, in which the compound and/or salt is dissolved, dispersed or suspended, and can optionally contain small amounts of preservatives and/or pH-buffering agents. Suitable preservatives which can be used include, for example, benzyl alcohol and the like. Suitable buffering agents include, for example, sodium acetate and pharmaceutical phosphate salts and the like.

The liquid compositions can, for example, be in the form of solution, emulsions, suspensions, syrups, or elixirs. The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, talcum, sodium bisulfite and the like.

For inhalation administration, the compounds and/or salts can, for example, be administered as an aerosol comprising the compounds or salts in an inert propellant together with a cosolvent (e.g., ethanol) together with optional preservatives and buffering agents. Additional general information concerning the inhalation administration of aerosols can be had by reference to U.S. Pat. Nos. 2,868,691 and 3,095,355.

the compounds of this invention are typically administered in dosages of about from 0.01 to 10 mg. per Kg. of body weight. The precise effective dosage will, of course, vary depending upon the mode of administration, condition being treated and host.

The following Preparations and Examples illustrate the invention, but are not intended to limit its scope. The starting materials and products obtained in Preparation 8, part C through 18 and Examples 1 to 40 are racemates, while the starting materials and products obtained in Preparations 8' through 18' and Examples 1A through 40A are the corresponding individual antimers. The abbreviation t.l.c. refers to thin-layer chromatography and all mixture ratios used with regard to liquids refer to volume ratios. Also, where necessary, preparations and examples are repeated to provide sufficient starting material for subsequent examples.

PREPARATION 1

A. To a stirred solution of 125 g. of thallium sulfate and 50 g. of potassium hydroxide in 750 ml. of water are added, under an atmosphere of argon, 43 ml. of freshly distilled cyclopentadiene and the mixture is vigorously stirred for 10 minutes; the yellow precipitate formed is filtered off, washed with ice water, methanol and ether, to yield 132 g. of cyclopentadienylthallium.

B. A mixture of 216.28 g. of benzyl alcohol, 61.44 g. of paraformaldehyde, 481.6 g. of anhydrous magnesium sulfate and 1,200 ml. of methylene chloride is cooled to a temperature of between −50° to −55°C. in a dry ice-acetonitrile bath, and the stirred cold solution is saturated with anhydrous hydrogen chloride gas. The reaction mixture is kept at −50° to −55°C. for 10 minutes further, and then the excess of hydrogen chloride is eliminated by passing a stream of nitrogen during 30 minutes. The reaction mixture is filtered and the solid material washed well with pentane, and the combined filtrates are evaporated to dryness at a temperature below 30°C., to produce an oil which is distilled under reduced pressure to yield chloromethyl benzyl ether.

C. A suspension of 132 g. of cyclopentadienylthallium in 200 ml. of anhydrous ether is cooled to −20°C. in a dry ice-carbon tetrachloride bath. To the cooled mixture are added under stirring and under an argon atmosphere, in a 15-minute period, 90 g. of chloromethyl benzyl ether. The reaction mixture is stirred for 3½ hours at −20°C., it is then filtered in a filtration flask previously cooled to −78°C. and the solid precipitate washed with cold pentane (−78°C).

The filtered solution is immediately added to a mixture of 216 g. of anhydrous α-chloroacrylonitrile and 30 g. of anhydrous cupric fluoroborate, previously cooled to −78°C. The reaction mixture is evaporated to half its original volume at a temperature not higher than 0°C., and the concentrate is stirred at 0°c. for 48 hours. The reaction mixture is then poured into 200 ml. of saturated sodium chloride solution, and extracted three times with ether. The combined extracts are washed with saturated sodium bicarbonate solution (2 × 200 ml.) and saturated sodium chloride solution (2 × 200 ml.), dried over magnesium sulfate and evaporated to dryness under reduced pressure. The resulting residue is purified by filtration through 100 g. of silica gel using benzene as eluant, thus obtaining the pure 2-chloro-2-cyano-$\Delta^5$-7-syn-benzyloxymethylbicyclo-(2.2.1)-heptane [mixture of (3) and (4), $R^8$ = benzyl].

PREPARATION 2

To a well-stirred slurry of 74.1 g. of cyclopentadienylthallium in 100 ml. of anhydrous ether cooled to −20° to −22°C. (internal temperature) in a dry ice-carbon tetrachloride bath under an argon atmosphere, are added dropwise, in a 15-minute period, 20.13 g. of chloromethyl methyl ether and the slurry is stirred at −20° to −22°C. for 7 hours. The reaction mixture is then filtered into a precooled (−70°C., dry ice-acetone) flask and the residue of thallium chloride washed with three 100 ml. portions of cold (−70°C) ether. The combined filtrate is added dropwise from a dropping funnel with a dry ice jacket to a suspension of 29.65 g. of cupric tetrafluoroborate in 87.5 g. of anhydrous α-chloroacrylonitrile maintained at 0°C. When the addition is complete, the mixture is stirred at 0°C. in the dark for 18 hours. One hundred milliliters of saturated sodium chloride solution are then added and the reaction mixture extracted with ether. The ether extracts are successively washed with saturated sodium bocarbonate (2 × 100 ml.) and sodium chloride (2 × 100 ml.), and dried over magnesium sulfate. Evaporation under reduced pressure at room temperature gives 2-chloro-2-cyano-$\Delta^5$-7-syn-methoxymethylbicyclo-(2.2.1)-heptane [mixture of (3) and (4), $R^8$ = methyl)] as a clear pale yellow oil.

PREPARATION 3

To a stirred solution of 100 g. of 2-chloro-2-cyano-$\Delta^5$-7-syn-benzyloxymethylbicyclo-(2.2.1)-heptane in 368 ml. of dimethylsulfoxide is added dropwise, in a 15-minute period and under argon atmosphere, a hot solution of 105.2 g. of potassium hydroxide in 52.6 ml. of water. The reaction mixture is stirred for 28 hours at room temperature, diluted to twice its volume with ice water and extracted several times with ether. The combined organic extract is washed twice with saturated sodium carbonate solution, dried over magnesium sulfate and evaporated to dryness. The residue is purified by distillation under high vacuum (0.6 mm.) to yield 7-syn-benzyloxymethyl-2-norbornen-5-one, (5, $R^8$ = benzyl), homogeneous on t.l.c.

By the same procedure but using 2-chloro-2-cyano-$\Delta^5$-7-syn-methoxymethylbicyclo-(2.2.1)-heptane in lieu of 2-chloro-2-cyano-$\Delta^5$-7-syn-benzyloxymethylbicyclo-(2.2.1)-heptane there is obtained 7-syn-methoxymethyl-2-norbornen-5-one (5, $R^8$ = methyl).

PREPARATION 4

To a suspension of 55 g. of m-chloroperbenzoic acid and 43.5 g. of sodium bicarbonate in 570 ml. of anhydrous methylene chloride are added 57 g. of 7-syn-benzyloxymethyl-2-norbornen-5-one, in a 15 minute period and under stirring, maintaining the temperature at about 25°C. the reaction mixture is stirred for 3 hours further and diluted with methylene chloride. The resulting mixture is vigorously stirred with 470 ml. of saturated aqueous sodium sulfite solution, the organic layer is separated and washed with saturated sodium sulfite solution. The aqueous phase is extracted with methylene chloride and the combined organic methylene chloride extracts are dried over magnesium sulfate and evaporated to dryness under reduced pressure, thus yielding 2-oxa-3-oxo-$\Delta^5$-8-syn-benzyloxymethylbicyclo-(3.2.1)-octane as an homogeneous oil, (6, $R^8$ = benzyl).

By the same procedure but using 7-syn-methoxymethyl-2-norbornen-5-one in place of 7-syn-benzyloxymethyl-2-norbornen-5-one there is obtained 2-oxa-3-oxo-$\Delta^5$-8-syn-methoxymethylbicyclo-(3.2.1)-octane, (6, $R^8$ = methyl).

PREPARATION 5

To a solution of 60 g. of 2-oxa-3-oxo-$\Delta^5$-8-syn-benzyloxymethylbicyclo-(3.2.1)-octane in 70 ml. of methanol is added, at 0°C., a solution of 30 g. of sodium hydroxide in 247 ml. of water, and the resulting mixture is stirred at room temperature for 3 hours. The methanol is then evaporated under vacuo at a temperature below 30°C., cooled to 0°C. and extracted with ether to eliminate the unsaponifiable products. The aqueous phase is neutralized with carbon dioxide and immediately treated with a solution of 188.1 g. of iodine and 369 g. of potassium iodide in 275 ml. of water. The reaction mixture is stirred for 48 hours at 0°C. and diluted with sodium sulfite solution until complete decoloration. It is then saturated with sodium potassium tartrate and extracted with methylene chloride.

The organic extracts are dried over magnesium sulfate and evaporated to dryness under reduced pressure. The oily residue is crystallized from ether-methylene chloride, to yield the pure (2'α,4'α-dihydroxy-3'β-iodo-5'β-benzyloxymethylcyclopent-1'α-yl)-acetic acid 1,2'-lactone, (7, $R^8$ = benzyl, $R^9$ = H).

Similarly, starting from 2-oxa-3-oxo-$\Delta^5$-8-syn-methoxymethylbicyclo-(3.2.1) octane there is obtained (2'α,4'α-dihydroxy-3'β-iodo-5'β-methoxymethylcyclopent-1'α-yl)-acetic acid 1,2'-lactone (7, $R^8$ = methyl, $R^9$ = H).

PREPARATION 6

To a solution of 39.45 g. of (2'α,4'α-dihydroxy-3'β-iodo-5'β-benzyloxymethylcyclopent-1'α-yl)-acetic acid 1,2'-lactone in 152 ml. of anhydrous pyridine is added 32.8 g. of p-biphenylcarboxylic acid chloride. The resulting solution is stirred at room temperature for 1 hour; 9 ml. of water are then added, and the mixture stirred for 1 hour to destroy the excess reagent. The solvents are eliminated under reduced pressure and the residue is dissolved in methylene chloridecyclohexane (3:2the organic solution is washed successively with 10 percent hydrochloric acid solution, saturated sodium bicarbonate solution and saturated sodium chloride solution, dried over magnesium sulfate and concentrated, to yield (2'α-hydroxy-4'α-p-phenylbenzoyloxy-3'β-iodo-5'βbenzyloxymethylcyclopent-1'α-yl)-acetic acid 1,2'-lactone, (7, $R^8$ = benzyl; $R^9$ = p-phenylbenzoyl) which can be purified by crystallization.

By the same procedure, (2'α,4'α-dihydroxy-3'β-iodo-5'β-methoxymethylcyclopent-1'α-yl)-acetic acid 1,2'-lactone is converted into (2'α-hydroxy-4'α-p-phenylbenzoyloxy-3'β-iodo-5'β-methoxymethylcyclopent-1'α-yl)-acetic acid 1,2'-lactone (7, $R^8$ = methyl, $R^9$ = p-phenylbenzoyl).

PREPARATION 7

To a solution of 61 g. of (2'α-hydroxy-4'α-p-phenylbenzoyloxy-3'β-iodo-5'β-benzyloxymethylcyclopent-1'α-yl)-acetic acid 1,2'-lactone in 610 ml. of benzene (dried over molecular sieves) is added 45.25 g. of tri-n-butyl tin hydride, prepared according to the procedure of H. G. Kuivila and O. F. Beumel, Jr., *J. Am. Chem. Soc.*, 83, 1246, (1961) and 211 mg. of azobisisobutyronitrile. The mixture is stirred at 50°C. for 30 minutes. Then the benzene is removed by evaporation under reduced pressure, the oily residue is dissolved in 1.5 l. of ether and the ethereal solution is washed several times with 5 percent aqueous sodium hydroxide solution and then with saturated sodium chloride solution, dried over magnesium sulfate and evaporated under vacuo. The residue is chromatographed on 915 g. of silica gel using as first eluant ether-hexane (1:1) to remove non-polar tin by-products. The fractions eluted with ethyl acetate afford the desired (2'α-hydroxy-4'α-p-phenylbenzoyloxy- 5-'β-benzyloxymethylcyclopent-1'α-yl)-acetic acid 1,2'-lactone.

In a similar manner, (2'α-hydroxy-4'α-p-phenylbenzoyloxy-3'β-iodo-5'β-methoxymethylcyclopent-1'α-yl)-acetic acid 1,2'-lactone is converted into (2'α-hydroxy-4'α-p-phenylbenzoyloxy-5'β-methoxymethylcyclopent-1'α-yl)-acetic acid 1,2'-lactone.

PREPARATION 8

A. To a prehydrogenated suspension of 1 g. of 10 percent palladium charcoal catalyst in 200 ml. of anhydrous dimethoxyethane are added 10 g. of (2'α-hydroxy-4'α-p-phenylbenzoyloxy-5'β-benzyloxymethylcyclopent-1'α-yl)-acetic acid 1,2'-lactone and 1 ml. of perchloric acid, and the mixture is stirred under hydrogen atmosphere until the absorption of hydrogen ceases. The catalyst is then separated by filtration and washed with ether. The combined organic filtrates are washed with sodium bicarbonate solution, dried over magnesium sulfate and evaporated to dryness under reduced pressure. Crystallization of the residue from chloroform yields (2'α-hydroxy-4'α-p-phenylbenzoyloxy-5'β-hydroxymethylcyclopent-1'α-yl)-acetic acid 1,2'-lactone (8).

B. A stirred solution of 15 g. of (2'α-hydroxy-4'α-p-phenylbenzoyloxy-5'β-methoxymethylcyclopent-1'α-yl)-acetic acid 1,2'-lactone in 190 ml. of anhydrous methylene chloride is cooled to −78°C. in a dry ice-acetone bath and treated with 25 ml. of boron tribromide. The stirred mixture is allowed to warm rapidly to 0°C. and kept at this temperature for 50 minutes. To the resultant solution is then added 270 ml. of ether to decompose excess boron tribromide, maintaining the reaction mixture at 0°C. It is then poured into a vigorously stirred slurry of 95 g. of sodium bicarbonate in 500 ml. of a saturated solution of sodium potassium tartrate; the organic layer is separated and the aqueous phase extracted with methylene chloride. The combined organic extracts are dried over magnesium sulfate and evaporated to dryness under reduced pressure. The residue is purified by crystallization from chloroform to afford (2'α-hydroxy-4'α-p-phenylbenzoyloxy-5'β-hydroxymethylcyclopent-1'α-yl)-acetic acid 1,2'-lactone, identical to the product obtained in Part A.

C. To a suspension of 300 g. of Celite, diatomaceous earth (dried for 24 hours at 105°C) and 61.5 g. of chromium trioxide-dipyridine complex [prepared as described by J. C. Collins, et al., *Tetrahedron Letters* 3363, (1968)] in 610 ml. of anhydrous methylene chloride, cooled to −5°C. are added under stirring 10 g. of (2'α-hydroxy-4'α-p-phenylbenzoyloxy-5'β-hydroxymethylcyclopent-1'α-yl)-acetic acid 1,2'-lactone dissolved in 60 ml. of methylene chloride and the mixture is stirred for 10 minutes further, maintaining the temperature between −5° and 0°C.; 100 g. of sodium bisulfite monohydrate are then added and the mixture is stirred for an additional 10-minute period, filtered through magnesium sulfate and the solids washed with methylene chloride, receiving the filtrate in a flask cooled to −60°C. in a dry ice-acetone bath. The combined filtrates are evaporated to dryness under reduced pressure, at a temperature below 0°C, obtaining (2'α-hydroxy-4'α-p-phenylbenzoyloxy-5'β-formylcyclopent-1'α-yl)-acetic acid 1,2'-lactone (9) as an homogeneous oil.

PREPARATION 8'

By following the oxidation method of part C of Preparation 8, starting from the 1'R-antimer of (8), namely 1'R-(2'α-hydroxy-4'α-p-phenylbenzoyloxy-5'β-hydroxymethylcyclopent-1'α-yl)-acetic acid 1,2'-lactone [obtained as described by E. J. Corey, et al., in *J. Am. Chem. Soc.* 93, 1491, (1971)] there is obtained 1'R-(2'α-hydroxy-4'α-p-phenylbenzoyloxy-5'β-formylcyclopent-1'α-yl)-acetic acid 1,2'-lactone (1'R-antimer of 9).

PREPARATION 9

A solution of 22 g. of (2'α,4'α-dihydroxy-3'β-iodo-5'β-benzyloxymethylcyclopent-1'α-yl)-acetic acid 1,2'-lactone in 60 ml. of anhydrous pyridine is cooled to 0°C. and treated dropwise, under stirring, with a mixture of 8 ml. of phosphorous oxychloride and 20 ml. of pyridine. When the addition is complete, the reaction is stirred for 30 minutes at room temperature, and the solvent is eliminated under reduced pressure. The oily residue is dissolved in methylene chloride, and the organic solution washed with 10 percent hydrochloric acid solution, reextracting the aqueous phases with methylene chloride.

The combined organic extracts are then washed with saturated sodium sulfite solution until complete decoloration, dried over magnesium sulfate and evaporated to dryness under reduced pressure to yield (2'α-hydroxy-5'β-benzyloxymethylcyclopent-3'-en-1'α-yl)-acetic acid 1,2'-lactone (13, $R^8$ = benzyl) as a colorless oil.

In a similar manner, starting from (2'α,4'α-dihydroxy-3'β-iodo-5'β-methoxymethylcyclopent-1'α-yl)-acetic acid 1,2'-lactone there is obtained (2'α-hydroxy-5'β-methoxymethylcyclopent-3'-en-1'α-yl)-acetic acid 1,2'-lactone (13, $R^8$ = methyl).

PREPARATION 9'

Substituting 1'R-(2'α,4'α-dihydroxy-3'β-iodo-5'β-benzyloxymethylcyclopent-1'α-yl)-acetic acid 1,2'-lactone obtained as described by E. J. Corey, et al., in *J. Am. Chem. Soc.* 93, 1491, (1971), for (2'α,4'α-dihydroxy-3'β-iodo-5'β-benzyloxymethylcyclopent-1'α-yl)-acetic acid 1,2'-lactone in the procedure of Preparation 9 is productive of 1'R-(2'α-hydroxy-5'β-benzyloxymethylcyclopent-3'-en-1'α-yl)-acetic acid 1,2'-lactone, (1'R-antimer of 13, $R^8$ = benzyl).

Likewise the substitution of 1'R-(2'α,4'α-dihydroxy-3'β-iodo-5'β-methoxymethylcyclopent-1'α-yl)-acetic acid 1,2'-lactone (obtained as described by E. J. Corey, et al., in *J. Am. Chem. Soc.* 92, 397, (1970), in Preparation 9 is productive of 1'R-(2'α-hydroxy-5'β-methoxymethylcyclopent-3'-en-1'α-yl)-acetic acid 1,2'-lactone (1'R-antimer of 13, $R^8$ = methyl).

PREPARATION 10

A stirred solution of 13 g. of (2'α-hydroxy-5'β-benzyloxymethylcyclopent-3'-en-1'α-yl)-acetic acid 1,2'-lactone in 20 ml. of methanol is cooled to 0°C. and treated dropwise with a solution of 6.5 g. of sodium hydroxide in 65 ml. of water; when the addition is complete the reaction mixture is stirred for 1 hour at room temperature. The methanol is then eliminated under reduced pressure at a temperature below 30°C., and the resulting aqueous solution cooled to 0°C and extracted with ether, to eliminate the unsaponifiable products. The aqueous phase is carefully acidified to pH 5–6 with 3N hydrochloric acid at 0°C., 100 ml. of ethyl acetate are then added and thereafter the reaction is acidified to pH 2–3. The organic phase is separated and the aqueous phase is saturated with sodium chloride, extracting it with six 50 ml. portions of ethyl acetate. The combined extracts are washed with saturated sodium chloride solution, dried over magnesium sulfate and evaporated to dryness under vacuo. Crystallization of the residue from hexane-methylene chloride gives the pure (2'α-hydroxy-5'β-benzyloxymethylcyclopent-3'-en-1'α-yl)-acetic acid (14, $R^8$ = benzyl).

In a similar manner (2'α-hydroxy-5'β-methoxymethylcyclopent-3'-en-1'α-yl)-acetic acid 1,2'-lactone is converted into (2'α-hydroxy-5'β-methoxymethylcyclopent-3'-en-1'α-yl)-acetic acid (14, $R^8$ = methyl).

PREPARATION 10'

In accordance with the method of Preparation 10, 1'R-(2'α-hydroxy-5'β-benzyloxymethylcyclopent-3'-en-1'α-yl)-acetic acid 1,2'-lactone and 1'R-(2'α-hydroxy-5'β-methoxymethylcyclopent-3'-en-1'α-yl)-acetic acid 1,2'-lactone are converted respectively into 1'R-(2'α-hydroxy-5'β-benzyloxymethylcyclopent-3'-en-1'α-yl)-acetic acid (1'R-antimer of 14, $R^8$ = benzyl) and 1'R-(2'α-hydroxy-5'β-methoxymethylcyclopent-3'-en-1'α-yl)-acetic acid (1'R-antimer of 14, $R^8$ = methyl).

PREPARATION 11

To a prehydrogenated suspension of 10 g. of Raney nickel in 200 ml. of methanol is added 13 g. of (2'α-hydroxy-5'β-benzyloxymethylcyclopent-3'-en-1'α-yl)-acetic acid, and the mixture is stirred under hydrogen atmosphere until the uptake of hydrogen ceases; the catalyst is then separated by filtration and washed well with ether. The combined organic filtrates are evaporated to dryness under reduced pressure and the oily residue is dissolved in 200 ml. of ethylacetate. The resultant solution is then treated with 3N hydrochloric acid until a pH of 2–3 is obtained, stirring the reaction mixture for 30 additional minutes. It is then neutralized with sodium bicarbonate, dried over magnesium sulfate and evaporated to dryness under vacuo, thus yielding (2'α-hydroxy-5'β-benzyloxymethylcyclopent-1'α-yl)-acetic acid 1,2'-lactone, (15, $R^8$ = benzyl) homogeneous on t.l.c.

In a similar manner, (2'α-hydroxy-5'β-methoxymethylcyclopent-4'-en-1'α-yl)-acetic acid is converted into (2'α-hydroxy-5'β-methoxymethylcyclopent-1'α-yl)-acetic acid 1,2'-lactone (15, $R^8$ = methyl).

PREPARATION 11'

In accordance with the method of Preparation 11, 1'R-(2'α-hydroxy-5'β-benzyloxymethylcyclopent-3'-en-1'α-yl)-acetic acid and 1'R-(2'α-hydroxy-5'β-methoxymethylcyclopent-3'-en-1'α-yl)-acetic acid are converted respectively into 1'R-(2'α-hydroxy-5'β-benzyloxymethylcyclopent-1'α-yl)-acetic acid 1,2'-lactone (1'R-antimer of 15, $R^8$ = benzyl) and 1'R-(2'α-hydroxy-5'β-methoxymethylcyclopent-1'α-yl)-acetic acid 1,2'-lactone (1'R-antimer of 15, $R^8$ 32 methyl).

PREPARATION 12

By following the method of Preparation 8, Parts A and B, respectively, (2'α-hydroxy-5'β-benzyloxymethylcyclopent-1'α-yl)-acetic acid 1,2'-lactone and (2'α-hydroxy-5'β-methoxymethylcyclopent-1'α-yl)-acetic acid 1,2'-lactone are converted into (2'α-hydroxy-5'β-hydroxymethylcyclopent-1'α-yl)-acetic acid 1,2'-lactone, which upon oxidation with chromium trioxide-dipyridine complex, in accordance with the method of Part C of preparation 8, affords (2'α-hydroxy-5'β-formylcyclopent-1'α-yl)-acetic acid 1,2'-lactone.

PREPARATION 12'

By following the methods of Preparation 8, Parts A and B, respectively, 1'R-(2'α-hydroxy-5'β-benzyloxymethylcyclopent-1'α-yl)-acetic acid 1,2'-lactone and 1'R-(2'α-hydroxy-5'β-methoxymethylcyclopent-1'α-yl)-acetic acid 1,2'-lactone are converted into 1'R-(2'α-hydroxy-5'β-hydroxymethylcyclopent-1'α-yl)-acetic acid 1,2'-lactone, which upon oxidation with chromium trioxide-dipyridine complex, in accordance with the method of part C of Preparation 8, affords 1'R-(2'α-hydroxy-5'β-formylcyclopent-1'α-yl)-acetic acid 1,2'-lactone.

PREPARATION 13

A. A solution of 100 g. of dimethyl methylphosphonate in 670 ml. of anhydrous tetrahydrofuran is cooled to −78°C. under an argon atmosphere. To the cold solution are added dropwise under stirring and under argon atmosphere, 495 ml. of a 0.1M solution of n-butyllithium in tetrahydrofuran, maintaining the temperature at −70°C. When the addition is complete the reaction mixture is maintained under the same conditions for 10 additional minutes, a solution of 58 ml. of methyl caproate dissolved in 187 ml. of tetrahydrofuran is then carefully added, maintaining the temperature at −78°C. The reaction mixture is stirred at −78°C. for 2 hours followed by stirring for 4 hours at room temperature. The excess base is neutralized with acetic acid and the solvent is evaporated under high vacuo. The residue is dissolved in etherwater (1:1, 950 ml. each), the ethereal phase is separated, washed with water and dried over magnesium sulfate. The ether is evaporated and the residue is purified by vacuum distillation, thus obtaining the pure dimethyl 2-oxoheptylphosphonate.

In a similar manner but using methyl n-butanoate, methyl n-pentanoate, ethyl n- heptanoate, ethyl n-octanoate and methyl n-undecanoate in place of methyl caproate, there are respectively obtained: dimethyl 2-oxopentylphosphonate, dimethyl-2-oxohexylphosphonate, dimethyl 2-oxo-octylphosphonate, dimethyl 2-oxononylphosphonate and dimethyl 2-oxododecylphosphonate.

B. To a suspension of 1.55 g. of sodium hydride (previously washed with pentane, under argon) in 355 ml. of dimethoxyethane freshly distilled from lithium aluminum hydride is added, under stirring and under an atmosphere of argon, a solution of 7.1 g. of dimethyl 2-oxoheptylphosphonate in 150 ml. of dimethoxyethane. The reaction mixture is stirred for 30 minutes at room temperature and 10 g. of (2'α-hydroxy-4'α-p-phenylbenzoyloxy-5'β-formylcyclopent-1'α-yl)-acetic acid 1,2'-lactone are added. The reaction mixture is stirred at room temperature for 2 hours further, it is then carefully neutralized with acetic acid (to pH 7) and evaporated to dryness under reduced pressure at a temperature below 30°C. The solid residue is purified by chromatography on Florisil, using methylene chloride as eluant, to obtain [2'α-hydroxy-4'α-p-phenylbenzoyloxy-5'β-(3''-oxo-oct-1''(t)-en-1''-yl)-cyclopent-1'α-yl]-acetic acid 1,2'-lactone (10, $n$ = 4) and a small amount of dimethyl 2-oxoheptylphosphonate.

Likewise but using dimethyl 2-oxopentylphosphonate, dimethyl 2-oxohexylphosphonate, dimethyl 2-oxooctylphosphonate, dimethyl 2-oxononylphosphonate and dimethyl 2-oxododecylphosphonate in place of dimethyl 2-oxoheptylphosphonate, there are produced:

[2'α-hydroxy-4'α-p-phenylbenzoyloxy-5'β-(3''-oxohex-1''(t)-en-1''-yl)-cyclopent-1'α-yl]-acetic acid 1,2'-lactone,

[2'α-hydroxy-4'α-p-phenylbenzoyloxy-5'β-(3''-oxohept-1''(t)-en-1''-yl)-cyclopent-1'α-yl]-acetic acid 1,2'-lactone,

[2'α-hydroxy-4'α-p-phenylbenzoyloxy-5'β-(3''-oxonon-1''(t)-en-1''-yl)-cyclopent-1'α-yl]-acetic acid 1,2'-lactone,

[2'α-hydroxy-4'α-p-phenylbenzoyloxy-5'β-(3''-oxodec-1''(t)-en-1''-yl)-cyclopent-1'α-yl]-acetic acid 1,2'-lactone, and

[2'α-hydroxy-4'α-p-phenylbenzoyloxy-5'β-(3''-oxotridec-1''(t)-en-1''-yl)-cyclopent-1'α-yl]-acetic acid 1,2'-lactone.

In a similar manner, (2'α-hydroxy-5'β-formycyclopent-1'α-yl)-acetic acid 1,2'-lactone is converted into

[2'α-hydroxy-5'β-(3''-oxo-oct-1''(t)-en-1''-yl)-cyclopent-1'α-yl]-acetic acid 1,2'-lactone and [2-'α-hydroxy-5'β-(3''-oxodec-1''(t)-en-1''-yl)-cyclopent-1''α-yl]-acetic acid 1,2'-lactone.

PREPARATION 13'

In accordance with the method described in Part B of Preparation 13, 1'R-(2'α-hydroxy-4'α-p-phenylbenzoyloxy-5'β-formylcyclopent-1'α-yl)-acetic acid 1,2'-lactone is converted into 1:R-[2'α-hydroxy-4'α-p-phenylbenzoyloxy-5'β-(3''-oxo-oct-1''(t)-en-1''-yl)-cyclopent-1'α-yl]-acetic acid 1,2'-lactone (1'R-antimer of 10, $n=4$).

Likewise but using dimethyl 2-oxopentylphosphonate, dimethyl 2-oxohexylphosphonate, dimethyl 2-oxooctylphosphonate, dimethyl 2-oxononylphosphonate and dimethyl 2-oxododecylphosphonate in place of dimethyl 2-oxoheptylphosphonate, there are produced:

1'R-[2'α-hydroxy-4'α-p-phenylbenzoyloxy-5'β-(3''-oxohex-1''(t)-en-1''-yl)-cyclopent-1'α-yl]-acetic acid 1,2'-lactone.

1'R-[2'α-hydroxy-4'α-p-phenylbenzoyloxy-5'β-(3''-oxohept-1''(t)-en-1''-yl)-cyclopent-1'α-yl]-acetic acid 1,2'-lactone, 1'R-[2'α-hydroxy-4'α-p-phenylbenzoyloxy-5'β-(3''-oxonon-1''(t)-en-1''-yl)-cyclopent-1'α-yl]-acetic acid 1,2'-lactone, 1'R-[2'α-hydroxy-4'α-p-phenylbenzoyloxy-5'β-(3''-oxodec-1''(t)-en-1''-yl)-cyclopent-1'α-yl]-acetic acid 1,2'-lactone, and 1'R-[2'α-hydroxy-4'α-p-phenylbenzoyloxy-5'β-(3''-oxotridec-1''(t)-en-1''-yl)-cyclopent-1'α-yl]-acetic acid 1,2'-lactone, respectively.

In a similar manner, 1'R-(2'α-hydroxy-5'β-formylcyclopent-1'α-yl)-acetic acid 1,2'-lactone is converted into 1'R-[2'α-hydroxy-5'β-(3''-oxo-oct-1'''(t)-en-1''-yl)-cyclopent-1'α-yl]-acetic acid 1,2'-lactone and 1'R-[2'α-hydroxy-5'β-(3''-oxo-dec-1'''(t)-en-1''-yl)-cyclopent-1'α-yl]-acetic acid 1,2'-lactone, using the appropriate reagent.

PREPARATION 14

To a stirred solution of 5.34 g. of [2'α-hydroxy-4'α-p-phenylbenzoyloxy-5'β-(3''-oxo-oct-1'''(t)-en-1''-yl)-cyclopent-1'α-yl]-acetic acid 1,2'-lactone in 36 ml. of dimethoxyethane freshly distilled from lithium aluminum hydride are added 9 ml. of zinc borohydride reagent in anhydrous dimethoxyethane. The reaction mixture is stirred for an additional hour at room temperature, and treated with a saturated solution of sodium bitartrate until the evolution of gas ceases. It is then diluted with methylene chloride, dried over magnesium sulfate and evaporated to dryness under vacuo at a temperature below 30°C. to yield [2'α-hydroxy-4'α-p-phenylbenzoyloxy-5'β-(3''α-hydroxyoct-1''(t)-en-1''-yl)-cyclopent-1'α-yl]-acetic acid 1,2'-lactone (11, $R^9 =$ p-phenylbenzoyl; $n = 4$) in mixture with the 3''β-hydroxy isomer.

The oily mixture is separated into the individual isomers by t.l.c. using a mixture of benzene-methylisobutyl ketone (2:1) as eluant.

Similarly the remaining 3''-oxo compounds obtained in Preparation 13 are converted into the respective 3''-hydroxy compounds, namely:

[2'α-hydroxy-4'α-p-phenylbenzoyloxy-5'β-(3''α-hydroxyhex-1''(t)-en-1''-yl)-cyclopent-1'α-yl]-acetic acid 1,2'-lactone,

[2'α-hydroxy-4'α-p-phenylbenzoyloxy-5'β-(3''α-hydroxyhept-1''(t)-en-1''-yl)-cyclopent-1'α-yl]-acetic acid 1,2'-lactone,

[2'α-hydroxy-4'α-p-phenylbenzoyloxy-5'β-(3''α-hydroxynon-1''(t)-en-1''-yl)-cyclopent-1'α-yl]-acetic acid 1,2'-lactone,

[2'α-hydroxy-4'α-p-phenylbenzoyloxy-5'β-(3''α-hydroxydec-1''(t)-en-1''-yl)-cyclopent-1'α-yl]-acetic acid 1,2'-lactone,

[2'α-hydroxy-4'α-p-phenylbenzoyloxy-5'β-(3''α-hydroxytridec-1'' (t)-en-1''-yl)-cyclopent-1'α-yl]-acetic acid 1,2'-lactone,

[2'α-hydroxy-5'β-(3''α-hydroxyoct-1''(t)-en-1''-yl)-cyclopent-1'α-yl]-acetic acid 1,2'-lactone and

[2'α-hydroxy-5'β-(3''α-hydroxydec-1''(t)-en-1''-yl)-cyclopent-1'α-yl]-acetic acid 1,2'-lactone, in mixture with the corresponding 3''β-hydroxy isomers, which are separated by thin layer chromatography.

The zinc borohydride reagent is prepared from 0.025 mol of fused zinc chloride, 0.050 mol of sodium borohydride and 50 ml. of dimethoxyethane, stirring the mixture for 16 hours and filtering the insoluble material under argon atmosphere.

PREPARATION 14'

In accordance with the method of Preparation 14, 1-'R-[2'α-hydroxy-4'α-p-phenylbenzoyloxy-5'β-(3''-oxo-oct-1''(t)-en-1''-yl)-cyclopent-1'α-yl]-acetic acid 1,2'-lactone is converted into 1'R-[2'α-hydroxy-4'α-p-phenylbenzoyloxy-5'β-(3''α-hydroxyoct-1''(t)-en-1''-yl)-cyclopent-1'α-yl]-acetic acid 1,2'-lactone (1'R-antimer of 11, $R^9 =$ p-phenylbenzoyl); $n = 4$) in mixture with the corresponding 3''β-hydroxy isomer.

Similarly the remaining 3''-oxo compounds obtained in Preparation 13' are converted into the respective 3''-hydroxy compounds, namely:

1'R-[2'α-hydroxy-4'α-p-phenylbenzoyloxy-5'β-(3''α-hydroxyhex-1''(t)-en-1''-yl)-cyclopent-1'α-yl]-acetic acid 1,2'-lactone, 1'R-[2'α-hydroxy-4'α-p-phenylbenzoyloxy-5'β-(3''α-hydroxyhept-1''(t)-en-1''-yl)-cyclopent-1'α-yl]-acetic acid 1,2'-lactone, 1'R-[2'α-hydroxy-4'α-p-phenylbenzoyloxy-5'β-(3''α-hydroxynon-1'''(t)-en-1'''-yl)-cyclopent-1'α-yl]-acetic acid 1,2'-lactone, 1'R-[2'α-hydroxy-4'α-p-phenylbenzoyloxy-5'β-(3''α-hydroxydec-1'''(t)-en-1'''-yl)-cyclopent-1'α-yl]-acetic acid 1,2'-lactone, 1'R-[2'α-hydroxy-4'α-p-phenylbenzoyloxy-5'β-(3''α-hydroxytridec-1'''(t)-en-1'''-yl)-cyclopent-1'α-yl]-acetic acid 1,2'-lactone, 1'R-[2'α-hydroxy-5'β-(3''α-hydroxyoct-1'''(t)-en-1'''-yl)-cyclopent-1'α-yl]-acetic acid 1,2'-lactone and 1'R-[2'α-hydroxy-5'β-(3''α-hydroxydec-1'''(t)-en-1'''-yl)-cyclopent-1'α-yl]-acetic acid 1,2'-lactone, in mixture with the corresponding 3''β-hydroxy isomers, which are separated by thin layer chromatography.

PREPARATION 15

A solution of 3.7 g. of [2'α-hydroxy-4'α-p-phenylbenzoyloxy-5'β-(3''α-hydroxyoct-1'''(t)-en-1'''-yl)-cyclopent-1'α-yl]-acetic acid 1,2'-lactone in 37 ml. of anhydrous methanol is treated with 1.14 g. of anhydrous potassium carbonate, and the reaction mixture stirred for 2½ hours at room temperature. It is then cooled to 0°C. and adjusted with 10N aqueous hydrochloric acid until a pH of 2–3 is obtained. Ethyl acetate is added and the organinc solution washed with saturated sodium bicarbonate solution and saturated sodium potassium bitartrate solution, dried over magnesium sulfate and evaporated to dryness under vacuo. The residue is purified by filtration through a Florisil column (130 g.). The fractions eluted with methylene chloride-ethyl acetate give methyl p-biphenylcarboxylate and the fractions eluted with ethyl acetate yield [2',α,4'α-dihydroxy-5'β-(3''α-hydroxyoct-1'''(t)-en-1'''-yl)-cyclopent-1'α-yl]-acetic acid 1,2'-lactone (11, $R^9$ = H; n = 4).

By the same method, from the corresponding 4'α-p-phenylbenzoyloxy compounds there are obtained:

[2',α,4'α-dihydroxy-5'β-(3''α-hydroxyhex-1'''(t)-en-1'''-yl)-cyclopent-1'α-yl]-acetic acid 1,2'-lactone,

[2'α,4'α-dihydroxy-5'β-(3''α-hydroxyhept-1'''(t)-en-1'''-yl)-cyclopent-1'α-yl]-acetic acid 1,2'-lactone,

[2'α,4'α-dihydroxy-5'β-(3''α-hydroxynon-1'''(t)-en-1'''-yl)-cyclopent-1'α-yl -acetic acid 1,2'-lactone,

[2'α,4'α-dihydroxy-5'β-(3''α-hydroxydec-1'''(t)-en-1'''-yl)-cyclopent-1'α-yl]-acetic acid 1,2'-lactone and

[2'α,4'α-dihydroxy-5'β-(3''α-hydroxytridec-1'''(t)-en-1'''-yl)-cyclopent-1'α-yl]-acetic acid 1,2'-lactone.

PREPARATION 15'

By following the method of Preparation 15, 1'R-[2'α-hydroxy-4'α-p-phenylbenzoyloxy-5'β-(3''α-hydroxyoct-1'''(t)-en-1'''-yl)-cyclopent-1'α-yl]-acetic acid 1,2'-lactone is converted into 1'R-[2'α,4'α-dihydroxy-5'β-(3''α-hydroxyoct-1'''(t)-en-1'''-yl)-cyclopent-1'α-yl]-acetic acid 1,2'-lactone (1'R-antimer of 11, $R^9$ = H; n = 4).

By the same method, from the corresponding 1'R.40'α-p-phenylbenzoyloxy compounds of Preparation 14' there are obtained:

1'R-[2'α,4'α-dihydroxy-5'β-(3''α-hydroxyhex-1'''(t)-en-1'''-yl)-cyclopent-1'α-yl]-acetic acid 1,2'-lactone, 1'R-[2'α,4'α-dihydroxy-5'β-(3''α-hydroxyhept-1'''(t)-en-1'''-yl)-cyclopent-1'α-yl]-acetic acid 1,2'-lactone, 1'R-[2'α,4'α-dihydroxy-5'β-(3''α-hydroxynon-1'''(t)-en-1'''-yl)-cyclopent-1'α-yl]-acetic acid 1,2'-lactone, 1'R-[2'α,4'α-dihydroxy-5'β-(3''α-hydroxydec-1'''(t)-en-1'''-yl)-cyclopent-1'α-yl]-acetic acid 1,2'-lactone and 1'R-[2'α,4'α-dihydroxy-5'β-(3''α-hydroxytridec-1'''(t)-en-1'''-yl)-cyclopent-1'α-yl]-acetic acid 1,2'-lactone.

PREPARATION 16

To a solution of 2.3 g. of [2'α,4'α-dihydroxy-5'β(3''α-hydroxyoct-1'''(t)-en-1'''-yl)-cyclopent-1'α-yl]-acetic acid 1,2'-lactone in 23 ml. of methylene chloride are added 2.3 ml. of freshly distilled dihydropyran and 23 mg. of anhydrous p-toluenesulfonic acid. The reaction mixture is stirred for 15 minutes at room temperature, a few drops of pyridine are added and diluted with ether. The ethereal solution is washed with 100 ml. of 50 percent aqueous sodium chloride solution and then with saturated sodium chloride solution. The organic phase is separated, dried over magnesium sulfate and evaporated to dryness under reduced pressure, at approximately 0°C., thus yielding [2'α-hydroxy-4'α-tetrahydropyranyloxy-5'β-(3''α-tetrahydropyranyloxyoct-1'''(t)-en-1'''-yl)-cyclopent-1'α-yl]-acetic acid 1,2'-lactone, (12, n = 4) as an oil.

Similarly, the remaining compounds obtained in Preparation 15 are converted respectively into:

[2'α-hydroxy-4'α-tetrahydropyranyloxy-5'β-(3''α-tetrahydropyranyloxyhex-1'''(t)-en-1'''-yl)-cyclopent-1'α-yl]-acetic acid 1,2'-lactone,

[2'α-hydroxy-4'α-tetrahydropyranyloxy-5'β-(3''α-tetrahydropyranyloxyhept-1'''(t)-en-1'''-yl)-cyclopent-1'α-yl]-acetic acid 1,2'-lactone,

[2'α-hydroxy-4'α-tetrahydropyranyloxy-5'β-(3''α-tetrahydropyranyloxynon-1'''(t)-en-1'''-yl)-cyclopent-1'α-yl]-acetic acid 1,2'-lactone,

[2'α-hydroxy-4'α-tetrahydropyranyloxy-5'β-(3''α-tetrahydropyranyloxydec-1'''(t)-en-1'''-yl)-cyclopent-1'α-yl]-acetic acid 1,2'-lactone and

[2'α-hydroxy-4'α-tetrahydropyranyloxy-5'β-(3''α-tetrahydropyranyloxytridec 1'''(t)-en-1'''-yl)-cyclopent-1'α-yl]-acetic acid 1,2'-lactone.

In a similar manner, [2'α-hydroxy-5'β-(3''α-hydroxyoct-1'''(t)-en-1'''-yl)-cyclopent-1'α-yl]-acetic acid 1,2'-lactone and [2'α-hydroxy-5'β-(3''α-hydroxydec-1'''(t)-en-1'''-yl)-cyclopent-1'α-yl]-acetic acid 1,2'-lactone are converted respectively into [2'α-hydroxy-5'β-(3''α-tetrahydropyranyloxyoct-1'''(t)-en-1'''-yl)-cyclopent-1'α-yl]-acetic acid 1,2'-lactone and [2'α-hydroxy-5'β-(3''α-tetrahydropyranyloxydec-1'''(t)-en-1'''-yl)-cyclopent-1'α-yl]-acetic acid 1,2'-lactone.

PREPARATION 16'

By following the method of Preparation 16, 1'R-[2'α,4'α-dihydroxy-5'β-(3''α-hydroxyoct-1'''(t)-en-1'''-yl)-cyclopent-1'α-yl]-acetic acid 1,2'-lactone is converted into 1'R-[2'β-hydroxy-4'β-tetrahydropyranyloxy-5'β-(3''α- tetrahydropyranyloxyoct-1'''(t)-en-1'''-yl)-cyclopent-1'α-yl]-acetic acid 1,2'-lactone (1'R-antimer of 12, n = 4) as an oil.

Similarly, the remaining 1'R compounds obtained in Preparation 15' are converted respectively into:

1'R-[2'α-hydroxy-4'α-tetrahydropyranyloxy-5'β-(3''α-tetrahydropyranyloxyhex-1'''(t)-en-1'''-yl)-cyclopent-1'α-yl]-acetic acid 1,2'-lactone, 1'R-[2'α-hydroxy-4'α-tetrahydropyranyloxy-5'β-(3''α-tetrahydropyranyloxyhept-1'''(t)-en-1'''-yl)-cyclopent-1'α-yl]-acetic acid 1,2'-lactone, 1'R-[2'α-hydroxy-4'α-tetrahydropyranyloxy-5'β-(3''α-tetrahydropyranyloxynon-1'''(t)-en-1'''-yl)-cyclopent-1'α-yl]-acetic acid 1,2'-lactone, 1'R-[2'α-hydroxy-4'α-tetrahydropyranyloxy-5'β-(3''α-tetrahydropyranyloxydec-1'''(t)-en-1'''-yl)-cyclopent-1'α-yl]-acetic acid 1,2'-lactone and 1'R-[2'α-hydroxy-4'α-tetrahydropyranyloxy-5'β-(3''α-tetrahydropyranyloxytridec-1'''(t)-en-1'''-yl)-cyclopent-1'α-yl] -acetic acid 1,2'-lactone.

In a similar manner 1'R-[2'α-hydroxy-5'β-(3''α-hydroxyoct-1'''(t)-en-1'''-yl)-cyclopent-1'α-yl]-acetic acid 1,2'-lactone and 1'R-[2'α-hydroxy-5'β-(3''α-hydroxydec-1'''(t)-en-1'''-yl)-cyclopent-1'α-yl]-acetic acid 1,2'-lactone are converted respectively into 1'R-[2'α-hydroxy-5'β-(3''α-tetrahydropyranyloxyoct-1'''(t)-en-1'''-yl)-cyclopent-1'α-yl]-acetic acid 1,2'-lactone and 1'R-[2'α-hydroxy-5'β-(3''α-tetrahydropyranloxydec 1'''(t)-en-1'''-yl)-cyclopent-1'α-yl]-acetic acid 1,2'-lactone.

PREPARATION 17

One gram of [2'α-hydroxy-4'α-tetrahydropyranyloxy-5'β-(3''α-tetrahydropyranyloxyoct-1''(t)-en-1''-yl)-cyclopent-1'α-yl]-acetic acid 1,2-lactone is dissolved in 20 ml. of anhydrous toluene. The solution is cooled to −60°C. and to the cold solution is added 3.43 ml. of a mixture of 1 ml. of diisobutyl aluminum hydride and 3 ml. of anhydrous toluene, stirring the reaction mixture for 15 minutes at −60°C. It is then diluted with methanol until the evolution of gase ceases, the mixture is stirred for 15 minutes further at room temperature and diluted with ether. The organic phase is then separated, washed with saturated sodium chloride solution, dried over magnesium sulfate and evaporated to dryness at about 0°C. to produce [2'α-hydroxy-4'α-tetrahydropyranyloxy-5'β-(3''α-tetrahydropyranyloxyoct-1'''(t)-en-1'''-yl)-cyclopent-1'α-yl]-acetaldehyde 1,2'-hemiacetal (IA, n = 4).

Similarly, the remaining compounds obtained in Preparation 16 are converted into the respective lactols, namely:

[2'α-hydroxy-4'α-tetrahydropyranyloxy-5'β-(3''α-tetrahydropyranyloxyhex-1'''(t)-en-1'''-yl)-cyclopent-1'α-yl]-acetaldehyde 1,2'-hemiacetal, 2'α-hydroxy-4'α-tetrahydropyranyloxy-5'β-(3''α-tetrahydropyranyloxyhept-1'''(t)-en-1'''-yl)-cyclopent-1'α-yl]-acetaldehyde 1,2'-hemiacetal, 2'α-hydroxy-4'α-tetrahydropyranyloxy-5'α-(3''α-tetrahydropyranyloxynon-1'''(t)-en-1'''-yl)-cyclopent-1'α-yl]-acetaldehyde 1,2'-hemiacetal,

[2'α-hydroxy-4'α-tetrahydropyranyloxy-5'β-(3''α-tetrahydropyranyloxydec-1'''(t)-en-1'''-yl)-cyclopent-1'α-yl]-acetaldehyde 1,2'-hemiacetal,

[2'α-hydroxy-4'α-tetrahydropyranyloxy-5'β-(3''α-tetrahydropyranyloxytridec-1'''(t)-en-1'''-yl)-cyclopent-1'α-yl]-acetaldehyde 1,2'-hemiacetal,

[2'α-hydroxy-5'β-(3''α-tetrahydropyranyloxyoct-1'''(t)-en-1'''-yl)-cyclopent-1'α-yl]-acetaldehyde 1,2'-hemiacetal and

[2'α-hydroxy-5'-(3''α-tetrahydropyranyloxydec-1'''(t)-en-1'''-yl)-cyclopent-1'α-yl]-acetaldehyde 1,2'-hemiacetal.

PREPARATION 17'

By following the method of Preparation 17, 1'R -[2'α-hydroxy-4'α-tetrahydropyranyloxy-5'β-(3''α-tetrahydropyranyloxyoct-1'''(t)-en-1'''-yl)-cyclopent-1'α-yl]-acetic acid 1,2-lactone is coverted into 1'R-[2'α-hydroxy-4'α-tetrahydropyranyloxy-5'β-(3''α-tetrahydropyranyloxyoct-1'''(t)-en-1'''-yl)-cyclopent-1'α-yl]-acetaldehyde 1,2'-hemiacetal (1'R-antimer of IA, n = 4).

Similarly, the remaining 1'R compounds obtained in Preparation 16' produce the respective lactols, namely:

1'R-[2'α-hydroxy-4'α-tetrahydropyranyloxy-5'β-(3''α-tetrahydropyranyloxyhex-1'''(t)-en-1'''-yl)-cyclopent-1'α-yl]-acetaldehyde 1,2'-hemiacetal, 1'R-[2'α-hydroxy-4'α-tetrahydropyranyloxy-5'β-(3''α-tetrahydropyranyloxyhept-1'''(t)-en-1'''-yl)-cyclopent-1'α-yl]-acetaldehyde 1,2'-hemiacetal, 1'R-[2'α-hydroxy-4'α-tetrahydropyranyloxy-5'β-(3''α-tetrahydropyranyloxynon-1'''(t)-en-1'''-yl)-cyclopent-1'α-yl]-acetaldehyde 1,2'-hemiacetal, 1'R-[2'α-hydroxy-4'α-tetrahydropyranyloxy-5'β-(3''α-tetrahydropyranyloxytridec-1'''(t)-en-1'''-yl)-cyclopent-1'α-yl]-acetaldehyde 1,2'-hemiacetal, 1'R-[2'α-hydroxy-4'α-tetrahydropyranyloxy-5'β-(3'''α-tetrahydropyranyloxytridec-1''(t)-en-1'-yl)-cyclopent 1'α-yl]-acetaldehyde 1,2'-hemiacetal, 1'R-[2'α-hydroxy-5'β-(3''α-tetrahydropyranyloxyoct-1'''(t)-en-1'''-yl)-cyclopent-1'α-yl]-acetaldehyde 1,2'-hemiacetal and 1'R-[2'α-hydroxy-5'β-(3''α-tetrahydropyranyloxydec-1'''(t)-en-1'''-yl)-cyclopent-1'α-yl]-acetaldehyde 1,2'-hemiacetal.

PREPARATION 18

In accordance with the methods described in Preparations 15, 16 and 17, 2 g. of [2'α-hydroxy-4'α-p-phenylbenzoyloxy-5'β-(3''β-hydroxyoct-1'''(t)-en-1'''-yl)-cyclopent-1'α-yl]-acetic acid 1,2'-lactone are converted successively into

[2'α,4'α-dihydroxy-5'β-(3''β-hydroxyoct-1''(t)-en-1'''-yl)-cyclopent-1'α-yl]-acetic acid 1,2'-lactone,

[2'α-hydroxy-4'α-tetrahydropyranyloxy-5'β-(3''β-tetrahydropyranyloxyoct-1'''(t)-en-1'''-yl)-cyclopent-1'α-yl]-acetic acid 1,2'-lactone and

[2'α-hydroxy-4'α-tetrahydropyranyloxy-5'β-(3"β-tetrahydropyranyloxyoct-1"'(t)-en-1"'-yl)-cyclopent-1'α-yl]-acetaldehyde 1,2'-hemiacetal (3"β-isomer of IA)

PREPARATION 18'

In accordance with the methods described in Preparations 15, 16 and 17, 1'R- [2'α-hydroxy-4'α-p-phenylbenzoyloxy-5'β-(3"β-hydroxyoct-1"'(t)-en-1"'-yl)-cyclopent-1'α-yl]-acetic acid 1,2'-lactone is converted successively into 1'R-[2'α,4'α-dihydroxy-5'β-(3"β-hydroxyoct-1"(t)-en-1"-yl)-cyclopent-1'α-yl]-acetic acid 1,2'-lactone,
  1'R-[2'α-hydroxy-4'α-tetrahydropyranyloxy-5'β-(3"β-tetrahydropyranyloxyoct-1"'(t)-en-1"'-yl)-cyclopent-1'α-yl]-acetic acid 1,2'-lactone and
  1'R-[2'α-hydroxy-4'α-tetrahydropyranyloxy-5'β-(3"β-tetrahydropyranyloxyoct-1"'(t)-en-1"'-yl)-cyclopent-1'α-yl]-acetaldehyde 1,2'-hemiacetal (3"β-isomer of the 1'R-antimer of 1A)

EXAMPLE 1

A mixture of 2.14 g. of pent-4-yn-1-ol and 250 ml. of anhydrous ether is cooled under an argon atmosphere to −70°C. in a dry ice-acetone bath. To the stirred cold mixture is added dropwise 26.2 ml. of 2M methyllithium in ether. After addition of this reagent, the reaction mixture is allowed to attain room temperature, stirring for 18 hours further. A solution of 380 mg. of [2'α-hydroxy-4'α-tetrahydropyranyloxy-5'β-(3"α-tetrahydropyranyloxyoct-1"'(t)-en-1"'-yl)-cyclopent-1'α-yl]-acetaldehyde 1,2'-hemiacetal (I, $R^{1'}$ = tetrahydropyranyloxy; $n = 4$) in 5 ml. of anhydrous ether is added, and the mixture is stirred for 6 hours at room temperature. It is then poured into ice water and extracted several times with ether. The combined organic extracts are washed with saturated sodium chloride solution, dried over magnesium sulfate and evaporated to dryness under reduced pressure, at a temperature not higher than 20°C. The residue is purified by chromatography on Florisil. The fractions eluted with ethyl acetate-methanol (90:10) give 1,6{,9α-trihydroxy-11α,15α-bistetrahydropyranyloxyprost-4-yn-13-trans-ene (II, $R^{1'}$ = tetrahydropyranyloxy; $n = 4$).

The 6α and 6β-hydroxy isomers can be separated by t.l.c. on silica gel, using a mixture of methylene chloride-ether (1:1) as eluant.

In a similar manner, [2'α-hydroxy-5'β-(3"α-tetrahydropyranyloxyoct-1"'(t)-en-1"'-yl)-cyclopent-1'α-yl]-acetaldehyde 1,2'-hemiacetal is converted into 1,6{,9α-trihydroxy15α-tetrahydropyranyloxyprost-4-yn-13-trans-ene (II, $R^{1'}$ = H; $n = 4$).

Likewise, [2'α-hydroxy-4'α-tetrahydropyranyloxy-5'β-(3"α-tetrahydropyranyloxyhex-1"(t)-en-1"'-yl)-cyclopent-1'α-yl]-acetaldehyde 1,2'-hemiacetal,
  [2'α-hydroxy-4'α-tetrahydropyranyloxy-5'β-(3"α-tetrahydropyranyloxyhept-1"(t)-en-1"'-yl)-cyclopent-1'α-yl]-acetaldehyde 1,2'-hemiacetal,
  [2'α-hydroxy-4'α-tetrahydropyranyloxy-5'β-(3"α-tetrahydropyranyloxynon-1"'(t)-en-1"'-yl)-cyclopent-1'α-yl]-acetaldehyde 1,2'-hemiacetal and
  [2'α-hydroxy-4'α-tetrahydropyranyloxy-5'β-(3"α-tetrahydropyranyloxytridec-1"'(t)-en-1"'-yl)-cyclopent-1'α-yl]-acetaldehyde 1,2'-hemiacetal, are converted respectively into:
  1,6{,9α-trihydroxy-11α,15α-bistetrahydropyranyloxy-20-bisnorprost-4-yn-13-trans-ene,
  1,6{,9α-trihydroxy-11α,15α-bistetrahydropyranyloxy-20-norprost4-yn-13-trans-ene,
  1,6{,9α-trihydroxy-11α,15α-bistetrahydropyranyloxy-20-methylprost-4-yn-13-trans-ene, and
  1,6{,9α-trihydroxy-11α,15α-bistetrahydropyranyloxy-20-pentylprost-4-yn-13-trans-ene.

EXAMPLE 1A

By following the method of Example 1, 1'R-[2'α-hydroxy-4'α-tetrahydropyranyloxy-5'β-(3"α-tetrahydropyranyloxyoct-1"'(t)-en-1"'-yl)-cyclopent-1'α-yl]-acetaldehyde 1,2'-hemiacetal is converted into 8R1,6{,9α-trihydroxy-11α,15α-bistetrahydropyranyloxyprost-4-yn-13-trans-ene (8R-antimer of II, $R^{1'}$ = tetrahydropyranyloxy; $n = 4$).

The 6α and 6β-hydroxy isomers can be separated by t.l.c. on silica gel, using a mixture of methylene chlorideether (1:1) as eluant.

In a similar manner, 1'R-[2'α-hydroxy-5'β-(3"α-tetrahydropyranyloxyoct-1"'(t)-en-1"'-yl)-cyclopent-1'α-yl]-acetaldehyde 1,2'-hemiacetal is converted into 8R-1,6 ,9α-trihydroxy-15α-tetrahydropyranyloxyprost-4-yn-13-trans-ene (8R-antimer of II, $R^{1'}$ = H; $n = 4$).

Likewise, 1'R-[2'α-hydroxy-4'α-tetrahydropyranyl 1-oxy-5'β-(3"α-tetrahydropyranyloxyhex-1" (t)-en-1"-yl)-cyclopent-1'α-yl]-acetaldehyde 1,2'-hemiacetal,
  1'R-[2'α-hydroxy-4'α-tetrahydropyranyloxy-5'β-(3"α-tetrahydropyranyloxyhept-1"(t)-en-1"'-yl)-cyclopent-1'α-yl]-acetaldehyde 1,2'-hemiacetal,
  1'R-[2'α-hydroxy-4'α-tetrahydropyranyloxy-5'β-(3"α-tetrahydropyranyloxynon-1"(t)-en-1"'-yl)-cyclopent-1'α-yl]-acetaldehyde 1,2'-hemiacetal and
  1'R-[2'α-hydroxy-4'α-tetrahydropyranyloxy-5'β-(3"α-tetrahydropyranyloxytridec-1"'(t)-en-1"'-yl)-cyclopent-1'α-yl]-acetaldehyde 1,2'-hemiacetal, are converted respectively into:
  8R-1,6 ,9α-trihydroxy-11α,15α-bistetrahydropyranyloxy-20-bis-norprost-4-yn-13-trans-ene,
  8R-1,6{,9α-trihydroxy-11α,15α-bistetrahydropyranyloxy-20-norprost-4-yn-13-trans-ene,
  8R-1,6{,9α-trihydroxy-11α,15α-bistetrahydropyranyloxy-20-methylprost-4-yn-13-trans-ene, and
  8R-1,6{,9α-trihydroxy-11α,15α-bistetrahydropyranyloxy-20-pentylprost-4-yn-13-trans-ene.

EXAMPLE 2

A mixture of 300 mg. of 1,6{,9α-trihydroxy-11α,15α-bistetrahydropyranyloxyprost-4-yn-13-trans-ene, 2 ml. of pyridine and 0.2 ml. of acetyl chloride is stirred at room temperature for 6 hours. It is then poured into water and extracted with ether. The organic extract is washed with saturated sodium chloride solution, dried over magnesium sulfate and evaporated to dryness under vacuo to yield 1,6{,9α-triacetoxy-11α,15α-bistetrahydropyranyloxyprost-4-yn-13-trans-ene (III, $R^{1'}$ = tetrahydropyranyloxy; $n = 4$) which can be purified by filtration through Florisil.

By the same method 1,6{,9α-trihydroxy-15α-tetrahydropyranyloxyprost-4-yn-13trans-ene is converted into 1,6{,9α-triacetoxy-15α-tetrahydropyranyloxyprost-4-yn-13-trans-ene (III, $R^{1'}$ = H; n = 4).

Similarly, the remaining 1,6{,9α-trihydroxy compounds obtained in Example 1 are converted into the corresponding 1,6 ,9α-triacetoxy derivatives.

EXAMPLES 2A

By following the method of Example 2, 8R-1,6{,9α-trihydroxy-11α,15α-bistetrahydropyranyloxyprost-4-yn-13-trans-ene is converted into 8R-1,6{,9α-triacetoxy-11α,15α-bistetrahydropyranyloxyprost-4-yn-13-trans-ene, (8R-antimer of III, $R^{1'}$ = tetrahydropyranyloxy; $n = 4$).

By the same method starting from 8R-1,6 ,9α-trihydroxy-15α-tetrahydropyranyloxyprost-4-yn-13-trans-ene there is obtained 8R-1,6{,9α-triacetoxy-15α-tetrahydropyranyloxyprost-4-yn-13-trans-ene (8R-antimer of III, $R^{1'}$ = H; $n = 4$).

Similarly, the remaining 8R-1,6{,9α-trihydroxy compounds obtained in Example 1A are converted into the corresponding 8R-1,6{,9α-triacetoxy derivatives.

EXAMPLE 3

A stirred suspension of 117.5 mg. of cuprous iodide in 2 ml. of anhydrous ether is cooled to about −10°C. under an atmosphere of argon, and treated with two molar equivalents of a 2M solution of methyllithium in ether. The resultant colorless solution is cooled to −75°C. in a dry ice-acetone bath, a solution of 100 mg. of 1,6{,9α-triacetoxy-11α,15α-bistetrahydropyranyloxyprost-4-yn-13trans-ene in 3 ml. of anhydrous ether is then added and the reaction mixture stirred at −75°C. for 5 hours. The temperature of the mixture is raised to −10°C., saturated ammonium chloride solution is added and the mixture is stirred for 1 hour and extracted with ether. The organic extract is washed with saturated sodium chloride solution, dried over magnesium sulfate and evaporated to dryness under reduced pressure. The residue is purified by chromatography on Florisil. The fractions eluted with methylene chloride-ether (80:20) afford the pure 1,9α-diacetoxy-11α,15α-bistetrahydropyranyloxyprosta-4,5,13-trans-triene (VIII, $R^{1'}$ = tetrahydropyranyloxy; R and $R^5 = H$; $n = 4$). -trans-ene, In a similar manner, but using 1,6{,9α-triacetoxy-15α-tetrahydropyranyloxyprost-4-yn-13-trans-ene, 1,-6{,9α-triacetoxy-11α,15α-bistetrahydropyranyloxy-20-bisnorprost-4-yn-13Trans-ene, 1,6{,9α-triacetoxy-11α,15α-bistetrahydropyranyloxy-20-norporst-4-yn-13-trans-ene, 1,6{,9α-triacetoxy-11α,15α-bistetrahydropyranyloxy-20-methylprost-4-ny-13-trans-ene, and 1,6{,9α-triacetoxy-11α,15α-bistetrahydropyranyloxy-20-pentylprost-4-yn-13-trans-ene as starting compounds, there are obtained;

1,9α-diacetoxy-15α-tetrahydropyranyloxyprosta-4,5,13-trans-triene, 1,9α-diacetoxy-11α,15α-bistetrahydropyranyloxy-20-bisnorprosta-4,5,13-trans-triene, 1,9α-diacetoxy-11α,15α-bistetrahydropyranyloxy-20-norprosta-4,5,13-trans-triene, 1,9α-diacetoxy-11α,15α-bistetrahydropyranyloxy-20-methylprosta-4,5,13-trans-triene and 1,9α-diacetoxy-11α,15α-bistetrahydropyranyloxy-20-pentylprosta-4,5,13-trans-triene, respectively.

EXAMPLE 3A

By following the method of Example 3, 8R-1,6{,9α-triacetoxy-11α,15α-bistetrahydropyranyloxyprost-4-yn-13-trans-ene is converted into 8R-1,9α-diacetoxy-11α,15α-bistetrahydropyranyloxyprosta-4,5,13-trans-triene (8R-antimer of VIII, $R^{1'}$ = tetrahydropyranyloxy; R and $R^5 = H$, and $n = 4$).

In a similar manner, but using 8R-1,6{,9α-triacetoxy-15α-tetrahydropyranyloxyprost-4-yn-13-trans-ene, 8R-1,6{,9α-triacetoxy-11α,15α-bistetrahydropyranyloxy-20-bis-norprost-4-yn-13-trans-ene, 8R-1,6{,9α-triacetoxy-11α,15α-bistetrahydropyranyloxy-20-norprost-4-yn-13-trans-ene, 8R-1,6{,9α-triacetoxy-11α,15α-bistetrahydropyranyloxy-20-methylprost-4-yn-13-trans-ene, and 8R-1,6{,9α-triacetoxy-11α,15α-bistetrahydropyranyloxy-20-pentylprost-4-yn-13-trans-ene as starting compounds, there are obtained:

8R-1,9α-diacetoxy-15α-tetrahydropyranyloxyprosta-4,5,13-trans-triene, 8R-1,9α-diacetoxy-11α,15α-bistetrahydropyranyloxy-20-bisnorprosta-4,5,13-trans-triene, 8R-1,9α-diacetoxy-11α,15α-bistetrahydropyranyloxy-20-norporsta-4,5,13-trans-triene, 8R-1,9α-diacetoxy-11α,15α-bistetrahydropyranyloxy-20-methylprosta-4,5,13-trans-triene and 8R-1,9α-diacetoxy-11α,15α-bistetrahydropyranyloxy-20-pentylprosta-4,5,13-trans-triene, respectively.

EXAMPLE 4

A mixture of 110 mg. of 1,9α-diacetoxy-11α,15α-bistetrahydropyranyloxyprosta-4,5,13-trans-triene, 50 mg. of anhydrous potassium carbonate and 2 ml. of anhydrous methanol is stirred at room temperature for 18 hours, under an argon atmosphere. The solvent is then eliminated under reduced pressure, water is added and the product extracted with ether. The ether extract is washed with saturated sodium chloride solution, dried over magnesium sulfate and evaporated to dryness under vacuo, thus yielding 1,9α-dihydroxy-11α,15α-bistetrahydropyranyloxyprosta-4,5,13-trans-triene (IX, $R^1$ = tetrahydropyranyloxy; R and $R^5$ = H; $n = 4$).

In a similar manner, the remaining 1,9α-diacetoxy compounds obtained in Example 3 are converted respectively into 1,9α-dihydroxy-15α-tetrahydropyranyloxyprosta-4,5,13-trans-triene,
- 1,9α-dihydroxy-11α,15α-bistetrahydropyranyloxy-20-bisnorprosta-4,5,13-trans-triene, 1,9α-dihydroxy-11α,15α-bistetrahydropyranyloxy-20-norprosta-4,5,13-trans-triene,
- 1,9α-dihydroxy-11α,15α-bistetrahydropyranyloxy-20-methylprosta-4,5,13-trans-triene and
- 1,9α-dihydroxy-11α,15α-bistetrahydropyranyloxy-20-pentylprosta-4,5,13-trans-triene.

EXAMPLE 4A

By repeating the method of Example 4 using 8R-1,9α-diacetoxy-11α,15α-bistetrahydropyranyloxyprosta-4,5,13-trans-triene as starting material there is obtained 8R-1,9α-dihydroxy-11α,15α-bistetrahydropyranyloxyprosta-4,5,13-trans-triene (8R-antimer of IX, $R^{1''}$ = tetrahydropyranyloxy; R and $R^5$ = H; $n = 4$).

In a similar manner, the remaining 8R-1,9α-diacetoxy compounds obtained in Example 3-A are converted respectively into 8R-1,9α-dihydroxy-15α-tetrahydropyranyloxyprosta-4,5,13-trans-triene,
- 8R-1,9α-dihydroxy-11α,15α-bistetrahydropyranyloxy-20-bisnorprosta-4,5,13-trans-triene,
- 8R-1,9α-dihydroxy-11α,15α-bistetrahydropyranyloxy-20-norprosta-4,5,13-trans-triene,
- 8R-1,9α-dihydroxy-11α,15α-bistetrahydropyranyloxy-20-methylprosta-4,5,13-trans-triene and
- 8R-1,9α-dihydroxy-11α,15α-bistetrahydropyranyloxy-20-pentylprosta-4,5,13-trans-triene.

EXAMPLE 5

A solution of 300 mg. of 1,9α-dihydroxy-11α,15α-bistetrahydropyranyloxyprosta-4,5,13-trans-triene in 10 ml. of acetone is cooled to −10°C. and treated under an atmosphere of nitrogen and with stirring, with 0.8 ml. of an 8N solution of chromic acid (prepared by mixing 26 g. of chromium trioxide with 23 ml. of concentrated sulfuric acid and diluting with water to 100 ml.). The reaction mixture is stirred for 90 minutes further at −10°C., a few drops of isopropanol are then added to destroy the excess reagent, and the mixture diluted with ethyl acetate. The solution is immediately washed three times with sodium chloride solution, dried over magnesium sulfate and evaporated to dryness under reduced pressure. To the oily residue is added 2.4 ml. of a mixture of acetic acid-water (65:35), and the reaction mixture is stirred at room temperature for 18 hours, it is then evaporated to dryness under vacuo and the residue purified by t.l.c. using ethyl acetate as eluant, to give the pure 9-keto-11α,15α-dihydroxy-prosta-4,5,13-trans-trienoic acid (XI, R and $R^5$ = H; $R^{1'''}$ = hydroxy; $n = 4$).

Likewise, 1,9α-dihydroxy-15α-tetrahydropyranyloxyprosta-4,5,13-trans-triene, 1,9α-dihydroxy-11α,15α-bistetrahydropyranyloxy-20-bisnorprosta-4,5,13-trans-triene,
- 1,9α-dihydroxy-11α,15α-bistetrahydropyranyloxy-20-norprosta-4,5,13-trans-triene,
- 1,9α-dihydroxy-11α,15α-bistetrahydropyranyloxy-20-methylprosta-4,5,13-trans-triene and 1,9α-dihydroxy-11α,15α-bistetrahydropyranyloxy-20-pentylprosta-4,5,13-trans-triene are converted respectively into 9-keto-15α-hydroxyprosta-4,5,13-trans-trienoic acid,
- 9-keto-11α,15α-dihydroxy-20-bisnorprosta-4,5,13-trans-trienoic acid,
- 9-keto-11α,15α-dihydroxy-20-norporsta-4,5,13-trans-trienoic acid,
- 9-keto-11α,15α-dihydroxy-20-methylprosta-4,5,13-trans-trienoic acid and
- 9-keto-11α,15α-dihydroxy-20-pentylprosta-4,5,13-trans-trienoic acid.

EXAMPLE 5A

By repeating the method of Example 5 but using 8R-1,9α-dihydroxy-11α,15α-bistetrahydropyranyloxyprosta-4,5,13-trans-triene as starting material, there is produced 8R-9-keto-11α,15α-dihydroxyprosta-4,5,13-trans-trienoic acid (8R-antimer of XI, R and $R^5$ = H; $R^{1'''}$ = hydroxy; $n = 4$).

Likewise, 8R-1,9α-dihydroxy-15α-tetrahydropyranyloxyprosta-4,5,13-trans-triene,
- 8R-1,9α-dihydroxy-11α,15α-bistetrahydropyranyloxy-20-bisnorprosta-4,5,13-trans-triene,
- 8R-1,9α-dihydroxy-11α,15α-bistetrahydropyranyloxy-20-norporsta-4,5,13-trans-triene,
- 8R-1,9α-dihydroxy-11α,15α-bistetrahydropyranyloxy-20-methylprosta-4,5,13-trans-triene and
- 8R-1,9α-dihydroxy-11α,15α-bistetrahydropyranyloxy-20-pentylprosta-4,5,13-trans-triene are converted respectively into 8R-9-keto-15α-hydroxyprosta-4,5,13-trans-trienoic acid,
- 8R-9-keto-11α,15α-dihydroxy-20-bisnorprosta-4,5,13-trans-trienoic acid,
- 8R-9-keto-11α,15α-dihydroxy-20-norporsta-4,5,13-trans-trienoic acid,
- 8R-9-keto-11α,15α-dihydroxy-20-methylprosta-4,5,13-trans-trienoic acid and
- 8R-9-keto-11α,15α-dihydroxy-20-pentylprosta-4,5,13-trans-trienoic acid.

EXAMPLE 6

A. A mixture of 100 mg. of 1,9α-diacetoxy-11α,15α-bistetrahydropyranyloxyprosta-4,5,13-trans-triene, 27.5 mg. (1.1 molar equivalents) of anhydrous potassium carbonate and 2 ml. of anhydrous methanol is stirred at 0°C. for 2 hours, under an argon atmosphere. The solvent is then eliminated under reduced pressure, water is added and the product extracted with ether. The ether extract is washed with saturated sodium chloride solution, dried over magnesium sulfate and evaporated to dryness under vacuo. The residue is purified by t.l.c., to produce the pure 9α-acetoxy-11α,15α-bistetrahydropyranyloxyprosta-4,5,13-trans-trien-1-ol (XII, R and $R^5$ = H; $R^{1'}$ = tetrahydropyranyloxy; $n$ = 4).

Upon oxidation of the foregoing compound with 8N chromic acid, in accordance with the method of Example 5, there is produced 9α-acetoxy-11α,15α-bistetrahydropyranyloxyprosta-4,5,13-trans-trienoic acid. The latter compound is then treated with anhydrous potassium carbonate (25 mg.) in methanol, in accordance with the method of Example 4, followed by acidification with oxalic acid to afford 9α-hydroxy-11α,15α-bistetrahydropyranyloxyprosta-4,5,13-trans-trienoic acid (XIV, R and $R^5$ = H; $R^{1'}$ = tetrahydropyranyloxy; $n$ = 4).

B. A solution of 50 mg. of 9α-hydroxy-11α,15α-bistetrahydropyranyloxyprosta-4,5,13-trans-trienoic acid in 0.15 ml. of tetrahydrofuran is treated with 1.3 ml. of 65 percent aqueous acetic acid. The reaction mixture is stirred at 45°C. for 4 hours, cooled to 0°C. and evaporated to dryness under reduced pressure; the oily residue is purified by t.l.c. using chloroform: methanol (9:1) as eluant, thus yielding the pure 9α,11α,15α-trihydroxyprosta-4,5,13-trans-trienoic acid (XV, R and $R^5$ = H; $R^1$ = hydroxy; $n$ = 4).

In a similar manner but using 1,9α-diacetoxy-15α-tetrahydropyranyloxyprosta-4,5,13-trans-triene as starting compound there are successively obtained:

9α-acetoxy-15α-tetrahydropyranyloxyprosta-4,5,13-trans-trien-1-ol,

9α-acetoxy-15α-tetrahydropyranyloxyprosta-4,5,13-trans-trienoic acid,

9α-hydroxy-15α-tetrahydropyranyloxyprosta-4,5,13-trans-trienoic acid and

9α,15α-dihydroxyprosta-4,5,13-trans-trienoic acid (XV, R, $R^1$ and $R^5$ = H; $n$ = 4).

Likewise, starting from 1,9α-diacetoxy-11α,15α-bistetrahydropyranyloxy-20-bisnorprosta-4,5,13-trans-triene, 1,9α-diacetoxy-11α,15α-bistetrahydropyranyloxy-20-norprosta-4,5,13-trans-triene, 1,9α-diacetoxy-11α,15α-bistetrahydropyranyloxy-20-methylprosta-4,5,13-trans-triene, and 1,9α-diacetoxy-11α,15α-bistetrahydropyranyloxy-20-pentylprosta-4,5,13-trans-triene, there are obtained as final products, respectively:

9α,11α,15α-trihydroxy-20-bisnorprosta-4,5,13-trans-trienoic acid,

9α,11α,15α-trihydroxy-20-norprosta-4,5,13-trans-trienoic acid,

9α,11α,15α-trihydroxy-20-methylprosta-4,5,13-trans-trienoic acid and

9α,11α,15α-trihydroxy-20-pentylprosta-4,5,13-trans-trienoic acid.

EXAMPLE 6A

By repeating the methods of Example 6, parts A and B but using 8R-1,9α-diacetoxy-11α,15α-bistetrahydropyranyloxyprosta-4,5,13-trans-triene as starting material there is obtained as final product 8R-9α,11α,15α-trihydroxyprosta-4,5,13-trans-trienoic acid (8R-antimer of XV, R and $R^5$ = H; $R^{1''}$ =hydroxy; $n$ = 4).

In a similar manner but using 8R-1,9α-diacetoxy-15α-tetrahydropyranyloxyprosta-4,5,13-trans-triene as starting compound there are successively obtained:

8R-9α-acetoxy-15α-tetrahydropyranyloxyprosta-4,5,13-trans-trien-1-ol, 8R-9α-acetoxy-15α-tetrahydropyranyloxyprosta-4,5,13-trans-trienoic acid, 8R-9α-hydroxy-15α-tetrahydropyranyloxyprosta-4,5,13-trans-trienoic acid and 8R-9α,15α-dihydroxyprosta-4,5,13-trans-trienoic acid.

Likewise, starting from 8R-1,9α-diacetoxy-11α,15α-bistetrahydropyranyloxy-20-bisnorprosta-4,5,13-trans-triene, 8R-1,9α-diacetoxy-11α,15α-bistetrahydropyranyloxy-20-norprosta-4,5,13-trans-triene, 8R-1,9α-diacetoxy-11α,15α-bistetrahydropyranyloxy-20-methylprosta-4,5,13-trans-triene, and 8R-1,9α-diacetoxy-11α,15α-bistetrahydropyranyloxy-20-pentylprosta-4,5,13-trans-triene, there are obtained as final products, respectively:

8R-9α,11α,15α-trihydroxy-20-bisnorprosta-4,5,13-trans-trienoic acid, 8R-9α,11α,15α-trihydroxy-20-norprosta-4,5,13-trans-trienoic acid, 8R-9α,11α,15α-trihydroxy-20-methylprosta-4,5,13-trans-trienoic acid and 8R-9α,11α,15α-trihydroxy-20-pentylprosta-4,5,13-trans-trienoic acid.

EXAMPLE 7

A. To a vigorously stirred suspension of 10.4 g. of cuprous iodide in 200 ml. of diethyl ether, cooled to 0°C., is added dropwise a 2M solution of methyllithium in ether, under argon atmosphere, until a colorless solution of lithium dimethylcopper reagent is obtained.

In a similar manner but using ethyllithium and propyllithium instead of methyllithium, the lithium diethylcopper and lithium di-n-propylcopper reagents are prepared.

B. A solution of 100 mg. of 1,6,9α-triacetoxy-11α,15α-bistetrahydropyranyloxyprost-4-yn-13-trans-ene in 3 ml. of anhydrous ether is cooled to 0°C. and treated, under argon atmosphere, with one molar equivalent of lithium dimethylcopper (prepared as described in Part A). The reaction is stirred for 5 hours at 0°C., saturated ammonium chloride solution is added, and the mixture is stirred for 1 hour and extracted with ether. The organic extract is washed with saturated sodium chloride solution, dried over magnesium sulfate and evaporated to dryness under reduced pressure. The residue is purified by chromatography on Florisil. The fractions eluted with methylene chloride-ether (80:20) afford the pure 1,9α-diacetoxy-11α,15α-bistetrahydropyranyloxy-4-methylprosta-4,5,13-transtriene (VIII, R = methyl; R⁵ = H, R¹′ = tetrahydropyranyloxy; n = 4).

Similarly, but using one molar equivalent of lithium diethylcopper and lithium dipropylcopper in lieu of lithium dimethylcopper there are respectively obtained 1,9α-diacetoxy-11α,15α-bistetrahydropyranyloxy-4-ethylprosta-4,5,13-trans-triene and 1,9α-diacetoxy-11α,15α-bistetrahydropyranyloxy-4-propylprosta-4,5,13-trans-triene.

Likewise, but using 1,6{,9α-triacetoxy-15α-tetrahydropyranyloxyprost-4-yn-13-trans-ene in lieu of 1,6{,9α-triacetoxy-11α,15α-bistetrahydropyranyloxyprost-4-yn-13-trans-ene there are obtained respectively 1,9α-diacetoxy-15α-tetrahydropyranyloxy-4-methylprosta-4,5,13-trans-triene, 1,9α-diacetoxy-15α-tetrahydropyranyloxy-4-ethylprosta-4,5,13-trans-triene and 1,9α-diacetoxy-15α-tetrahydropyranyloxy-4-propylprosta-4,5,13-trans-triene.

By the same method, 1,6{,9α-triacetoxy-11α,15α-bistetrahydropyranyloxy-20-bisnorprost-4-yn-13-trans-ene, 1,6{,9α-triacetoxy-11α,15α-bistetrahydropyranyloxy-20-norprost-4-yn-13-trans-ene, 1,6{,9α-triacetoxy-11α,15α-bistetrahydropyranyloxy-20-methylprost-4-yn-13-trans-ene, and 1,6{,9α-triacetoxy-11α,15α-bistetrahydropyranyloxy-20-pentylprost-4-yn-13-trans-ene are converted into the corresponding 4-methyl (ethyl or propyl)-prosta-4,5,13-trans-trienes. Representative compounds thus obtained are:

1,9α-diacetoxy-11α,15α-bistetrahydropyranyloxy-4-methyl-20-bisnorprosta-4,5,13-trans-triene, 1,9α-diacetoxy-11α,15α-bistetrahydropyranyloxy-4-ethyl-20-norprosta-4,5,13-trans-triene, 1,9α-diacetoxy-11α,15α-bistetrahydropyranyloxy-4-propyl-20-methylprosta-4,5,13-trans-triene and 1,9α-diacetoxy-11α,15α-bistetrahydropyranyloxy-4-methyl-20-pentylprosta-4,5,13-trans-triene.

EXAMPLE 7A

By repeating the procedure of part B of Example 7, using 8R-1,6{,9α-triacetoxy-11α,15α-bistetrahydropyranyloxyprost-4-yn-13-trans-ene as starting material and lithium dimethylcopper as reagent there is obtained 8R-1,9α-diacetoxy-11α,15α-bistetrahydropyranyloxy-4-methylprosta-4,5,13-trans-triene (8R-antimer of VIII, R = methyl; R⁵ = H; R¹′ = tetrahydropyranyloxy and n = 4).

Similarly, but using one molar equivalent of lithium diethylcopper and lithium dipropylcopper in lieu of lithium dimethylcopper there are respectively obtained 8R-1,9α-diacetoxy-11α,15α-bistetrahydropyranyloxy-4-ethylprosta-4,5,13-trans-triene and 8R-1,9α-diacetoxy-11α,15α-bistetrahydropyranyloxy-4-propylprosta-4,5,13-trans-triene.

Likewise, but using 8R-1,6{,9α-triacetoxy-15α-tetrahydropyranyloxyprost-4-yn-13-trans-ene in lieu of 8R-1,6{,9α-triacetoxy-11α,15α-bistetrahydropyranyloxyprost-4-yn-13-trans-ene there are obtained respectively:

8R-1,9α-diacetoxy-15α-tetrahydropyranyloxy-4-methylprosta-4,5,13-trans-triene, 8R-1,9α-diacetoxy-15α-tetrahydropyranyloxy-4-ethylprosta-4,5,13-trans-triene and 8R-1,9α-diacetoxy-15α-tetrahydropyranyloxy-4-propylprosta-4,5,13-trans-triene.

By the same method, 8R-1,6{,9α-triacetoxy-11α,15α-bistetrahydropyranyloxy-20-bisnorprost-4-yn-13-trans-ene, 8R-1,6{,9α-triacetoxy-11α,15α-bistetrahydropyranyloxy-20-norprost-4-yn-13-trans-ene, 8R-1,6{,9α-triacetoxy-11α,15α-bistetrahydropyranyloxy-20-methylprost-4-yn-13-trans-ene, and 8R-1,6{,9α-triacetoxy-11α,15α-bistetrahydropyranyloxy-20-pentylprost-4-yn-13-trans-ene, are converted into the corresponding 8R-methyl(ethyl or propyl)-prosta-4,5,13-trans-trienes.

EXAMPLE 8

Examples 4 and 5 are repeated using 1,9α-diacetoxy-11α,15α-bistetrahydropyranyloxy-4-methylprosta-4,5,13-trans-triene as starting material, to produce successively 1,9α-dihydroxy-11α,15α-bistetrahydropyranyloxy-4-methylprosta-4,5,13-trans-triene, 4-methyl-9-keto-11α,15α-bistetrahydropyranyloxyprosta-4,5,13-trans-trienoic acid and 4-methyl-9-keto-11α,15α-dihydroxyprosta-4,5,13-trans-trienoic acid (XI, R = methyl; R⁵ = H; R¹‴ = hydroxy; n = 4).

In a similar manner, starting from 1,9α-diacetoxy-11α,15α-bistetrahydropyranyloxy-4-ethylprosta-4,5,13-trans-triene, 1,9α-diacetoxy-11α,15α-bistetrahydropyranyloxy-4-propylprosta-4,5,13-trans-triene, 1,9α-diacetoxy-15α-tetrahydropyranyloxy-4-methylprosta-4,5,13-trans-triene, 1,9α-diacetoxy-15α-tetrahydropyranyloxy-4-ethylprosta-4,5,13-trans-triene, 1,9α-diacetoxy-11α,15α-bistetrahydropyranyloxy-4-methyl-20-bisnorprosta-4,5,13-trans-triene, 1,9α-diacetoxy-11α,15α-bistetrahydropyranyloxy-4-ethyl-20-norprosta-4,5,13-trans-triene, 1,9α-diacetoxy-11α,15α-bistetrahydropyranyloxy-4-propyl-20-methylprosta-4,5,13-trans-triene, 1,9α-diacetoxy-11α,15α-bistetrahydropyranyloxy-4-methyl-20-pentylprosta-4,5,13-trans-triene there are obtained as final products:

4-ethyl-9-keto-11α,15α-dihydroxyprosta-4,5,13-trans-trienoic acid, 4-propyl-9-keto-11α,15α-dihydroxyprosta-4,5,13-trans-trienoic acid, 4-methyl-9-keto-15α-hydroxyprosta-4,5,13-trans-trienoic acid, 4-ethyl-9-keto-15α-hydroxyprosta-4,5,13-trans-trienoic acid, 4-methyl-9-keto-11α,15α-dihydroxy-20-bisnorprosta-4,5,13-trans-trienoic acid, 4-ethyl-9-keto-11α,15α-dihydroxy-20-norprosta-4,5,13-trans-trienoic acid, 4-propyl-9-keto-11α,15α-dihydroxy-20-methylprosta-4,5,13-trans-trienoic acid, and 4-methyl-9-keto-11α,15α-dihydroxy-20-pentylprosta-4,5,13-trans-trienoic acid, respectively.

EXAMPLE 8A

Examples 4 and 5 are repeated using 8R-1,9α- diacetoxy-11α,15α-bistetrahydropyranyloxy-4-methylprosta-4,5,13-trans-triene as starting material, to produce successively 8R-1,9α-dihydroxy-11α,15α-bistetrahydropyranyloxy-4-methylprosta-4,5,13-trans-triene, 8R-4-methyl-9-keto-11α,15α-bistetrahydropyranyloxyprosta-4,5,13-trans-trienoic acid and 8R-4-methyl-9-keto-11α,15α-dihydroxyprosta-4,5,13-trans-trienoic acid (8R-antimer of XI, R = methyl; $R^5$ = H; $R^{1'''}$ = hydroxy and $n$ = 4).

In a similar manner, starting from 8R-1,9α-diacetoxy-11α,15α-bistetrahydropyranyloxy-4-ethylprosta-4,5,13-trans-triene, 8R-1,9α-diacetoxy-11α,15α-bistetrahydropyranyloxy-4-propylprosta-4,5,13-trans-triene, 8R-1,9α-diacetoxy-15α-tetrahydropyranyloxy-4-methylprosta-4,5,13-trans-triene, 8R-1,9α-diacetoxy-15α-tetrahydropyranyloxy-4-ethylprosta-4,5,13-trans-triene, 8R-1,9α-diacetoxy-11α,15α-bistetrahydropyranyloxy-4-methyl-20-bisnorprosta-4,5,13-trans-triene, 8R-1,9α-diacetoxy-11α,15α-bistetrahydropyranyloxy-4-ethyl-20-norprosta-4,5,13-trans-triene, 8R-1,9α-diacetoxy-11α,15α-bistetrahydropyranyloxy-4-propyl-20-methylprosta-4,5,13-trans-triene and 8R-1,9α-diacetoxy-11α,15α-bistetrahydropyranyloxy-4-methyl-20-pentylprosta-4,5,13-trans-triene there are obtained as final products:

8R-4-ethyl-9-keto-11α,15α-dihydroxyprosta-4,5,13-trans-trienoic acid, 8R-4-propyl-9-keto-11α,15α-dihydroxyprosta-4,5,13-trans-trienoic acid, 8R-4-methyl-9-keto-15α-hydroxyprosta-4,5,13-trans-trienoic acid, 8R-4-ethyl-9-keto-15α-hydroxyprosta-4,5,13-trans-trienoic acid, 8R-4-methyl-9-keto-11α,15α-dihydroxy-20-bisnorprosta-4,5,13-trans-trienoic acid, 8R-4-ethyl-9-keto-11α,15α-dihydroxy-20-norprosta-4,5,13-trans-trienoic acid, 8R-4-propyl-9-keto-11α,15α-dihydroxy-20-methylprosta-4,5,13-trans-trienoic acid, and 8R-4-methyl-9-keto-11α,15α-dihydroxy-20-pentylprosta-4,5,13-trans-trienoic acid, respectively.

EXAMPLE 9

By following the method of Example 6, 1,9α-diacetoxy-11α,15α-bistetrahydropyranyloxy-4-methylprosta-4,5,13-trans-triene is converted successively into 1-hydroxy19α-acetoxy-11α,15α-bistetrahydropyranyloxy-4-methylprosta-4,5,13-trans-triene, 4-methyl-9α-acetoxy-11α,15α-bistetrahydropyranyloxyprosta-4,5,13-trans-trienoic acid, 4-methyl-9α-hydroxy-11α,15α-bistetrahydropyranyloxyprosta-4,5,13-trans-trienoic acid, and 4-methyl-9α,11α,15α-trihydroxyprosta-4,5,13-trans-trienoic acid, (XV, R = methyl; $R^5$ = H; $R^{1'''}$ = hydroxy; $n$ = 4).

In a similar manner, 1,9α-diacetoxy-11α,15α-bistetrahydropyranyloxy-4-ethylprosta-4,5,13-trans-triene, 1,9α-diacetoxy-11α,15α-bistetrahydropyranyloxy-4-propylprosta-4,5,13-trans-triene, 1,9α-diacetoxy-15α-tetrahydropyranyloxy-4-methylprosta-4,5,13-trans-triene, 1,9α-diacetoxy-11α,15α-bistetrahydropyranyloxy-4-methyl-20-bisnorprosta-4,5,13-trans-triene and 1,9α-diacetoxy-11α,15α-bistetrahydropyranyloxy-4-propyl-20-methylprosta-4,5,13-trans-triene are converted respectively into 4-ethyl-9α,11α,15α-trihydroxyprosta-4,5,13-trans-trienoic acid, 4-propyl-9α,11α,15α-trihydroxyprosta-4,5,13-trans-trienoic acid, 4-methyl-9α,15α-dihydroxyprosta-4,5,13-trans-trienoic acid, 4-methyl-9α,11α,15α-trihydroxy-20-bisnorprosta-4,5,13-trans-trienoic acid and 4-propyl-9α,11α,15α-trihydroxy-20-methylprosta-4,5,13-trans-trienoic acid.

EXAMPLE 9A

By following the method of Example 6, 8R-1,9α-diacetoxy-11α,15α-bistetrahydropyranyloxy-4-methylprosta-4,5,13-trans-triene is converted successively into 8R-1-hydroxy-9α-acetoxy-11α,15α-bistetrahydropyranyloxy-4-methylprosta-4,5,13-trans-triene, 8R-4-methyl-9α-acetoxy-11α,15α-bistetrahydropyranyloxyprosta-4,5,13-trans-trienoic acid, 8R-4-methyl-9α-hydroxy-11α,15α-bistetrahydropyranyloxyprosta-4,5,13-trans-trienoic acid and 8R-4-methyl-9α,11α,15α-trihydroxyprosta-4,5,13-trans-trienoic acid (8R-antimer of XV, R = methyl; $R^5$ = H; $R^{1'''}$ = hydroxy; $n$ = 4).

In a similar manner, 8R-1,9α-diacetoxy-11α,15α-bistetrahydropyranyloxy-4-ethylprosta-4,5,13-trans-triene, 8R-1,9α-diacetoxy-11α,15α-bistetrahydropyranyloxy-4-propylprosta-4,5,13-trans-triene, 8R-1,9α-diacetoxy-15α-tetrahydropyranyloxy-4-methylprosta-4,5,13-trans-triene, 8R-1,9α-diacetoxy-11α,15α-bistetrahydropyranyloxy-4-methyl-20-bisnorprosta-4,5,13-trans-triene and 8R-1,9α-diacetoxy-11α,15α-bistetrahydropyranyloxy-4-propyl-20-methylprosta-4,5,13-trans-triene are converted respectively into 8R-4-ethyl-9α,11α,15α-trihydroxyprosta14,5,13-trans-trienoic acid, 8R-4-propyl-9α,11α,15α-trihydroxyprosta-4,5,13-trans-trienoic acid, 8R-4-methyl-9α,15α-dihydroxyprosta-4,5,13-trans-trienoic acid, 8R-4-methyl-9α,11α,15α-trihydroxy-20-bisnorprosta-4,5,13-trans-trienoic acid and 8R-4-propyl-9α,11α,15α-trihydroxy-20-methylprosta-4,5,13-transtrienoic acid.

EXAMPLE 10

In accordance with the methods described in Examples 1, 2, 3, 4 and 5 [2'α-hydroxy-4'α-tetrahydropyranyloxy-5'β-(3''α-tetrahydropyranyloxydec-1''(t)-en-1''-yl)-cyclopent-1'α-yl]-acetaldehyde 1,2'-hemiacetal is converted successively into 1,6{,9α-trihydroxy-11α,15α- bistetrahydropyranyloxy-20-ethylprost-4-yn-13-trans-ene, 1,6{ ,9α-triacetoxy-11α, 15α-bistetrahydropyranyloxy-20-ethylprost-4-yn-13-trans-ene, 1,9α-diacetoxy-11α,15α-bistetrahydropyranyloxy-20-ethylprosta-4,5,13-trans-triene, 1,9α-dihydroxy111α,15α-bistetrahydropyranyloxy-20-ethylprosta-4,5,13-trans-triene and 9-keto-11α,15α-dihydroxy-20-ethylprosta14,5,13-trans-trienoic acid (XI, R and $R^5$ = H; $R^{1'''}$ = hydroxy; $n = 6$).

Similarly, from [2'α-hydroxy-5'α-(3''α-tetrahydropyranyloxydec-1''(t)-en-1''-yl)-cyclopent-1'α-yl]-acetic acid 1,2'-lactone there is produced as final product 9-keto-15'-hydroxy-20-ethylprosta-4,5,13-trans-trienoic acid (XI, R, $R^5$ and $R^{1'''}$ = H; $n = 6$).

EXAMPLE 10A

In accordance with the methods described in Examples 1, 2, 3, 4 and 5, 1'R-[2'α-hydroxy-4'α-tetrahydropyranyloxy-5'α-(3''α-tetrahydropyranyloxydec-1''(t)-en-1''-yl)-cyclopent-1'α-yl]-acetaldehyde 1,2'-hemiacetal is converted successively into;

8R-1,6{,9α-trihydroxy-11α,15α-bistetrahydropyranyloxy-20-ethylprost-4-yn-13-trans-ene, 8R11,6 ,9α-triacetoxy-11α,15α-bistetrahydropyranyloxy-20-ethylprost-4-yn-13-trans-ene, 8R-1,9α-diacetoxy-11α,15α-bistetrahydropyranyloxy-20-ethylprosta-4,5,13-trans-triene, 8R11,9α-dihydroxy-11α,15α-bistetrahydropyranyloxy-20-ethylprosta-4,5,13-trans-triene and 8R-9-keto-11α,15α-dihydroxy-20-ethylprosta-4,5,13-trans-trienoic acid, (8R-antimer of XI, R and $R^5$ = H; $R^{1'''}$ = hydroxy; $n = 6$).

Similarly, from 1'R-[2'α-hydroxy-5'β-(3''α-tetrahydropyranyloxydec-1''(t)-en-1''-yl)-cyclopent-1'α-yl]-acetic acid 1,2'-lactone there is produced as final product 8R-9-keto-15α-hydroxy-20-ethylprosta-4,5,13-trans-trienoic acid (8R-antimer of XI, R, $R^5$ and $R^{1'''}$ = H; $n = 6$).

EXAMPLE 11

Example 6 is repeated but using 1,9α-diacetoxy-11α,15α-bistetrahydropyranyloxy-20-ethylprosta14,5,13-trans-triene as starting material, thus obtaining successively:

9α-acetoxy-11α,15α-bistetrahydropyranyloxy-20-ethylprosta-4,5,13-trans-trien-1-ol, 9-acetoxy-11α,15α-bistetrahydropyranyloxy-20-ethylprosta-4,5,13-trans-trienoic acid, 9α-hydroxy-11α,15α-bistetrahydropyranyloxy-20-ethylprosta-4,5,13-trans-trienoic acid and 9α,11α,15α-trihydroxy-20-ethylprosta-4,5,13-trans-trienoic acid (XV, R and $R^5$ = H; $R^{1'''}$ = hydroxy; $n=6$).

In a similar manner from 1,9α-diacetoxy-15α-tetrahydropyranyloxy-20-ethylprosta-4,5,13-trans-triene there is obtained as final product 9α,15α-dihydroxy-20-ethylprosta-4,5,13-trans-trienoic acid (XV, R, $R^5$ and $R^{1'''}$ = H; $n = 6$).

EXAMPLE 11A

Example 6 is repeated but using 8R-1,9α-diacetoxy-11α,15α-bistetrahydropyranyloxy-20-ethylprosta-4,5,13-trans-triene as starting material, thus obtaining successively:

8R-9α-acetoxy-11α,15α-bistetrahydropyranyloxy-20-ethylprosta-4,5,13-trans-trien-1-ol, 8R-9α-acetoxy-11α,15α-bistetrahydropyranyloxy-20-ethylprosta-4,5,13-trans-trienoic acid, 8R-9α-hydroxy-11α,15α-bistetrahydropyranyloxy-20-ethylprosta-4,5,13-trans-trienoic acid and 8R-9α,11α,15α-trihydroxy-20-ethylprosta-4,5,13-trans-trienoic acid (8R-antimer of XV, R and $R^5$ = H; $R^{1'''}$ = hydroxy; $n = 6$).

In a similar manner from 8R-1,9α-diacetoxy-15α-tetrahydropyranyloxy-20-ethylprosta-4,5,13-trans-triene there is obtained as final product 8R-9α,15α-dihydroxy-20-ethylprosta-4,5,13-trans-trienoic acid (8R-antimeter of XV, R, $R^{1'''}$ and $R^5$ = H; $n = 6$).

EXAMPLE 12

By following the method of Example 7,part B, 1,6{,9-α-triacetoxy-11α,15α-bistetrahydropyranyloxy-20-ethylprost-4-yn-13-trans-ene is converted into 1,9α-diacetoxy-11α,15α-bistetrahydropyranyloxy-4-methyl-20-ethylprosta-4,5,13-trans-triene, which upon saponification followed by oxidation and hydrolysis of the tetrahydropyranyloxy groups, in accordance with the methods of Examples 4 and 5, respectively, gives rise to 4-methyl-9-keto-11α,15α-dihydroxy-20-ethylprosta-4,5,13-trans-trienoic acid (XI, R = methyl; $R^5$ = H: $R^{1'''}$ = hydroxy; $n = 6$).

EXAMPLE 12A

By following the method of Example 7, part B, 8R-1,6{,9α-triacetoxy-11α,15α-bistetrahydropyranyloxy-20-ethylprost-4-yn-13-trans-ene is converted into 8R-1,9α-diacetoxy-11α,15α-bistetrahydropyranyloxy-4-methyl-20-ethylprosta-4,5,13-trans-triene, which upon saponification followed by oxidation and hydrolysis of the tetrahydropyranyloxy groups, in accordance with the methods of Examples 4 and 5, respectively, gives rise to 8R-4-methyl-9-keto-11α,15α-dihydroxy-20-ethylprosta-4,5,13-trans-trienoic acid (8R-antimer of XI, R = methyl; $R^5$ = H; $R^{1'''}$ = hydroxy; $n = 6$).

EXAMPLE 13

To a solution of 2 g. of 1,6{,9α-trihydroxy-11α,15α-bistetrahydropyranyloxyprost-4-yn-13-trans-ene in 60 ml. of anhydrous tetrahydrofuran is added 4.6 g. of activated manganese dioxide and the reaction mixture is stirred for 90 minutes at room temperature; the manganese dioxide is filtered off and washed with acetone and the combined filtrates are evaporated to dryness under vacuo. The residue is redissolved in 60 ml. of anhydrous tetrahydrofuran, 4.6 g. of manganese dioxide are then added and the mixture stirred under the same conditions for 90 minutes further. The manganese dioxide is separated by filtration and washed with hot acetone. The combined organic filtrates are evaporated to dryness under reduced pressure, and the residue is purified by thin layer chromatography, using a 1:1 methylene chloride-diethyl ether mixture containing 0.4 percent of methanol as eluant, to obtain 1,9α-dihydroxy-6-keto-11α,15α-bistetrahydropyranyloxyprost-4-yn-13- trans-ene in pure form (IV, $R^{1'}$ = tetrahydropyranyloxy; $n = 4$).

Similarly, 1,6{,9α-trihydroxy-15α-tetrahydropyranyloxyprost-4-yn-13-trans-ene, 1,6{,9α-trihydroxy-11α,15α-bistetrahydropyranyloxy120-bisnorprost-4-yn-13-trans-ene, 1,6{,9α-trihydroxy-11α,15α-bistetrahydropyranyloxy-20-norprost-4-yn-13-trans-ene, 1,6{,9α-trihydroxy-11α,15α-bistetrahydropyranyloxy-20-methylprost-4-yn-13-trans-ene, 1,6{,9α-trihydroxy-11α,15α-bistetrahydropyranyloxy-20-ethylprost-4-yn-13-trans-ene and 1,6{,9α-trihydroxy-11α,15α-bistetrahydropyranyloxy-20-pentylprost-4-yn-13-trans-ene are converted into the corresponding 6-keto compounds.

EXAMPLE 13A

In accordance with the method of Example 13, 8R-1,6{,9α-trihydroxy-11α,15α-bistetrahydropyranyloxyprost-4-yn-13-trans-ene is converted into 8R-1,9α-dihydroxy-6-keto-11α,15α-bistetrahydropyranyloxyprost-4-yn-13-trans-ene in pure form (8R-antimer of IV, $R^{1'}$ = tetrahydropyranyloxy, $n = 4$).

Similarly, 8R-1,6{,9α-trihydroxy-15α-tetrahydropyranyloxyprost-4-yn-13-trans-ene, 8R-1,6{,9α-trihydroxy-11α,15α-bistetrahydropyranyloxy-20-bisnorprost-4-yn-13-trans-ene, 8R-1,6{,9α-trihydroxy-11α,15α-bistetrahydropyranyloxy-20-norprost-4-yn-13-trans-ene, 8R-1,6{,9α-trihydroxy-11α,15α-bistetrahydropyranyloxy-20-methylprost-4-yn-13-trans-ene, 8R-1,6{,9α-trihydroxy-11α,15α-bistetrahydropyranyloxy-20-ethylprost-4-yn-13-trans-ene and 8R-1,6{,9α-trihydroxy-11α,15α-bistetrahydropyranyloxy-20-pentylprost-4-yn-13-trans-ene are converted into the corresponding 8R-6-keto compounds.

EXAMPLE 14

To a stirred solution of 275 mg. of 1,9α-dihydroxy-6-keto-11α,15α-bistetrahydropyranyloxyprost-4-yn-13-trans-ene in 69 ml. of anhydrous diethyl ether, there is added dropwise, at room temperature and under argon atmosphere, 0.96 ml. of a 2.2M solution of methyllithium in ether (4 molar equivalents). The reaction mixture is maintained at room temperature for 1 hour and then poured into a saturated aqueous ammonium chloride solution. The organic phase is separated and the aqueous phase extracted with ether. The combined organic extracts are washed with saturated aqueous sodium chloride solution, dried over magnesium sulfate and evaporated to dryness under reduced pressure. The residue is purified twice by thin layer chromatography, using a (49:49:2) methylene chloride-diethyl ether-methanol mixture as eluant for the first run, and then a (60:39:1) mixture of the same solvents for the second chromatography, to obtain 6{-methyl-1,6{,9α-trihydroxy-11α,15α-bistetrahydropyranyloxyprost-4-yn-13-trans-ene (V, $R^{1'}$ = tetrahydropyranyloxy; $R^{5'}$ = methyl; $n = 4$) in pure form.

Likewise, starting from 1,9α-dihydroxy-6-keto-15α-tetrahydropyranyloxyprost-4-yn-13-trans-ene, 1,9α-dihydroxy-6-keto-11α, 15α-bistetrahydropyranyloxy-20-bisnorprost-4-yn-13-trans-ene, 1,9α-dihydroxy-6-keto-11α,15α-bistetrahydropyranyloxy-20-norprost-4-yn-13-trans-ene, 1,9α-dihydroxy-6-keto-11α,15α-bistetrahydropyranyloxy-20-methylprost-4-yn-13-trans-ene, 1,9α-dihydroxy-6-keto-11α,15α-bistetrahydropyranyloxy-20-ethylprost-4-yn-13-trans-ene and 1,9α-dihydroxy-6-keto-11α,15α-bistetrahydropyranyloxy-20-pentylprost-4-yn-13-trans-ene, there are obtained respectively:

6{-methyl-1,6{,9α-trihydroxy-15α-tetrahydropyranyloxyprost-4-yn-13-trans-ene,

6{-methyl-1,6{,9α-trihydroxy-11α,15α-bistetrahydropyranyloxy-20-bisnorprost-4-yn-13-trans-ene, 6{ -methyl-1,6{, 9α-trihydroxy-11α,15α-bistetrahydropyranyloxy-20-norprost-4-yn-13-trans-ene, 6{,20-dimethyl-1,6{,9α-trihydroxy-11α,15α-bistetrahydropyranyloxyprost-4-yn-13-trans-ene, 1,6{,9α-trihydroxy-11α,15α-bistetrahydropyranyloxy-20-methylprost-4-yn-13-trans-ene, 1,6{,9α-trihydroxy-11α,15α-bistetrahydropyranyloxy-20-ethylprost-4-yn-13-trans-ene, and 1,6{,9α-trihydroxy-11α,15α-bistetrahydropyranyloxy-20-pentylprost-4-yn-13-trans-ene.

By the same method but using equivalent amounts of ethyllithium and propyllithium in place of methyllithium, the corresponding 6{-ethyl and 6{-propyl derivatives are produced.

EXAMPLE 14A.

Example 14 is repeated using 8R-1,9α-dihydroxy-6-keto-11α,15α-bistetrahydropyranyloxyprost-4-yn-13-trans-ene as starting material, thus obtaining 8R-6 -{ methyl-1,6{,9α-trihydroxy-11α,15α-bistetrahydropyranyloxyprost-4-yn-13-trans-ene (8R-antimer of V, $R^{1'}$ = tetrahydropyranyloxy; $R^{5'}$ = methyl; $n = 4$).

Likewise, starting from 8R-1,9α-dihydroxy-6-keto-15α-tetrahydropyranyloxyprost-4-yn-13-trans-ene, 8R-1,9α-dihydroxy-6-keto-11α,15α-bistetrahydropyranyloxy-20-bisnorprost-4-yn-13-trans-ene, 8R-1,9α-dihydroxy-6-keto-11α,15α-bistetrahydropyranyloxy-20-norprost-4-yn-13-trans-ene, 8R-1,9α-dihydroxy-6-keto-11α,15α-bistetrahydropyranyloxy-20-methylprost-4-yn-13-trans-ene, 8R-1,9α-dihydroxy-6-keto-11α,15α-bistetrahydropyranyloxy-20-ethylprost-4-yn-13-trans-ene and 8R-1,9α-dihydroxy-6-keto-11α,15α-
bistetrahydropyranyloxy-20-pentylprost-4-yn-13-
trans-ene, there are obtained respectively:
8R-6{-methyl-1,6{,9α-trihydroxy-15α-
tetrahydropyranyloxyprost-4-yn-13-trans-ene,
8R-6{-methyl-1,6{,9α-trihydroxy-11α,15α-
bistetrahydropyranyloxy-20-bisnorprost-4-yn-13-
trans-ene,
8R-6{-methyl-1,6{,9α-trihydroxy-11α,15α-
bistetrahydropyranyloxy-20-norprost-4-yn-13-
trans-ene,
8R-6{,20-dimethyl-1,6{,9α-trihydroxy-11α,15α-
bistetrahydropyranyloxyprost-4-yn-13-trans-ene,
8R-1,6{,9α-trihydroxy-11α,15α-
bistetrahydropyranyloxy-20-methylprost-4-yn-13-
trans-ene,
8R-1,6{,9α-trihydroxy-11α,15α-
bistetrahydropyranyloxy-20-ethylprost-4-yn-13-
trans-ene, and
8R-1,6{,9α-trihydroxy-11α,15α-
bistetrahydropyranyloxy-20-pentylprost-4-yn-13-
trans-ene.

EXAMPLE 15

To a solution of 200 mg. of 6{-methyl-1,6{,9α-trihydroxy-11α,15α-bistetrahydropyranyloxyprost-4-yn-13-trans-ene in 20 ml. of anhydrous ether there is added 1 ml. of a 2.2M solution of methyllithium in ether, and the reaction mixture is stirred at room temperature for 3½ hours. The reaction mixture is then cooled to 0°C. in an ice bath and treated dropwise under stirring with 0.62 ml. of acetyl chloride and thereafter 1.22 ml. of pyridine are added. The resultant mixture is then stirred at room temperature for 18 hours, water is then added and the product extracted with ether. The organic extracts are washed 3 times with saturated aqueous sodium chloride solution, dried over magnesium sulfate and evaporated to dryness under vacuo. The residue is purified by t.l.c. using methylene chloride-ether (80:20), thus obtaining 6{-methyl-1,6{,9α-triacetoxy-11α,15α-bistetrahydropyranyloxyprost-4-yn-13-trans-ene (VI, $R^{1'}$ = tetrahydropyranyloxy; $R^{5'}$ = methyl; $n = 4$) and 6{-methyl-1,9α-diacetoxy-6{-hydroxy-11α,15α-bistetrahydropyranyloxyprost-4-yn-13-trans-ene (VII, $R^{1'}$ = tetrahydropyranyloxy; $R^{5'}$ = methy; $n = 4$).

In a similar manner, starting from
6{ -methyl-1,6{,9α-trihydroxy-15α-
tetrahydropyranyloxyprost-4-yn-13-trans-ene,
6{ -ethyl-1,6{,9α -trihydroxy-11α,15α-
bistetrahydropyranyloxyprost-4-yn-13-trans-ene,
6{-propyl-1,6{,9α-trihydroxy-11α,15α-
bistetrahydropyranyloxyprost-4-yn-13-trans-ene,
6{-methyl-1,6{,9α-trihydroxy-11α,15α-
bistetrahydropyranyloxy-20-bisnorprost-4-yn-13-
trans-ene,
6{-methyl-1,6{,9α-trihydroxy-11α,15α-
bistetrahydropyranyloxy-20-norprost-4-yn-13-
trans-ene,
6{,20-dimethyl-1,6{,9α-trihydroxy-11α,15α-
bistetrahydropyranyloxyprost-4-yn-13-trans-ene,
6{-methyl-1,6{,9α-trihydroxy-11α,15α-
bistetrahydropyranyloxy-20-methylprost-4-yn-13-
trans-ene,
6{-methyl-1,6{,9α-trihydroxy-11α,15α-
bistetrahydropyranyloxy-20-ethylprost-4-yn-13-
trans-ene and
6{-methyl-1,6{,9α-trihydroxy-11α,15α-
bistetrahydropyranyloxy-20-pentylprost-4-yn-13-
trans-ene, there are obtained respectively:
6{-methyl-1,6{,9α-triacetoxy-15α-
tetrahydropyranyloxyprost-4-yn-13-trans-ene and
6{-methyl-1,9α-diacetoxy-6 -hydroxy-15α-
tetrahydropyranyloxyprost-4-yn-13-trans-ene;
6{ -ethyl-1,6{, 9α-triacetoxy-11α,15α-
bistetrahydropyranyloxyprost-4-yn-13-trans-ene
and 6{-ethyl-1,9α-diacetoxy-6{-hydroxy-11α,15α-
bistetrahydropyranyloxyprost-4-yn-13-trans-ene;
6{-propyl-1,6{,9α-triacetoxy-11α,15α-
bistetrahydropyranyloxyprost-4-yn-13-trans-ene
and 6{-propyl-1,9α-diacetoxy-6{-hydroxy-
11α,15α-bistetrahydropyranyloxyprost-4-yn-13-
trans-ene;
6{-methyl-1,6{,9α-triacetoxy-11α,15α-
bistetrahydropyranyloxy-20-bisnorprost-4-yn-13-
trans-ene and 6{-methyl-1,9α-diacetoxy-6{-
hydroxy-11α,15α-bistetrahydropyranyloxy-20-
bisnorprost-4-yn-13-trans-ene;
6{-methyl-1,6{,9α-triacetoxy-11α,15α-
bistetrahydropyranyloxy-20-norprost-4-yn-13-
trans-ene and 6{-methyl-1,9α-diacetoxy-6{-
hydroxy-11α,15α-bistetrahydropyranyloxy-20-
norprost-4-yn-13-trans-ene;
6{ ,20-dimethyl- 1,6{,9α-triacetoxy-11α,15α-
bistetrahydropyranyloxyprost-4-yn-13-trans-ene
and 6{, 20-dimethyl-1,960 -diacetoxy-6{-hydroxy-
11α,15α-bistetrahydropyranyloxyprost-4-yn-13-
trans-ene;
6{-methyl-1,6{,9α-triacetoxy-11α,15α-
bistetrahydropyranyloxy-20-ethylprost-4-yn-13-
trans-ene and 6{-methyl-1,9α-diacetoxy-6{-
hydroxy-11α,15α-bistetrahydropyranyloxy-20-
ethylprost-4-yn-13-trans-ene and
6{-methyl-1,6{,9α-triacetoxy-11α,15α-bistetrahydropyranyloxy-20 -pentylprost-4-yn-13-trans-ene
and 6{-methyl-1,9α-diacetoxy-6{-hydroxy-
11α,15α-bistetrahydropyranyloxy-20-pentylprost-
4-yn-13-trans-ene.

EXAMPLE 15A.

By following the method of Example 15, using 8R-6{-methyl-1,6{,9α-trihydroxy-11α,15α-bistetrahydropyranyloxyprost-4-yn-13-trans-ene as starting material there are obtained 8R-6{-methyl-1,6{,9α-triacetoxy-11α,15α-bistetrahydropyranyloxyprost-4-yn-13-trans-ene (8R-antimer of VI, $R^{5'}$ = methyl, $R^{1'}$ = tetrahydropyranyloxy; $n = 4$) and 8R-6{-methyl-1,9α-diacetoxy-6{-hydroxy-11α,15α-bistetrahydropyranyloxyprost-4-yn-13-trans-ene (8R-antimer of VII, $R^{5'}$ = methyl, $R^{1'}$ = tetrahydropyranyloxy; $n = 4$).

In a similar manner, starting from 8R-6{-methyl-1,6{,9α-trihydroxy-15α-tetrahydropyranyloxyprost-4-yn-13-trans-ene,
8R-6 -ethyl-1,6{,9α-trihydroxy-11α,15α-
bistetrahydropyranyloxyprost-4-yn-13-trans-ene,
8R-6{-propyl-1,6{ 9α-trihydroxy-11α,15α-
bistetrahydropyranyloxyprost-4-yn-13-trans-ene,
8R-6{-methyl-1,6{,9α-trihydroxy-11α,15α-
bistetrahydropyranyloxy-20-bisnorprost-4-yn-13-
trans-ene, 8R-6{-methyl-1,6{,9α-trihydroxy-11α,15α-
bistetrahydropyranyloxy-20-norprost-4-yn-13-
trans-ene,
8R-6{ ,20 -dimethyl-1,6{,9α-trihydroxy-11α,15α-
bistetrahydropyranyloxyprost-4-yn-13-trans-ene,
8R-6{-methyl-1,6{,9α-trihydroxy-11α,15α-
bistetrahydropyranyloxy-20-methylprost-4-yn-13-
trans-ene,
8R-6{-methyl-1,6{,9α-trihydroxy-11α,15α-
bistetrahydropyranyloxy-20-ethylprost-4-yn-13-
trans-ene and 8R-6{-methyl-1,6{,9α-trihydroxy-
11α,15α-bistetrahydropyranyloxy-20-pentylprost-
4-yn-13-trans-ene, there are obtained respectively:
8R-6{-methyl-1,6{,9α-triacetoxy-
15αtetrahydropyranyloxyprost-4-yn-13-trans-ene
and 8R-6{-methyl-1,9α-diacetoxy-6{-hydroxy-
15α-tetrahydropyranyloxyprost-4-yn-13-trans-ene;
8R-6{-ethyl-1,6{,9α-triacetoxy-11α,15α-
bistetrahydropyranyloxyprost-4-yn-13-trans-ene
and 8R-6{-ethyl-1,9α-diacetoxy-6{-hydroxy-
11α,15α-bistetrahydropyranyloxyprost-4-yn-13-
trans-ene;
8R-6{-propyl-1,6{,9α-triacetoxy-11α,15α-
bistetrahydropyranyloxyprost-4-yn-13-trans-ene
and 8R-6{-propyl-1,9α-diacetoxy-6{-hydroxy-
11α,15α-bistetrahydropyranyloxyprost-4-yn-13-
trans-ene;
8R-6-methyl-1,6{,9α-triacetoxy-11α,15α-
bistetrahydropyranyloxy-20-bisnorprost-4-yn-13-
trans-ene and 8R-6{-methyl-1,9α-diacetoxy-6{-
hydroxy-11α,15α-bistetrahydropyranyloxy-20-
bisnorprost-4-yn-13-trans-ene;
8R-6{ -methyl- 1,6{,9α-triacetoxy-11α,15α-
bistetrahydropyranyloxy-20-1norprosst-4-yn-13-
trans-ene and 8R-6{-methyl-1,9α-diacetoxy-6{-
hydroxy-11α,15α-bistetrahydropyranyloxy-20-
norprost-4-yn-13-trans-ene;
8R-6{,20-dimethyl-1,6{,9α-triacetoxy-11α,15α-
bistetrahydropyranyloxyprost-4-yn-13-trans-ene
and 8R-6{,20-dimethyl-1,9α-diacetoxy-6{-
hydroxy-11α,15α-bistetrahydroyranyloxyprost-4-
yn-13-trans-ene;
8R-6{-methyl-1,6{,9α-triacetoxy-11α,15α-
bistetrahydropyranyloxy-20-ethylprost-4-yn-13-
trans-ene and 8R-6{-methyl-1,9α-diacetoxy-6{-
hydroxy-11α,15α-bistetrahydropyranyloxy-20-
ethylprost-4-yn-13-trans-ene and
8R-6{ -methyl- 1,6{,9α-triacetoxy-11α,15α-
bistetrahydropyranyloxy-20-pentylprost-4-yn-13-
trans-ene and 8R-6{-methyl-1,9α-diacetoxy-6{-
hydroxy-11α,15α-bistetrahydropyranyloxy-20-
pentylprost-4-yn-13-trans-ene.

EXAMPLE 16

A stirred suspension of 117.5 mg. of cuprous iodide in 2 ml. of anhydrous ether is cooled to about −10°C under an atmosphere of argon, and treated with 2 molar equivalents of a 2M solution of methyllithium in ether. The resultant colorless solution is cooled to −70°C in a dry iceacetone bath, a solution of 100 mg. of 6{-methyl-1,6{,9α-triacetoxy-11α,15α-bistetrahydropyranyloxyprost-4-yn-13-trans-ene in 3 ml. of anhydrous ether is then added and the reaction mixture stirred at −70°C for 5 hours. The temperature of the mixture is raised to −10°C, saturated ammonium chloride solution is added, and the mixture is stirred for 1 hour and extracted with ether. The organic extract is washed with saturated sodium chloride solution, dried over magnesium sulfate and evaporated to dryness under reduced pressure, to afford 6-methyl-1,9α-diacetoxy-11α,15α-bistetrahydropyranyloxyprosta-4,5,13-trans-triene (VIII, R = H; $R^5$ = methyl; $R^{1''}$ = tetrahydropyranyloxy; $n$ = 4).

In a similar manner, but using 6{-methyl-1,6{,9α-triacetoxy-15α-tetrahydropyranyloxyprost-4-yn-13-trans-ene,
6{-ethyl-1,6{,9α-triacetoxy-11α,15α-
bistetrahydropyranyloxyprost-4-yn-13-trans-ene,
6{-propyl-1,6{,9α-triacetoxy-11α,15α-
bistetrahydropyranyloxyprost-4-yn-13-trans-ene,
6{-methyl-1,6{,9α-triacetoxy-11α,15α-
bistetrahydropyranyloxy-20-bisnorprost-4-yn-13-
trans-ene,
6{-methyl-1,6{,9α-triacetoxy-11α,15α-
bistetrahydropyranyloxy-20-norprost-4-yn-13-
trans-ene,
6{,20-dimethyl-1,6{,9α-triacetoxy-11α,15α-
bistetrahydropyranyloxyprost-4-yn-13-trans-ene,
6{-methyl-1,6{9α-triacetoxy-11α,15α-
bistetrahydropyranyloxy-20-ethylprost-4-yn-13-
trans-ene and
6{-methyl-1,6{,9α-triacetoxy-11α,15α-
bistetrahydropyranyloxy-20-pentylprost-4-yn-13-
trans-ene in place of 6{-methyl-1,6{-methyl-
1,6{ ,9α- triacetoxy-11α,15α-
bistetrahydropyranyloxyprost-4-yn-13-transene
there are obtained:
6-methyl-1,9α-diacetoxy-15α-
tetrahydropyranyloxyprosta-4,5,13-trans-triene,
6-ethyl- 1,9α-diacetoxy-11α,15α-
bistetrahydropyranyloxyprosta-4,5,13-trans-triene,
6-propyl-1,9α-diacetoxy-11α,15α-
bistetrahydropyranyloxyprosta-4,5,13-trans-triene,
6-methyl-1,9α-diacetoxy-11 ,15α-
bistetrahydropyranyloxy-20-bisnorprosta-4,5,13-
trans-triene,
6-methyl-1,9α-diacetoxy-11α,15α-
bistetrahydropyranyloxy-20-norprosta-4,5,13-
trans-triene,
6,20-dimethyl-1,9α-diacetoxy-11α,15α-
bistetrahydropyranyloxyprosta-4,5,13-trans-triene,
6-methyl-1,9α-diacetoxy-11α,15α-
bistetrahydropyranyloxy-20-ethylprosta-4,5,13-
trans-triene and
6-methyl-1,9α-diacetoxy-11α,15α-
bistetrahydropyranyloxy-20-pentylprosta-4,5,13-
trans-triene, respectively.

EXAMPLE 16A

By following the method of Example 16, 8R-6{-methyl-1,6{,9α-triacetoxy-11α,15α-bistetrahydropyranyloxyprost 4-yn-13-trans-ene is converted into 8R-6-methyl-1,9α-diacetoxy-11α,15α-bistetrahydropyranyloxyprosta-4,5,13-trans-triene (8R-antimer of VIII, R = H; $R^5$ = methyl; $R^{1''}$ = tetrahydropyranyloxy; $n$ = 4).

In a similar manner, starting from the correseponding 8R-6{-alkyl-1,6{,9α-triacetoxyprost-4-yn-13-trans-ene compounds there are obtained:
8R-6-methyl-1,9α-diacetoxy-15α-
tetrahydropyranyloxyprosta-4,5,13-trans-triene,
8R-6-ethyl-1,9α-diacetoxy-11α,15α-
bistetrahydropyranyloxyprosta-4,5,13-trans-triene, -bistetrahydropyranyloxyprosta-R-6-propyl-1,9α-diacetoxy-11α,15α-bistetkrahydropyranylooxyprosta-4,5,13-trans-triene, 8R-6-methyl-1,9α-diacetoxy-11α,15α-bistetrahydropyranyloxy-20-bisnorprosta-4,5,13-trans-triene, 8R-6-methyl-1,9α-diacetoxy-11α,15α-bistetrahydropyranyloxy-20-norprosta-4,5,13-trans-triene, 8R-6,20-dimethyl-1,9α-diacetoxy-11α,15α-bistetrahydropyranyloxyprosta-4,5,13-trans-triene, 8R-6-methyl-1,9α-diacetoxy-11α,15α-bistetrahydropyranyloxy-20-ethylprosta-4,5,13-trans-triene and 8R-6-methyl-1,9α-diacetoxy-11α,15α-bistetrahydropyranyloxy-20-pentylprosta-4,5,13-trans-triene.

EXAMPLE 17

A mixture of 110 mg. of 6-methyl-1,9α-diacetoxy-11α,15α-bistetrahydropyranyloxyprosta-4,5,13-trans-triene, 50 mg. of anhydrous potassium carbonate and 2 ml. of anhydrous methanol is stirred at room temperature for 18 hours, under an argon atmosphere. The solvent is then eliminated under reduced pressure, water is added and the product extracted with ether. The ether extract is washed with saturated sodium chloride solution, dried over magnesium sulfate and evaporated to dryness under reduced pressure to afford 6-methyl-1,9α-dihydroxy-11α,15α-bistetrahydropyranyloxyprosta-4,5,13-trans-triene.

Upon oxidation of the latter compound with 8N chromic acid followed by hydrolysis of the tetrahydropyranyloxy functions with aqueous 65 percent acetic acid, in accordance with the methods of Example 5, there is produced 6-methyl-9-keto-11α,15α-dihydroxyprosta-4,5,13-trans-trienoic acid (XI, R = H; $R^{1'''}$ = hydroxy; $R^5$ = methyl; $n = 4$).

Likewise, starting from 6-methyl-1,9α-diacetoxy-15α-tetrahydropyranyloxyprosta-4,5,13-trans-triene, 6-ethyl-1,9α-diacetoxy-11α,15α-bistetrahydropyranyloxyprosta-4,5,13-trans-triene, 6-propyl-1,9α-diacetoxy-11α,15α-bistetrahydropyranyloxyprosta-4,5,13-trans-triene, 6-methyl-1,9α-diacetoxy-11α,15α-bistetrahydropyranyloxy-20-bisnorprosta-4,5,13-trans-triene, 6-methyl-1,9α-diacetoxy-11α,15α-bistetrahydropyranyloxy-20-norprosta-4,5,13-trans-triene, 6,20-dimethyl-1,9α-diacetoxy-11α,15α-bistetrahydropyranyloxyprosta-4,5,13-trans-triene, 6-methyl-1,9α-diacetoxy-11α,15α-bistetrahydropyranyloxy-20-ethylprosta-4,5,13-trans-triene, and 6-methyl-1,9α-diacetoxy-11α,15α-bistetrahydropyranyloxy-20-pentylprosta-4,5,13-trans-triene, there are produced as final products:

6-methyl-9-keto-15α-hydroxyprosta-4,5,13-trans-trienoic acid, 6-ethyl-9-keto-11α,15α-dihydroxyprosta-4,5,13-trans-trienoic acid, 6-propyl-9-keto-11α,15α-dihydroxyprosta-4,5,13-trans-trienoic acid, 6-methyl-9-keto-11α,15α-dihydroxy-20-bisnorprosta-4,5,13-trans-trienoic acid, 6-methyl-9-keto-11α,15α-dihydroxy-20-norprosta-4,5,13-trans-trienoic acid, 6,20-dimethyl-9-keto-11α,15α-dihydroxyprosta-4,5,13-trans-trienoic acid, 6-methyl-9-keto-11α,15α-dihydroxy-20-ethylprosta-4,5,13-trans-trienoic acid and 6-methyl-9-keto-11α,15α-dihydroxy-20-pentylprosta-4,5,13-trans-trienoic acid, respectively.

EXAMPLE 17A

Example 17 is repeated using 8R-6-methyl-1,9α-diacetoxy-11α,15α-bistetrahydropyranyloxyprosta-4,5,13-trans-triene as starting compound, thus obtaining 8R-6-methyl-9-keto-11α,15α-dihydroxyprosta-4,5,13-trans-trienoic acid (8R-antimer of XI, R = H; $R^{1'''}$ = hydroxy; $R^5$ = methyl; $n = 4$) as final product.

Likewise, starting from the corresponding 8R-6-alkyl-1,9α-diacetoxy-15α-tetrahydropyranyloxy or 11-α,15α-bistetrahydropyranyloxyprosta-4,5,13-trans-triene compounds there are obtained as final products:

8R-6-methyl-9-keto-15α-hydroxyprosta-4,5,13-trans-trienoic acid, 8R-6-ethyl-9-keto-11α,15α-dihydroxyprosta-4,5,13-trans-trienoic acid, 8R-6-propyl-9-keto-11α,15α-dihydroxyprosta-4,5,13-trans-trienoic acid, 8R-6-methyl-9-keto-11α,15α-dihydroxy-20-bisnorprosta-4,5,13-trans-trienoic acid, 8R-6-methyl-9-keto-11α,15α-dihydroxy-20-norprosta-4,5,13-trans-trienoic acid, 8R-6,20-dimethyl-9-keto-11α,15α-dihydroxyprosta-4,5,13-trans-trienoic acid, 8R-6-methyl-9-keto-11α,15α-dihydroxy-20-ethylprosta-4,5,13-trans-trienoic acid, and 8R-6-methyl-9-keto-11α,15α-dihydroxy-20-pentylprosta-4,5,13-trans-trienoic acid.

EXAMPLE 18

A solution of 100 mg. of 6{-methyl-1,6,{,9α-triacetoxy-11α,15α-bistetrahydropyranyloxyprost-4-yn-13-trans-ene in 3 ml. of anhydrous ether is cooled to 0°C and treated, under argon atmosphere, with one molar equivalent of lithium dimethylcopper, (prepared as described in part A of Example 7). The reaction mixture is stirred for 5 hours at 0°C., saturated ammonium chloride solution is added, and the mixture is stirred for 1 hour and extracted with ether. The organic extract is washed with saturated sodium chloride solution, dried over magnesium sulfate and evaporated under reduced pressure. The residue is purified by chromatography on Florisil. The fractions eluted with methylene chloride-ether (80:20) afford the pure 4,6-dimethyl-1,9α-diacetoxy-11α,15α-bistetrahydropyranyloxyprosta-4,5,13-trans-triene (VIII, R and $R^5$ = methyl; $R^{1'}$ = tetrahydropyranyloxy; $n = 4$).

In a similar manner but using 6{-methyl-1,6},9α-triacetoxy-15α-tetrahydropyranyloxyprost-4-yn-13-trans-ene, 6{-ethyl-1,6},9α-triacetoxy-11α,15α-bistetrahydropyranyloxyprost-4-yn-13-trans-ene, 6{-propyl-1,6},9α-triacetoxy-11α,15α-bistetrahydropyranyloxyprost-4-yn-13-trans-ene, 6{-methyl-1, 6},9α-triacetoxy-11α,15α-bistetrahydropyranyloxy-20-bisnorprost-4-yn-13-trans-ene and 6{-methyl-1,6},9α-triacetoxy-11α,15α-bistetrahydropyranyloxy-20-ethylprost-4-yn-13- trans-ene as starting materials, there are obtained respectively:

4,6-dimethyl-1,9α-diacetoxy-15α-tetrahydropyranyloxyprosta-4,5,13-trans-triene,
4-methyl-6-ethyl-1,9α-diacetoxy-11α,15α-bistetrahydropyranyloxyprosta-4,5,13-trans-triene,
4-methyl-6-propyl-1,9α-diacetoxy-11α,15α-bistetrahydropyranyloxyprosta-4,5,13-trans-triene,
4,6-dimethyl-1,9α-diacetoxy-11α,15α-bistetrahydropyranyloxy-20-bisnorprosta-4,5,13-trans-triene and
4,6,-dimethyl-1,9α-diacetoxy-11α,15α-bistetrahydropyranyloxy-20-ethylprosta-4,5,13-trans-triene.

Similarly, but using 1 molar equivalent of lithium diethylcopper and lithium dipropylcopper in lieu of lithium dimethylcopper, 6{-methyl-1,6{,9α-triacetoxy-11α,15α-bistetrahydropyranyloxyprost-4-yn-13-trans-ene is converted respectively into 4-ethyl-6-methyl-1,9α-diacetoxy-11α,15α-bistetrahydropyranyloxyprosta-4,5,13-trans-triene and 4-propyl-6-methyl-1,9α-diacetoxy-11α,15α-bistetrahydropyranyloxyprosta-4,5,13-trans-triene.

EXAMPLE 18A

By following the method of Example 18, 8R-6{-methyl-1,6{,9α-triacetoxy-11α,15α-bistetrahydropyranyloxyprost-4-yn-13-trans-ene is converted into 8R-4,6-dimethyl-1,9α-diacetoxy-11α,15α-bistetrahydropyranyloxyprosta-4,5,13-trans-triene (8R-antimer of VIII, R and $R^5$ = methyl; $R^{1'}$ = tetrahydropyranyloxy; $n$ = 4).

In a similar manner but using 8R-6{-methyl-1,6{,9α-triacetoxy-15α-tetrahydropyranyloxyprost-4-yn-13-trans-ene, 8R-6{-ethyl-1,6{,9α-triacetoxy-11α,15α -bistetrahydropyranyloxyprost-4-yn-13-trans-ene,
8R-6{-propyl-1,6{,9α-triacetoxy-11α,15α-bistetrahydropyranyloxyprost-4-yn-13-trans-ene,
8R-6{-methyl-1,6{,9α-triacetoxy-11α,15α-bistetrahydropyranyloxy-20-bisnorprost-4-yn-13-trans-ene and
8R-6{-methyl-1,6{,9α-triacetoxy-11α,15α-bistetrahydropyranyloxy-20-ethylprost-4-yn-13-trans-ene as starting materials, there are obtained respectively:

8R-4,6-dimethyl-1,9α-diacetoxy-15α-tetrahydropyranyloxyprosta-4,5,13-trans-triene,
8R-4-methyl-6-ethyl-1,9α-diacetoxy-11α,15α-bistetrahydropyranyloxyprosta-4,5,13-trans-triene,
8R-4-methyl-6-propyl-1,9α-diacetoxy-11α,15α-bistetrahydropyranyloxyprosta-4,5,13-trans-triene,
8R-4,6-dimethyl-1,9α-diacetoxy-11α,15α-bistetrahydropyranyloxy-20-bisnorprosta-4,5,13-trans-triene and
8R-4,6-dimethyl-1,9α-diacetoxy-11α,15α-bistetrahydropyranyloxy-20-ethylprosta-4,5,13-trans-triene.

By using 1 molar equivalent of lithiumdiethylcopper or lithium dipropylcopper in lieu of lithium dimethylcopper there are obtained the corresponding 4-methyl- or 4-ethyl derivatives.

EXAMPLE 19

Examples 4 and 5 are repeated using 4,6-dimethyl-1,9α-diacetoxy-11α,15αbistetrahydropyranyloxyprosta-4,5,13-trans-triene as starting material, to produce successively:

4,6-dimethyl-1,9α-dihydroxy-11α,15α-bistetrahydropyranyloxyprosta-4,5,13-trans-triene,
4,6-dimethyl-9-keto-11α,15α-bistetrahydropyranyloxyprosta-4,5,13-trans-trienoic acid and 4,6-dimethyl-9-keto-11α,15α-dihydroxyprosta-4,5,13-trans-trienoic acid (XI, R and $R^5$ = methyl; $R^{1'''}$ = hydroxy; $n$ = 4).

In a similar manner, starting from 4,6-dimethyl-1,9α-diacetoxy-15α-tetrahydropyranyloxyprosta-4,5,13-trans-triene,
4-methyl-6-ethyl-1,9α-diacetoxy-11α,15α-bistetrahydropyranyloxyprosta-4,5,13-trans-triene,
4-methyl-6-propyl-1,9α-diacetoxy-11α,15α-bistetrahydropyranyloxyprosta-4,5,13-trans-triene,
4-ethyl-6-methyl-1,9α-diacetoxy-11α,15α-bistetrahydropyranyloxyprosta-4,5,13-trans-triene,
4-propyl-6-methyl-1,9α-diacetoxy-11α,15α-bistetrahydropyranyloxyprosta-4,5,13-trans-triene,
4,6-dimethyl-1,9α-diacetoxy-11α,15α-bistetrahydropyranyloxy-20-bisnorprosta-4,5,13-trans-triene, and
4,6-dimethyl-1,9α-diacetoxy-11α,15α-bistetrahydropyranyloxy-20-ethylprosta-4,5,13-trans-triene, there are produced as final products:
4,6-dimethyl-9-keto-15α-hydroxyprosta-4,5,13-trans-trienoic acid,
4-methyl-6-ethyl-9-keto-11α,15α-dihydroxyprosta-4,5,13-trans-trienoic acid,
4-methyl-6-propyl-9-keto-11α,15α-dihydroxyprosta-4,5,13-trans-trienoic acid,
4-ethyl-6-methyl-9-keto-11α,15α-dihydroxyprosta-4,5,13-trans-trienoic acid,
4-propyl-6-methyl-9-keto-11α,15α-dihydroxyprosta-4,5,13-trans-trienoic acid,
4,6-dimethyl-9-keto-11α,15α-dihydroxy-20-bisnorprosta-4,5,13-trans-trienoic acid, and 4,6-dimethyl-9-keto-11α,15α-dihydroxy-20-ethylprosta-4,5,13-trans-trienoic acid, respectively.

EXAMPLE 19A

Examples 4 and 5 are repeated using 8R-4,6-dimethyl-1,9α-diacetoxy-11α,15α-bistetrahydropyranyloxyprosta-4,5,13-trans-triene as starting material, to produce successively:

8R-4,6-dimethyl-1,9α-dihydroxy-11α,15α-bistetrahydropyranyloxyprosta-4,5,13-trans-triene,
8R-4,6-dimethyl-9-keto-11α,15α-bistetrahydropyranyloxyprosta-4,5,13-trans-trienoic acid and
8R-4,6-dimethyl-9-keto-11α,15α-dihydroxyprosta-4,5,13-trans-trienoic acid (8R-antimer of XI, R and $R^5$ = methyl; $R^{1'''}$ = hydroxy; $n$ = 4).

In a similar manner, starting from 8R-4,6-dimethyl-1,9α-diacetoxy-15α-tetrahydropyranyloxyprosta-4,5,13-trans-triene,
8R-4-methyl-6-ethyl-1,9α-diacetoxy-11α,15α-bistetrahydropyranyloxyprosta-4,5,13-trans-triene,
8R-4-methyl-6-propyl-1,9α-diacetoxy-11α,15α-bistetrahydropyranyloxyprosta-4,5,13-trans-triene,
8R-4-ethyl-6-methyl-1,9α-diacetoxy-11α,15α-bistetrahydropyranyloxyprosta-4,5,13-trans-triene,
8R-4-propyl-6-methyl-1,9α-diacetoxy-11α,15α-bistetrahydropyranyloxyprosta-4,5,13-trans-triene,
8R-4,6-dimethyl-1,9α-diacetoxy-11α,15α-bistetrahydropyranyloxy-20-bisnorprosta-4,5,13-trans-triene, and 8R-4,6-dimethyl-1,9α-diacetoxy-11α,15α-bistetrahydropyranyloxy-20-ethylprosta-4,5,13-trans-triene, there are produced as final products:

8R-4,6-dimethyl-9-keto-15α-hydroxyprosta-4,5,13-trans-trienoic acid, 8R-4-methyl-6-ethyl-9-keto-11α,15α-dihydroxyprosta-4,5,13-trans-trienoic acid, 8R-4-methyl-6-propyl-9-keto-11α,15α-dihydroxyprosta-4,5,13-trans-trienoic acid, 8R-4-ethyl-6-methyl-9-keto-11α,15α-dihydroxyprosta-4,5,13-trans-trienoic acid, 8R-4-propyl-6-methyl-9-keto-11α,15α-dihydroxyprosta-4,5,13-trans-trienoic acid, 8R-4,6-dimethyl-9-keto-11α,15α-dihydroxy-20-bisnorprosta-4,5,13-trans-trienoic acid, and 8R-4,6-dimethyl-9-keto-11α,15α-dihydroxy-20-ethylprosta-4,5,13-trans-trienoic acid, respectively.

EXAMPLE 20

A solution of 453 mg. of 6-methyl-1,9α-diacetoxy-11α,15α-bistetrahydropyranyloxyprosta-4,5,13-trans-triene in 5 ml. of methanol is cooled to −10°C. and treated, under argon atmosphere, with 1.1 molar equivalents of potassium carbonate. The reaction mixture is stirred for 6 hours at −10°C. and then evaporated to dryness under reduced pressure, water is added and the product extracted with ether. The ether extract is washed with saturated sodium chloride solution, dried over magnesium sulfate and evaporated to dryness under vacuo. The residue is purified by t.l.c., to produce the pure 6-methyl-9α-acetoxy-11α,15α-bistetrahydropyranyloxyprosta-4,5,13-trans-trien-1-ol (XII, R = H; $R^5$ = methyl; $R^{1\prime}$ = tetrahydropyranyloxy; $n = 4$).

Upon oxidation of the foregoing compound with 8N chromic acid, in accordance with the method of Example 5, there is produced 6-methyl-9α-acetoxy-11α,15α-bistetrahydropyranyloxyprosta-4,5,13-trans-trienoic acid, (XIII, R = H; $R^5$ = methyl; $R^{1\prime}$ = tetrahydropyranyloxy; $n = 4$).

A mixture of 300 mg. of 6-methyl-9α-acetoxy-11α,15α-bistetrahydropyranyloxyprosta-4,5,13-trans-trienoic acid, 5 ml. of anhydrous methanol and 150 mg. of anhydrous potassium carbonate is stirred at room temperature for 18 hours, under an argon atmosphere. The solvent is then eliminated under reduced pressure, water is added and then acidified with acetic acid. The product is extracted with ether and the organic extract washed with saturated sodium chloride solution, dried over magnesium sulfate and evaporated to dryness under reduced pressure, to afford 6-methyl-9α-hydroxy-11α,15α-bistetrahydropyranyloxyprosta-4,5,13-trans-trienoic acid (XIV, R = H; $R^5$ = methyl; $R^{1\prime}$ = tetrahydropyranyloxy; $n = 4$).

A solution of 50 mg. of 6-methyl-9α-hydroxy-11α,15α-bistetrahydropyranyloxyprosta-4,5,13-trans-trienoic acid in 0.15 ml. of tetrahydrofuran is treated with 1.3 ml. of 65 percent aqueous acetic acid. The reaction mixture is stirred at 45°C for 4 hours, cooled to 0°C and evaporated to dryness under reduced pressure; the oily residue is purified by t.l.c. using chloroform:methanol (9:1) as eluant, thus yielding the pure 6-methyl-9α,11α,15α-trihydroxyprosta-4,5,13-trans-trienoic acid (XV, R = H; $R^5$ = methyl; $R^{1\prime\prime\prime}$ = hydroxy; $n = 4$).

Likewise, starting from:

4,6-dimethyl-1,9α-diacetoxy-15α-tetrahydropyranyloxyprosta-4,5,13-trans-triene, 4,6-dimethyl-1,9α-diacetoxy-11α,15α-bistetrahydropyranyloxyprosta-4,5,13-trans-triene, 4-methyl-6-ethyl-1,9α-diacetoxy-11α,15α-bistetrahydropyranyloxyprosta-4,5,13-trans-triene, 4-ethyl-6-propyl-1,9α-diacetoxy-11α,15α-bistetrahydropyranyloxyprosta-4,5,13-trans-triene, 4-ethyl-6-methyl-1,9α-diacetoxy-11α,15α-bistetrahydropyranyloxyprosta-4,5,13-trans-triene, 4-propyl-6-methyl-1,9α-diacetoxy-11α,15α-bistetrahydropyranyloxyprosta-4,5,13-trans-triene, 4,6-dimethyl-1,9α-diacetoxy-11α,15α-bistetrahydropyranyloxy-20-bisnorprosta-4,5,13-trans-triene and 4,6-dimethyl-1,9α-diacetoxy-11α,15α-bistetrahydropyranyloxy-20-ethylprosta-4,5,13-trans-triene, there are produced as final products:

4,6-dimethyl-9α,15α-dihydroxyprosta-4,5,13-trans-trienoic acid, 4,6-dimethyl-9α,11α,15α-trihydroxyprosta-4,5,13-trans-trienoic acid, 4-methyl-6-ethyl-9α,11α,15α-trihydroxyprosta-4,5,13-trans-trienoic acid, 4-ethyl-6-propyl-9α,11α,15α-trihydroxyprosta-4,5,13-trans-trienoic acid, 4-ethyl-6-methyl-9α,11α,15α-trihydroxyprosta-4,5,13-trans-trienoic acid, 4-propyl-6-methyl-9α,11α,15α-trihydroxyprosta-4,5,13-trans-trienoic acid, 4,6-dimethyl-9α,11α,15α-trihydroxy-20-bisnorprosta-4,5,13-trans-trienoic acid, and 4,6-dimethyl-9α,11α,15α-trihydroxy-20-ethylprosta-4,5,13-trans-trienoic acid, respectively.

EXAMPLE 20A

Example 20 is repeated using 8R-6-methyl-1,9α-diacetoxy-11α,15α-bistetrahydropyranyloxyprosta-4,5,13-trans-triene as starting material, thus obtaining 8R-6-methyl-9α,11α,15α-trihydroxyprosta-4,5,13-trans-trienoic acid (8R-antimer of XV, R = H; $R^5$ = methyl; $R^{1\prime\prime\prime}$ = hydroxy; $n = 4$) as final product.

Likewise, starting from:

8R-4,6-dimethyl-1,9α-diacetoxy-15α-tetrahydropyranyloxyprosta-4,5,13-trans-triene, 8R-4,6-dimethyl-1,9α-diacetoxy-11α,15α-bistetrahydropyranyloxyprosta-4,5,13-trans-triene, 8R-4-methyl-6-ethyl-1,9α-diacetoxy-11α,15α-bistetrahydropyranyloxyprosta-4,5,13-trans-triene, 8R-4-ethyl-6-propyl-1,9α-diacetoxy-11α,15α-bistetrahydropyranyloxyprosta-4,5,13-trans-triene, 8R-4-ethyl-6-methyl-1,9α-diacetoxy-11α,15α-bistetrahydropyranyloxyprosta-4,5,13-trans-triene, 8R-4-propyl-6-methyl-1,9α-diacetoxy-11α,15α-bistetrahydropyranyloxyprosta-4,5,13-trans-triene, 8R-4,6-dimethyl-1,9α-diacetoxy-11α,15α-bistetrahydropyranyloxy-20-bisnorprosta-4,5,13-trans-triene, and 8R-4,6-dimethyl-1,9α-diacetoxy-11α,15α-bistetrahydropyranyloxy-20-ethylprosta-4,5,13-trans-triene, there are produced as final products:

8R-4,6-dimethyl-9α,15α-dihydroxyprosta-4,5,13-trans-trienoic acid, 8R-4,6-dimethyl-9α,11α,15α-trihydroxyprosta-4,5,13-trans-trienoic acid, 8R-4-methyl-6-ethyl-9α,11α,15α-trihydroxyprosta-4,5,13-trans-trienoic acid, 8R-4-ethyl-6-propyl-9α,11α,15α-trihydroxyprosta-4,5,13-trans-trienoic acid,
8R-4-ethyl-6-methyl-9α,11α,15α-trihydroxyprosta-4,5,13-trans-trienoic acid,
8R-4-propyl-6-methyl-9α,11α,15α-trihydroxyprosta-4,5,13-trans-treinoic acid,
8R-4,6-dimethyl-9α,11α,15α-trihydroxy-20-bisnorprosta-4,5,13-trans-trienoic acid and
8R-4,6-dimethyl-9α,11α,15α-trihydroxy-20-ethylprosta-4,5,13 -trans-trienoic acid, respectively.

EXAMPLE 21

To a solution of 500 mg. of 9-keto-11α,15α-dihydroxyprosta-4,5,13-trans-trienoic acid in 10 ml. of methylene chloride is added an excess of ethereal diazomethane and the reaction mixture is kept at room temperature for 30 minutes. It is then evaporated to dryness under vacuo, to yield 9-keto-11α,15α-dihydroxyprosta-4,5,13-trans-trienoic acid methyl ester.

The foregoing crude compound is dissolved in 10 ml. of methanol and the resultant solution cooled to 0°C. To the cold solution are added 250 mg. of sodium borohydride, and the reaction mixture is stirred at room temperature for 30 minutes. The solvent is then eliminated under reduced pressure, water is added and the product extracted with ethyl acetate. The organic extract is washed with dilute hydrochloric acid solution and water to neutral, dried over magnesium sulfate and evaporated to dryness under reduced pressure. The residue is purified by chromatography on silica gel using methylene chloride-ethyl acetate mixtures to thus obtain 9α,11α,15α-trihydroxyprosta-4,5,13-trans-trienoic acid methyl ester, and 9β,11α,15α-trihydroxyprosta-4,5,13-trans-trienoic acid methyl ester in approximately equal amounts (XVI, R and $R^5$ = H; $R^{1'''}$ = hydroxy; $R^{4'}$ = methyl; $n = 4$).

In a similar manner, starting from 9-keto-15α-hydroxyprosta-4,5,13-trans-trienoic acid,
9-keto-15α-hydroxy-20-ethylprosta-4,5,13-trans-trienoic acid,
0-keto-11α,15α-dihydroxy-20-bisnorprosta-4,5,13-trans-trienoic acid,
9-keto-11α,15α-dihydroxy-20-ethylprosta-4,5,13-trans-trienoic acid,
9-keto-11α,15α-dihydroxy-20-pentylprosta-4,5,13-trans-trienoic acid,
4-methyl-9-keto-11α,15α-dihydroxyprosta-4,5,13-trans-trienoic acid,
6-methyl-9-keto-11α,15α-dihydroxyprosta-4,5,13-trans-trienoic acid and
4-propyl-6-methyl-9-keto-11α,15α-dihydroxyprosta-4,5,13-trans-trienoic acid, there are obtained, respectively:
9α,15α-dihydroxyprosta-4,5,13-trans-trienoic acid methyl ester and 9β,15α-dihydroxyprosta-4,5,13-trans-trienoic acid methyl ester;
9α,15α-dihydroxy-20-ethylprosta-4,5,13-trans-trienoic acid methyl ester and 9β,15α-dihydroxy-20-ethylprosta-4,5,13-trans-trienoic acid methyl ester,
9α,11α,15α-trihydroxy-20-bisnorprosta-4,5,13-trans-trienoic acid methyl ester and 9β,11α,15α-trihydroxy-20-bisnorprosta-4,5,13-trans-trienoic acid methyl ester;
9α,11α,15α-trihydroxy-20-ethylprosta-4,5,13-trans-trienoic acid methyl ester and 9β,11α,15α-trihydroxy-20-ethylprosta-4,5,13-trans-trienoic acid methyl ester;
9α,11α,15α-trihydroxy-20-pentylprosta-4,5,13-trans-trienoic acid methyl ester and 9β,11α,15α-trihydroxy-20-pentylprosta-4,5,13-trans-trienoic acid methyl ester;
4-methyl-9α,11α,15α-trihydroxyprosta-4,5,13-trans-trienoic acid methyl ester and 4-methyl-9β,11α,15α-trihydroxyprosta-4,5,13-trans-trienoic acid methyl ester;
6-methyl-9α,11α,15α-trihydroxyprosta-4,5,13-trans-trienoic acid methyl ester and 6-methyl-9β,11α,15α-trihydroxyprosta-4,5,13-trans-trienoic acid methyl ester and
4-propyl-6-methyl-9α,11α,15α-trihydroxyprosta-4,5,13-trans-trienoic acid methyl ester and 4-propyl-6-methyl-9β,11α,15α-trihydroxyprosta-4,5,13-trans-trienoic acid methyl ester.

EXAMPLE 21A

Example 21 is repeated using 8R-9-keto-11α,15α-dihydroxyprosta-4,5,13-trans-trienoic acid as starting material, thus obtaining as final products 8R-9α,11α,15α-trihydroxyprosta-4,5,13-trans-trienoic acid methyl ester and 8R-9β,11α,15α-trihydroxyprosta-4,5,13-trans-trienoic acid methyl ester in approximately equal amounts (8R-antimers of XVI, R and $R^5$ = H; $R^{1'''}$ = hydroxy; $R^{4'}$ = methyl; $n = 4$).

In a similar manner, starting from 8R-9-keto-15α-hydroxyprosta-4,5,13-trans-trienoic acid,
8R-9-keto-15α-hydroxy-20-ethylprosta-4,5,13-trans-trienoic acid,
8R-9-keto-11α,15α-dihydroxy-20-bisnorprosta-4,5,13-trans-trienoic acid,
8R-9-keto-11α,15α-dihydroxy-20-ethylprosta-4,5,13-trans-trienoic acid,
8R-9-keto-11α,15α-dihydroxy-20-pentylprosta-4,5,13-trans-trienoic acid,
8R-4-methyl-9-keto-11α,15α-dihydroxyprosta-4,5,13-trans-trienoic acid,
8R-6-methyl-9-keto-11α,15α-dihydroxyprosta-4,5,13-trans-trienoic acid and
8R-4-propyl-6-methyl-9-keto-11α,15α-dihydroxyprosta-4,5,13-trans-trienoic acid, there are obtained, respectively:
8R-9α,15α-dihydroxyprosta-4,5,13-trans-trienoic acid methyl ester and 8R-9β,15α-dihydroxyprosta-4,5,13-trans-trienoic acid methyl ester;
8R-9α,15α-dihydroxy-20-ethylprosta-4,5,13-trans-trienoic acid methyl ester and 8R-9β,15α-dihydroxy-20-ethylprosta-4,5,13-trans-trienoic acid methyl ester;
8R-9α,11α,15α-trihydroxy-20-bisnorprosta-4,5,13-trans-trienoic acid methyl ester and 8R-9β,11α,15α-trihydroxy-20-bisnorprosta-4,5,13-trans-trienoic acid methyl ester;
8R-9α,11α,15α-trihydroxy-20-ethylprosta-4,5,13-trans-trienoic acid methyl ester and 8R-9β,11α,15α-trihydroxy-20-ethylprosta-4,5,13-trans-trienoic acid methyl ester;
8R-9α,11α,15α-trihydroxy-20-pentylprosta-4,5,13-trans-trienoic acid methyl ester and 8R-9β,11α,15α-trihydroxy-20-pentylprosta-4,5,13-trans-trienoic acid methyl ester;
4-methyl-9α,11α,15α-trihydroxyprosta-4,5,13-trans-trienoic acid methyl ester and 4-methyl-9β,11α,15α-trihydroxyprosta-4,5,13-trans-trienoic acid methyl ester;
6-methyl-9α,11α,15α-trihydroxyprosta-4,5,13-trans-trienoic acid methyl ester and 6-methyl-9β,11α,15α-trihydroxyprosta-4,5,13-trans-trienoic acid methyl ester and
4-propyl-6-methyl-9α,11α,15α-trihydroxyprosta-4,5,13-trans-trienoic acid methyl ester and 4-propyl-6-methyl-9β,11α,15α-trihydroxyprosta-4,5,13-trans-trienoic acid methyl ester.

8R-4-methyl-9α,11α,15α-trihydroxyprosta-4,5,13-trans-trienoic acid methyl ester and 8R-4-methyl-9β,11α,15α-trihydroxyprosta-4,5,13-trans-trienoic acid methyl ester;

8R-6-methyl-9α,11α,15α-trihydroxyprosta-4,5,13-trans-trienoic acid methyl ester and 8R-6-methyl-9β,11α,15α-trihydroxyprosta-4,5,13-trans-trienoic acid methyl ester; and 8R-4-propyl-6-methyl-9α,11α,15α-trihydroxyprosta-4,5,13-trans-trienoic acid methyl ester and 8R-4-propyl-6-methyl-9β,11α,15α-trihydroxyprosta-4,5,13-trans-trienoic acid methyl ester.

EXAMPLE 22

A mixture of 400 mg. of 9α-hydroxy-11α,15α-bistetrahydropyranyloxyprosta-4,5,13-trans-trienoic acid and 60 ml. of ethereal diazomethane is maintained at room temperature for 30 minutes. The solvent is then evaporated under vacuo, to yield 9α-hydroxy-11α,15α-bistetrahydopyranyloxy-prosta-4,5,13-trans-trienoic acid methyl ester (XIV-A, R and $R^5$ = H; $R^{1'}$ = tetrahydropyranyloxy; $n$ = 4).

In a similar manner, from the corresponding free acids there are produced the following compounds:

9α-hydroxy-15α-tetrahydropyranyloxyprosta-4,5,13-trans-trienoic acid methyl ester, 6-methyl-9α-hydroxy-11α,15α-bistetrahydropyranyloxyprosta-4,5,13-trans-trienoic acid methyl ester, 4,6-dimethyl-9α-hydroxy-15α-tetrahydropyranyloxyprosta-4,5,13-trans-trienoic acid methyl ester, 4-methyl-6-ethyl-9α-hydroxy-11α,15α-bistetrahydropyranyloxyprosta-4,5,13-trans-trienoic acid methyl ester, 4-propyl-6-methyl-9α-hydroxy-11α,15α-bistetrahydropyranyloxyprosta-4,5,13-trans-trienoic acid methyl ester, 9-keto-11α,15α-bistetrahydropyranyloxyprosta-4,5,13-trans-trienoic acid methyl ester, 9-keto-15α-tetrahydropyranyloxyprosta-4,5,13-trans-trienoic acid methyl ester, 4-methyl-9-keto-11α,15α-bistetrahydropyranyloxyprosta-4,5,13-trans-trienoic acid methyl ester, 6-methyl-9-keto-11α,15α-bistetrahydropyranyloxyprosta-4,5,13-trans-trienoic acid methyl ester, 4,6-dimethyl-9-keto-11α,15α-bistetrahydropyranyloxyprosta-4,5,13-trans-trienoic acid methyl ester, 4-propyl-6-methyl-9-keto-11α,15α-bistetrahydropyranyloxyprosta-4,5,13-trans-trienoic acid methyl ester, 9-keto-11α,15α-bistetrahydropyranyloxy-20-bisnorprosta-4,5,13-trans-trienoic acid methyl ester, 9-keto-11α,15α-bistetrahydropyranyloxy-20-methylprosta-4,5,13-trans-trienoic acid methyl ester, 9-keto-11α,15α-bistetrahydropyranyloxy-20-ethylprosta-4,5,13-trans-trienoic acid methyl ester, 4-methyl-9-keto-11α,15α-bistetrahydropyranyloxy-20-ethylprosta-4,5,13-trans-trienoic acid methyl ester, 9α-hydroxy-15α-tetrahydropyranyloxy-20-norprosta-4,5,13-trans-trienoic acid methyl ester, 9α-hydroxy-11α,15α-bistetrahydropyranyloxy-20-ethylprosta-4,5,13-trans-trienoic acid methyl ester, 9α-hydroxy-11α,15α-bistetrahydropyranyloxy-20-pentylprosta-4,5,13-trans-trienoic acid methyl ester and 9α-hydroxy-15α-tetrahydropyranyloxy-20-ethylprosta-4,5,13-trans-trienoic acid methyl ester.

EXAMPLE 22A

By following the method of Example 22, 8R-9α-hydroxy-11α,15α-bistetrahydropyranyloxyprosta-4,5,13-trans-trienoic acid is converted into 8R-9α-hydroxy-11α,15α-bistetrahydropyranyloxyprosta-4,5,13-trans-trienoic acid methyl ester (8R-antimer of XIVA, R and $R^5$ = H; $R^{1'}$ = tetrahydropyranyloxy; $n$ = 4).

In a similar manner, from the corresponding free acids there are produced the following compounds:

8R-9α-hydroxy-15α-tetrahydropyranyloxyprosta-4,5,13-trans-trienoic acid methyl ester, 8R-6-methyl-9α-hydroxy-11α,15α-bistetrahydropyranyloxyprosta-4,5,13-trans-trienoic acid methyl ester, 8R-4,6-dimethyl-9α-hydroxy-15α-tetrahydropyranyloxyprosta-4,5,13-trans-trienoic acid methyl ester, 8R-4-methyl-6-ethyl-9α-hydroxy-11α,15α-bistetrahydropyranyloxyprosta-4,5,13-trans-trienoic acid methyl ester, 8R-4-propyl-6-methyl-9α-hydroxy-11α,15α-bistetrahydropyranyloxyprosta-4,5,13-trans-trienoic acid methyl ester, 8R-9-keto-11α,15α-bistetrahydropyranyloxyprosta-4,5,13-trans-trienoic acid methyl ester, 8R-9-keto-15α-tetrahydropyranyloxyprosta-4,5,13-trans-trienoic acid methyl ester, 8R-4-methyl-9-keto-11α,15α-bistetrahydropyranyloxyprosta-4,5,13-trans-trienoic acid methyl ester, 8R-6-methyl-9-keto-11α,15α-bistetrahydropyranyloxyprosta-4,5,13-trans-trienoic acid methyl ester, 8R-4,6-dimethyl-9-keto-11α,15α-bistetrahydropyranyloxyprosta-4,5,13-trans-trienoic acid methyl ester, 8R-4-propyl-6-methyl-9-keto-11α,15α-bistetrahydropyranyloxyprosta-4,5,13-trans-trienoic acid methyl ester, 8R-9-keto-11α,15α-bistetrahydropyranyloxy-20-bisnorprosta-4,5,13-trans-trienoic acid methyl ester, 8R-9-keto-11α,15α-bistetrahydropyranyloxy-20-methylprosta-4,5,13-trans-trienoic acid methyl ester, 8R-9-keto-11α,15α-bistetrahydropyranyloxy-20-ethylprosta-4,5,13-trans-trienoic acid methyl ester, 8R-4-methyl-9-keto-11α,15α-bistetrahydropyranyloxy-20-ethylprosta-4,5,13-trans-trienoic acid methyl ester, 8R-9α-hydroxy-15α-tetrahydropyranyloxy-20-norprosta-4,5,13-trans-trienoic acid methyl ester, 8R-9α-hydroxy-11α,15α-bistetrahydropyranyloxy-20-ethylprosta-4,5,13-trans-trienoic acid methyl ester, 8R-9α-hydroxy-11α,15α-bistetrahydropyranyloxy-20-pentylprosta-4,5,13-trans-trienoic acid methyl ester, and 8R-9α-hydroxy-15α-tetrahydropyranyloxy-20-ethylprosta-4,5,13-trans-trienoic acid methyl ester.

EXAMPLE 23

Examples 1, 2, 3, 6 (part A) and 22 are repeated but using [2'α-hydroxy-4'α-tetrahydropyranyloxy-5'β-(3''β-tetrahydropyranyloxyoct-1''(t)-en-1''-yl)-cyclopent-1'α-yl]-acetaldehyde 1,2'-hemiacetal as starting material, thus obtaining successively 1,6{,9α-trihydroxy-11α,15β-bistetrahydropyranyloxyprost-4-yn-13-trans-ene, 1,6{,9α-triacetoxy-11α,15β-bistetrahydropyranyloxyprost-4-yn-13-trans-ene, 1,9α-diacetoxy-11α,15β-bistetrahydropyranyloxyprosta-4,5,13-trans-triene, 9α-acetoxy-11α,15β-bistetrahydropyranyloxyprosta-4,5,13-trans-trien-1-ol, 9α-hydroxy-11α,15β-bistetrahydropyranyloxyprosta-4,5,13-trans-trienoic acid, and 9α-hydroxy-11α,15β-bistetrahydropyranyloxyprosta-4,5,13-trans-trienoic acid methyl ester (XIV-A, R and $R^5$ = H; $R^{1'}$ = tetrahydropyranyloxy; $n$ = 4).

EXAMPLE 23A

Examples 1, 2, 3, 6 (part A) and 22 are repeated but using 1'R-[2'α-hydroxy-4'α-tetrahydropyranyloxy-5'β-(3''β-tetrahydropyranyloxyoct-1''(t)-en-1''-yl)-cyclopent-1'α-yl]-acetaldehyde 1,2'-hemiacetal as starting material, thus obtaining successively:

8R-1,6{,9α-trihydroxy-11α,15β-bistetrahydropyranyloxyprost-4-yn-13-trans-ene, 8R-1,6{,9α-triacetoxy-11α,15β-bistetrahydropyranyloxyprost-4-yn-13-trans-ene, 8R-1,9α-diacetoxy-11α,15β-bistetrahydropyranyloxyprosta-4,5,13-trans-triene, 8R-9α-acetoxy-11α,15β-bistetrahydropyranyloxyprosta-4,5,13-trans-trien-1-ol, 8R-9α-hydroxy-11α,15β-bistetrahydropyranyloxyprosta-4,5,13-trans-trienoic acid, and 8R-9α-hydroxy-11α,15β-bistetrahydropyranyloxyprosta-4,5,13-trans-trienoic acid methyl ester (8R-antimer of XIVA, R and $R^5$ = H; $R^{1'}$ = tetrahydropyranyloxy; $n$ = 4).

EXAMPLE 24

A solution of 500 mg. of 9α-hydroxy-11α,15β-bistetrahydropyranyloxyprosta-4,5,13-trans-trienoic acid methyl ester in 10 ml. of 65 percent aqueous acetic acid is stirred at room temperature for 18 hours. It is then evaporated to dryness under reduced pressure, the residue is dissolved in ethyl acetate and the solvent is eliminated by distillation under vacuo. The residue is purified by chromatography on 50 g. of Florisil. The fractions eluted with diethyl ether-ethyl acetate (80:20) yield the pure 9α,11α,15β-trihydroxyprosta-4,5,13-trans-trienoic acid methyl ester (XVI, R and $R^5$ = H; $R^{1'''}$ = hydroxy; $R^{4'}$ = methyl; $n$ = 4).

In a similar manner, starting from the corresponding 11α,15α-bistetrahydropyranyloxy or 15α-tetrahydropyranyloxy-compounds there are obtained the following products:

9α,11α,15α-trihydroxyprosta-4,5,13-trans-trienoic acid methyl ester,

9α,15α-dihydroxyprosta-4,5,13-trans-trienoic acid methyl ester, 6-methyl-9α,11α,15α-trihydroxyprosta-4,5,13-trans-trienoic acid methyl ester, 4,6-dimethyl-9α,15α-dihydroxyprosta-4,5,13-trans-trienoic acid methyl ester, 4-methyl-6-ethyl-9α,11α,15α-trihydroxyprosta-4,5,13-trans-trienoic acid methyl ester, 4-propyl-6-methyl-9α,11α,15α-trihydroxyprosta-4,5,13-trans-trienoic acid methyl ester, 9α,15α-dihydroxy-20-norprosta-4,5,13-trans-trienoic acid methyl ester, 9α,11α,15α-trihydroxy-20-ethylprosta-4,5,13-trans-trienoic acid methyl ester, 9α,11α,15α-trihydroxy-20-pentylprosta-4,5,13-trans-trienoic acid methyl ester, and 9α,15α-dihydroxy-20-ethylprosta-4,5,13-trans-trienoic acid methyl ester.

EXAMPLE 24A.

By following the method of Example 24, 8R-9α-hydroxy-11α, 15β-bistetrahydropyranyloxyprosta-4,5,13-trans-trienoic acid methyl ester is converted into 8R-9α,11α,15β-trihydroxyprosta-4,5,13-trans-trienoic acid methyl ester (8R-antimer of XVI, R and $R^5$ = H; $R^{1'''}$ = hydroxy; $R^{4'}$ = hydroxy; $R^4$ inch = methyl, $n$ = 4).

In a similar manner, starting from the corresponding 8R-11α,15α-bistetrahydropyranyloxy or 8R-15α-tetrahydropyranyloxy compounds there are obtained the following products:

8R-9α,11α,15α-trihydroxyprosta-4,5,13-trans-trienoic acid methyl ester, 8R-9α,15α-dihydroxyprosta-4,5,13-trans-trienoic acid methyl ester, 8R-6-methyl-9α,11α,15α-trihydroxyprosta-4,5,13-trans-trienoic acid methyl ester, 8R-4,6-dimethyl-9α,15α-dihydroxyprosta-4,5,13-trans-trienoic acid methyl ester, 8R-4-methyl-6-ethyl-9α,11α,15α-trihydroxyprosta-4,5,13-trans-trienoic acid methyl ester, 8R-4-propyl-6-methyl-9α,11α,15α-trihydroxyprosta-4,5,13-trans-trienoic acid methyl ester, 8R-9α,15α-dihydroxy-20-norprosta-4,5,13-trans-trienoic acid methyl ester, 8R-9α,11α,15α-trihydroxy-20-ethylprosta-4,5,13-trans-trienoic acid methyl ester, 8R-9α,11α,15α-trihydroxy-20-pentylprosta-4,5,13-trans-trienoic acid methyl ester, and 8R-9α,15α-hydroxy-20-ethylprosta-4,5,13-trans-trienoic acid methyl ester.

EXAMPLE 25

To a solution of 750 mg. of 9α,11α,15β-trihydroxyprosta-4,5,13-trans-trienoic acid methyl ester in 15 ml. of anhydrous tetrahydrofuran are added 3 g. of activated manganeses dioxide, and the reaction mixture is strirred at room temperature for 6 hours, the manganese dioxide is filtered off and washed with acetone, the combined filtrates are evaporated to dryness under reduced pressure. The residue is redissolved in tetrahydrofuran and stirred with another 3 g. batch of manganese dioxide as above, repeating the operation twice. After final evaporation of the solvent and purification of the residue by chromatography on Florisil there is obtained the pure 9α, 11α-dihydroxy-15- ketoprosta-4,5,13-trans-trienoic acid methyl ester (XVII, R and $R^5$ = H; $R^{1'''}$ = hydroxy; $n = 4$).

By repeating the above procedure but using $9\alpha,11\alpha,15\alpha$-trihydroxyprosta-4,5,13-trans-trienoic acid methyl ester as starting material there is also obtained $9\alpha,11\alpha$-dihydroxy-15-ketoprosta-4,5,13-trans-trienoic acid methyl ester.

In a similar manner, starting from $9\alpha,15\alpha$-dihydroxyprosta-4,5,13-trans-trienoic acid methyl ester, 6-methyl-$9\alpha,11\alpha,15\alpha$-trihydroxyprosta-4,5,13-trans-trienoic acid methyl ester,
4,6-dimethyl-$90\alpha,15\alpha$-dihydroxyprosta-4,5,13-trans-trienoic acid methyl ester,
4-methyl-6-ethyl-$9\alpha,11\alpha,15\alpha$-trihydroxyprosta-4,5,13-trans-trienoic acid methyl ester,
4-propyl-6-methyl-$9\alpha,11\alpha,15\alpha$-trihydroxyprosta-4,5,13-trans-trienoic acid methyl ester,
$9\alpha,15\alpha$-dihydroxy-20-norprosta-4,5,13-trans-trienoic acid methyl ester,
$9\alpha,11\alpha,15\alpha$-trihydroxy-20-ethylprosta-4,5,13-trans-trienoic acid methyl ester,
$9\alpha,11\alpha,15\alpha$-trihydroxy-20-pentylprosta-4,5,13-trans-trienoic acid methyl ester,
$9\alpha,15\alpha$-dihydroxy-20-ethylprosta-4,5,13-trans-trienoic acid methyl ester,
$9\beta,11\alpha,15\alpha$-trihydroxyprosta-4,5,13-trans-trienoic acid methyl ester and
6-methyl-$9\beta,11\alpha,15\alpha$-trihydroxyprosta-4,5,13-trans-trienoic acid methyl ester, there are respectively obtained:
$9\alpha$-hydroxy-15-ketoprosta-4,5,13-trans-trienoic acid methyl ester,
6-methyl-$9\alpha,11\alpha$-dihydroxy-15-ketoprosta-4,5,13-trans-trienoic acid methyl ester,
4,6-dimethyl-$9\alpha$-hydroxy-15-ketoprosta-4,5,13-trans-trienoic acid methyl ester,
4-methyl-6-ethyl-$9\alpha,11\alpha$-dihydroxy-15ketoprosta-4,5,13-trans-trienoic acid methyl ester,
4-propyl-6-methyl-$9\alpha,11\alpha$-dihydroxy-15-ketoprosta-4,5,13-trans-trienoic acid methyl ester,
$9\alpha$-hydroxy-15-keto-20-norprosta-4,5,13-trans-trienoic acid methyl ester,
$9\alpha,11\alpha$-dihydroxy-15-keto-20-ethylprosta-4,5,13-trans-trienoic acid methyl ester,
$9\alpha,11\alpha$-dihydroxy-15-keto-20-pentylprosta-4,5,13-trans-trienoic acid methyl ester,
$9\alpha$-hydroxy-15-keto-20-ethylprosta-4,5,13-trans-trienoic acid methyl ester,
$9\beta,11\alpha$-dihydroxy-15-ketoprosta-4,5,13-trans-trienoic acid methyl ester and
6-methyl-$9\beta,11\alpha$-dihydroxy-15-ketoprosta-4,5,13-trans-trienoic acid methyl ester.

EXAMPLE 25A

In accordance with the method of Example 25, 8R-$9\alpha,11\alpha,15\beta$-trihydroxyprosta-4,5,13-trans-trienoic acid methyl ester is converted into 8R-$9\alpha,11\alpha$-dihydroxy-15-ketoprosta-4,5,13-trans-trienoic acid methyl ester (8R-antimer of XVII, R and $R^5$ = H; $R^{1'''}$ = hydroxy; $n = 4$).

In a similar manner but using as starting materials the corresponding 8R-$9\alpha,15\alpha$-dihydroxy- or 8R-$9\alpha,11\alpha,15\alpha$-trihydroxyprostatrienoic acid methyl ester compounds there are obtained;

8R-$9\alpha$-hydroxy-15-ketoprosta-4,5,13-trans-trienoic acid methyl ester,
8R-6-methyl-$9\alpha,11\alpha$-dihydroxy-15-ketoprosta-4,5,13-trans-trienoic acid methyl ester,
8R-4,6-dimethyl-$9\alpha$-hydroxy-15-ketoprosta-4,5,13-trans-trienoic acid methyl ester,
8R-4-methyl-6-ethyl-$9\alpha,11\alpha$-dihydroxy-15-ketoprosta-4,5,13-trans-trienoic acid methyl ester,
8R-4-propyl-6-methyl-$9\alpha,11\alpha$-dihydroxy-15-ketoprosta-4,5,13-trans-trienoic acid methyl ester,
8R-$9\alpha$-hydroxy-15-keto-20-norprosta-4,5,13-trans-trienoic acid methyl ester,
8R-$9\alpha,11\alpha$-dihydroxy-15-keto-20-ethylprosta-4,5,13-trans-trienoic acid methyl ester,
8R-$9\alpha,11\alpha$-dihydroxy-15-keto-20-pentylprosta-4,5,13-trans-trienoic acid methyl ester,
8R-$9\alpha$-hydroxy-15-keto-20-ethylprosta-4,5,13-trans-trienoic acid methyl ester,
8R-$9\beta,11\alpha$-dihydroxy-15-ketoprosta-4,5,13-trans-trienoic acid methyl ester and
8R-6-methyl-$9\beta,11\alpha$-dihydroxy-15-ketoprosta-4,5,13-trans-trienoic acid methyl ester.

EXAMPLE 26

A. To a stirred mixture of 6 ml. of hexamethyldisilazane and 1.2 ml. of trimethylchlorosilane there is added a solution of 200 mg. of $9\alpha,11\alpha$-dihydroxy-15-ketoprosta-4,5,13-trans-trienoic acid methyl ester in 20 ml. of anhydrous tetrahydrofuran, under an argon atmosphere, and the resulting mixture is stirred at room temperature, under anhydrous conditions for 16 hours. It is then evaporated to dryness under reduced pressure. The residue is dissolved in 10 ml. of toluene and the solvent eliminated under vacuo, repeating the operation several times, thus obtaining the crude $9\alpha,11\alpha$-bis(trimethylsilyloxy)-15-ketoprosta-4,5,13-trans-trienoic acid methyl ester (XVIII, R and $R^5$ = H; $R^7$ = trimethylsilyloxy; $n = 4$).

B. The foregoing crude product is dissolved in 20 ml. of anhydrous diethyl ether, and the resulting solution is cooled to −78°C. in a dry ice-acetone bath. To the stirred cold solution is added dropwise an ether solution of 1.1 molar equivalents of methyllithium (2.8 ml. of 0.22M methyllithium in ether) under stirring and under an argon atmosphere. The resulting stirred mixture is allowed to attain room temperature and stirred 2 additional hours at this temperature. It is then poured into a saturated solution of ammonium chloride, the ethereal phase is separated, washed with saturated sodium chloride solution, dried over magnesium sulfate and evaporated to dryness under vacuo, thus obtaining the crude $9\alpha,11\alpha$-bis(trimethylsilyloxy)-15{-hydroxy-15{-methylprosta-4,5,13-trans-trienoic acid methyl ester. (Mixture of $15\alpha$-hydroxy-$15\beta$methyl and $15\beta$-hydroxy-$15\alpha$-methyl compounds). (XIX, R and $R^5$ = H; $R^6$ = methyl; $R^7$ = trimethylsilyloxy; $n = 4$).

C. A solution of 250 mg. of the crude $9\alpha,11\alpha$-bis-(trimethylsilyloxy)-15{-hydroxy-15{-methylprosta-4,5,13-trans-trienoic acid methyl ester in 10 ml. of 70 percent aqueous methanol is kept at room temperature for 72 hours. The reaction mixture is then evaporated to dryness under reduced pressure and the residue purified by thin layer chromatography using ethyl acetate-ether (75:25) as eluant, thus obtaining the individual isomers, i.e., $9\alpha,11\alpha,15\alpha$-trihydroxy-$15\beta$-methylprosta-4,5,13-trans-trienoic acid methyl ester and $9\alpha,11\alpha,15\beta$-trihydroxy-$15\alpha$-methylprosta-4,5,13-trans-trienoic acid methyl ester in pure form (XX, R and $R^5$ = H; $R^{1'''}$ = hydroxy; $R^6$ = methyl; $n = 4$).

By repeating the procedures described in this Example but using as starting materials in part A the remaining compounds produced in Example 25, there are obtained as final products, respectively:

9α,15α-dihydroxy-15β-methylprosta-4,5,13-trans-trienoic acid methyl ester and 9α,15β-dihydroxy-15α-methylprosta-4,5,13-trans-trienoic acid methyl ester; 6,15β-dimethyl-9α,11α,15α-trihydroxyprosta-4,5,13-trans-trienoic acid methyl ester and 6,15α-dimethyl-9α,11α,15β-trihydroxyprosta-4,5,13-trans-trienoic acid methyl ester;

4,6,15β-trimethyl-9α,11α,15α-trihydroxyprosta-4,5,13-trans-trienoic acid methyl ester and 4,6,15-α-trimethyl-9α,11α,15β-trihydroxyprosta-4,5,13-trans-trienoic acid methyl ester;

4,15β-dimethyl-6-ethyl-9α,11α,15α-trihydroxyprosta-4,5,13-trans-trienoic acid methyl ester and 4,15-α-dimethyl-6-ethyl-9α,11α,15β-trihydroxyprosta-4,5,13-trans-trienoic acid methyl ester;

4-propyl-6,15β-dimethyl-9α,11α,15α-trihydroxyprosta-4,5,13-trans-trienoic acid methyl ester and 4-propyl-6,15α-dimethyl-9α,11α,15β-trihydroxyprosta-4,5,13-trans-trienoic acid methyl ester;

9α,15α-dihydroxy-15β-methyl-20-norprosta-4,5,13-trans-trienoic acid methyl ester and 9α,15β-dihydroxy-15α-methyl-20-norprosta-4,5,13-trans-trienoic acid methyl ester;

9α,11α,15α-trihydroxy-15β-methyl-20-ethylprosta-4,5,13-trans-trienoic acid methyl ester and 9α,11α,15β-trihydroxy-15α-methyl-20-ethylprosta-4,5,13-trans-trienoic acid methyl ester;

9α,11α,15α-trihydroxy-15β-methyl-20-pentylprosta-4,5,13-trans-trienoic acid methyl ester and 9α,11α,15β-trihydroxy-15α-methyl-20-pentylprosta-4,5,13-trans-trienoic acid methyl ester;

9α,15α-dihydroxy-15β-methyl-20-ethylprosta-4,5,13trans-trienoic acid methyl ester and 9α,15β-dihydroxy-15α-methyl-20-ethylprosta-4,5,13-trans-trienoic acid methyl ester, 9β,15α-dihydroxy-15β-methylprosta-4,5,13-trans-trienoic acid methyl ester and 9β,15β-dihydroxy-15α-methylprosta-4,5,13-trans-trienoic acid methyl ester and 6,15β-dimethyl-9β,15α-dihydroxyprosta-4,5,13-trans-trienoic acid methyl ester and 6,15α-dimethyl-9β,15β-dihydroxyprosta-4,5,13-trans-trienoic acid methyl ester.

EXAMPLE 26A

By repeating the procedures of Example 26, parts A, B and C, starting from 8R-9α,11α-dihydroxy-15-ketoprosta-4,5,13-trans-trienoic acid methyl ester there are successively obtained 8R-9α,11α-bis(trimethylsilyloxy)-15-ketoprosta-4,5,13-trans-trienoic acid methyl ester, 8R-9α,11α-bis(trimethylsilyloxy)-15{-hydroxy-15{-methylprosta-4,5,13-trans-trienoic acid methyl ester, and 8R-9α,11α,15{-trihydroxy-15{-methylprosta-4,5,13-trans-trienoic acid methyl ester (8R-antimers of XX, R and $R^5$ = H; $R^{1'''}$ = hydroxy; $R^6$ = methyl; $n = 4$) separating the 15α-hydroxy-15β-methyl and 15β-hydroxy-15α-methyl isomers by t.l.c.

In a similar manner but using as starting materials in part A the remaining compounds produced in Example 25A there are obtained as final products, respectively:

8R-9α,15α-dihydroxy-15β-methylprosta-4,5,13-trans-trienoic acid methyl ester and 8R-9α,15β-dihydroxy-15α-methylprosta-4,5,13-trans-trienoic acid methyl ester;

8R-6,15β-dimethyl-9α,11α,15α-trihydroxyprosta-4,5,13-trans-trienoic acid methyl ester and 8R-6,15α-dimethyl-9α,11α,15β-trihydroxyprosta-4,5,13-trans-trienoic acid methyl ester;

8R-4,6,15β-trimethyl-9α,11α,15α-trihydroxyprosta-4,5,13-trans-trienoic acid methyl ester and 8R-4,6,15α-trimethyl-9α,11α,15β-trihydroxyprosta-4,5,13-trans-trienoic acid methyl ester;

8R-4,15β-dimethyl-6-ethyl-9α,11α,15α-trihydroxyprosta-4,5,13-trans-trienoic acid methyl ester and 8R-4,15α-dimethyl-6-ethyl-9α,11α,15β-trihydroxyprosta-4,5,13-trans-triensoic acid methyl ester;

8R-4-propyl-6,15β-dimethyl-9α,11α,15α-trihydroxyprosta-4,5,13-trans-trienoic acid methyl ester and 8R-4-propyl-6,15α-dimethyl-9α,11α,15β-trihydroxyprosta-4,5,13-trans-trienoic acid methyl ester;

8R-9α,15α-dihydroxy-15β-methyl-20-norprosta-4,5,13-trans-trienoic acid methyl ester and 8R-9α,15β-dihydroxy-15α-methyl-20-norprosta-4,5,13-trans-trienoic acid methyl ester;

8R-9α,11α,15α-trihydroxy-15β-methyl-20-ethylprosta-4,5,13-trans-trienoic acid methyl ester and 8R-9α,11α,15β-trihydroxy-15α-methyl-20-ethylprosta-4,5,13-trans-trienoic acid methyl ester;

8R-9α,11α,15α-trihydroxy-15β-methyl-20-pentylprosta-4,5,13-trans-trienoic acid methyl ester and 8R-9α,11α,15β-trihydroxy-15α-methyl-20-pentylprosta-4,5,13-trans-trienoic acid methyl ester;

8R-9α,15α-dihydroxy-15β-methyl-20-ethylprosta-4,5,13-trans-trienoic acid methyl ester and 8R-9α,15β-dihydroxy-15α-methyl-20-ethylprosta-4,5,13-trans-trienoic acid methyl ester;

8R-9β,15α-dihydroxy-15β-methylprosta-,4,5,13-trans-trienoic acid methyl ester and 8R-9β,15β-dihydroxy-15α-methylprosta-4,5,13-trans-trienoic acid methyl ester and 8R-6,15β-dimethyl-9β,15α-dihydroxyprosta-4,5,13-trans-trienoic acid methyl ester and 8R-6,15α-dimethyl-9β,15β-dihydroxyprosta-4,5,13-trans-trienoic acid methyl ester.

EXAMPLE 27

Twenty milligrams of 9α,11α,15α-trihydroxy-15β-methylprosta-4,5,13-trans-trienoic acid methyl ester are dissolved in a mixture of 2 ml. of methanol, 2 ml. of water and 90 mg. of potassium carbonate. The reaction mixture is maintained at 40°C for 16 hours under nitrogen atmosphere, 10 ml. of water are then added, and the reaction mixture is then evaporated under reduced pressure to half volume. It is then acidified with 50 percent acetic acid and extracted several times with ethyl acetate. The combined organic extracts are dried over sodium sulfate and evaporated to dryness under reduced pressure to yield 9α,11α,15α-trihydroxy-15β-methylprosta-4,5,13-trans-trienoic acid (XXI, R and $R^5$ = H; $R^{1'''}$ = hydroxy; $R^6$ = methyl; $n = 4$).

In a similar manner 9α,15α-dihydroxy-15β-methylprosta-4,5,13-trans-trienoic acid methyl ester and 6,15α-dimethyl-9α,11α,15β-trihydroxyprosta- 4,5,13-trans-trienoic acid methyl ester are converted into the corresponding free acids.

EXAMPLE 27A

Example 27 is repeated using 8R-9α,11α,15α-trihydroxy-15β-methylprosta-4,5,13-trans-trienoic acid methyl ester as starting compound, thus yielding 8R-9α,11α,15α-trihydroxy-15β-methylprosta-4,5,13-trans-trienoic acid (8R-antimer or XXI, R and $R^5$ = H; $R^{1'''}$ = hydroxy; $R^6$ = methyl; $n$ = 4).

In a similar manner, 8R-9α,15α-dihydroxy-15β-methylprosta-4,5,13-trans-trienoic acid methyl ester and 8R-6,15α-dimethyl-9α,11α,15β-trihydroxyprosta-4,5,13-trans-trienoic acid methyl ester are converted into the corresponding free acids.

EXAMPLE 28

A. A suspension of 4 g. of crude pancreatic lipase (Sigma L–3126) in 40 ml. of an 0.1M sodium chloride and 0.05M calcium chloride solution in water is stirred at 25°C. for 1 hour. The mixture is then centrifuged for 1 hour at 5,000 rev/min. and at 25° to 30°C. The supernatant is neutralized with 1N sodium hydroxide solution to pH 7.2 to 7.4 and used directly for the hydrolysis of the prostaglandin derivatives of the invention.

B. Forty-two milligrams of 9α,11α,15α-trihydroxy-15β-methylprosta-4,5,13-trans-trienoic acid methyl ester are dissolved by sonication at 37°C for 20 minutes in 30 ml. of the lipase solution prepared as described in part A. The reaction mixture is magnetically stirred for 15 minutes at 25° to 26°C, adjusting constantly the pH at 7.2 to 7.4 during the reaction period with 1N sodium hydroxide solution. The reaction mixture is then acidified to pH 2.5 using a 0.2N hydrochloric acid solution and the product extracted several times from the solution with ethyl acetate and ether. The combined organic extracts are dried over magnesium sulfate and evaporated to dryness under vacuo. The residue is dissolved in methylene chloride and chromatographed on 3 g. of Florisil. The column is eluted successively with methylene chloride-diethyl ether mixtures, diethyl ether, diethyl ether-ethyl acetate mixtures, pure ethyl acetate and ethyl acetate-methanol (80:20). The fractions eluted with the latter solvent mixture afford the pure 9α,11α15α-trihydroxy-15β-methylprosta-4,5,13-trans-trienoic acid, identical to the product obtained in Example 27.

In a similar manner by following the above procedure, the remaining alkyl ester compounds obtained in Example 26 as final products are converted into the corresponding free acids.

EXAMPLE 28A

By repeating the procedure of part B of Example 28, 8R -9α,11α,15α-trihydroxy-15β-methylprosta-4,5,13-trans-trienoic acid methyl ester is hydrolized using the lipase solution prepared as described in part A of said Example, thus obtaining 8R-9α,11α,15α-trihydroxy-15β-methylprosta-4,5,13-trans-trienoic acid, identical to the product obtained in Example 27A.

In a similar manner, the remaining methyl ester compounds obtained in Example 26A as final products are converted into the corresponding free acids.

EXAMPLE 29

To a solution of 500 mg. of 9-keto-11α,15α-bistetrahydropyranyloxyprosta-4,5,13-trans-trienoic acid methyl ester in 10 ml. of 65 percent aqueous acetic acid is stirred at room temperature for 18 hours. It is then evaporated to dryness under reduced pressure, the residue is dissolved in ethyl acetate and the solvent is eliminated by distillation under vacuo. The residue is purified by chromatography on 50 g. of Florisil. The fractions eluted with diethyl ether-ethyl acetate (80:20) yield the pure 9-keto-11α,15α-dihydroxyprosta-4,5,13-trans-trienoic acid methyl ester (Methyl ester of XI, R and $R^5$ = H; $R^{1'''}$ = hydroxy; $n$ = 4).

In a similar manner, starting from the corresponding 9-keto-11α,15α-bistetrahydropyranyloxy or 15α-monotetrahydropyranyloxy compounds of Example 22 there are obtained the following products:

9-keto-15α-hydroxyprosta-4,5,13-trans-trienoic acid methyl ester,
4-methyl-9-keto-11α,15α-dihydroxyprosta-4,5,13-trienoic acid methyl ester,
6-methyl-9-keto-11α,15α-dihydroxyprosta-4,5,13-trans-trienoic acid methyl ester,
4,6-dimethyl-9-keto-11α,15α-dihydroxyprosta-4,5,13-trans-trienoic acid methyl ester,
4-propyl-6-methyl-9-keto-11α,15α-dihydroxyprosta-4,5,13-trans-trienoic acid methyl ester,
9-keto-11α,15α-dihydroxy-20-bisnorprosta-4,5,13-trans-trienoic acid methyl ester,
9-keto-11α,15α-dihydroxy-20-methylprosta-4,5,13-trans-trienoic acid methyl ester,
9-keto-11α,15α-dihydroxy-20-ethylprosta-4,5,13-trans-trienoic acid methyl ester and
4-methyl-9-keto-11α,15α-dihydroxy-20-ethylprosta-4,5,13-trans-trienoic acid methyl ester.

EXAMPLE 29A

Example 29 is repeated using 8R-9-keto-11α,15α-bistetrahydropyranyloxyprosta-4,5,13-trans-trienoic acid methyl ester as starting material, thus obtaining 8R-9-keto-11α,15α-dihydroxyprosta-4,5,13-trans-trienoic acid methyl ester (methyl ester of the 8R-antimer of XI, R and $R^5$ = H; $R^{1'''}$ = hydroxy; $n$ = 4).

In a similar manner, starting from the corresponding 8R-9-keto-11α,15α-bistetrahydropyranyloxy or 8R-15α-monotetrahydropyranyloxy compounds of Example 22A there are obtained the following products:

8R-9-keto-15α-hydroxyprosta-4,5,13-trans-trienoic acid methyl ester,
8R-4-methyl-9-keto-11α,15α-dihydroxyprosta-4,5,13-trans-trienoic acid methyl ester,
8R-6-methyl-9-keto-11α,15α-dihydroxyprosta-4,5,13-trans-trienoic acid methyl ester,
8R-4,6-dimethyl-9-keto-11α,15α-dihydroxyprosta-4,5,13-trans-trienoic acid methyl ester,
8R-4-propyl-6-methyl-9-keto-11α15α-dihydroxyprosta-4,5,13-trans-trienoic acid methyl ester,
8R-9-keto-11α,15α-dihydroxy-20-bisnorprosta-4,5,13-trans-trienoic acid methyl ester,
8R-9-keto-11α,15α-dihydroxy-20-methylprosta-4,5,13-trans-trienoic acid methyl ester,
8R-9-keto-11α,15α-dihydroxy-20-ethylprosta-4,5,13-trans-trienoic acid methyl ester and
8R-4-methyl-9-keto-11α,15α-dihydroxy-20-ethylprosta-4,5,13-trans-trienoic acid methyl ester.

EXAMPLE 30

To a solution of 400 mg. of 9-keto-11α,15α-dihydroxyprosta-4,5,13-trans-trienoic acid methyl ester in 3 ml. of methanol is added a solution of 400 mg. of hydroxylamine hydrochloride and 500 mg. of sodium acetate in 10 ml. of methanol-water (1:1). The resulting reaction mixture is kept at room temperature for 18 hours under argon atmosphere and the solvent is then eliminated under reduced pressure. The residue is taken up in water and the mixture extracted with ethyl acetate, the organic phase is separated, washed with saturated sodium chloride solution, dried over magnesium sulfate and evaporated to dryness under vacuo, thus obtaining 9-hydroxyimino-11α,15α-dihydroxyprosta-4,5,13-trans-trienoic acid methyl ester, (XXII, R and $R^5$ = H; $R^{1'''}$ = hydroxy; $n$ = 4).

In a similar manner, starting from the remaining respective 9-keto compounds obtained in Example 29, there are obtained the corresponding oximes, i.e., 9-hydroxyimino-15α-hydroxyprosta-4,5,13-trans-trienoic acid methyl ester, 4-methyl-9-hydroxyimino-11α,15α-dihydroxyprosta-4,5,13-trans-trienoic acid methyl ester,
   6-methyl-9-hydroxyimino-11α,15α-dihydroxyprosta-4,5,13-trans-trienoic acid methyl ester,
   4,6-dimethyl-9-hydroxyinino-11α,15α-dihydroxyprosta-4,5,13-trans-trienoic acid methyl ester,
   4-propyl-6-methyl-9-hydroxyimino-11α,15α-dihydroxyprosta-4,5,13-trans-trienoic acid methyl ester,
   9-hydroxyimino-11α,15α-dihydroxy-20-bisnorprosta-4,5,13-trans-trienoic acid methyl ester,
   9-hydroxyimino-11α,15α-dihydroxy-20-methylprosta-4,5,13-trans-trienoic acid methyl ester,
   9-hydroxyimino-11α,15α-dihydroxy-20-ethylprosta-4,5,13-trans-trienoic acid methyl ester and
   4-methyl-9-hydroxyimino-11α,15α-dihydroxy-20-ethylprosta-4,5,13-trans-trienoic acid methyl ester.

EXAMPLE 30A

In accordance with the method of Example 30, 400 mg. of 8R-9-keto-11α,15α-dihydroxyprosta-4,5,13-trans-trienoic acid methyl ester are converted into 8R-9-hydroxyimino-11α,15α-dihydroxyprosta-4,5,13-trans-trienoic acid methyl ester (8R-antimer of XXII, R and $R^5$ = H; $R^{1'''}$ = hydroxy; $n$ = 4).

In a similar manner, starting from the remaining respective 9-keto compounds obtained in Example 29A, there are obtained the corresponding oximes, i.e., 8R-9-hydroxyimino-15α-hydroxyprosta-4,5,13-trans-trienoic acid methyl ester, 8R-4-methyl-9-hydroxyimino-11α,15α-dihydroxyprosta-4,5,13-trans-trienoic acid methyl ester, 8R-6-methyl-9-hydroxyimino-11α,15α-dihydroxyprosta-4,5,13-trans-trienoic acid methyl ester,
   8R-4,6-dimethyl-9-hydroxyimino-11α,15α-dihydroxyprosta-4,5,13-trans-trienoic acid methyl ester,
   8R-4-propyl-6-methyl-9-hydroxyimino-11α,15α-dihydroxyprosta- 4,5,13-trans-trienoic acid methyl ester,
   8R-9-hydroxyimino-11α,15α-dihydroxy-20-bisnorprosta-4,5,13-trans-trienoic acid methyl ester,
   8R-9-hydroxyimino-11α,15α-dihydroxy-20-methylprosta-4,5,13-trans-trienoic acid methyl ester,
   8R-9-hydroxyimino-11α,15α-dihydroxy-20-ethylprosta-4,5,13-trans-trienoic acid methyl ester and
   8R-4-methyl-9-hydroxymino-11α,15α-dihydroxy-20-ethylprosta-4,5,13-trans-trienoic acid methyl ester.

EXAMPLE 31

To a solution of 250 mg. of 9-hydroxyimino-11α,15α-dihydroxyprosta-4,5,13-trans-trienoic acid methyl ester in 5 ml. of anhydrous tetrahydrofuran is added 1 g. of activated manganese dioxide, and the reaction mixture is stirred at room temperature for 6 hours, the manganese dioxide is filtered off and washed with acetone and the combined filtrates are evaporated to dryness under reduced pressure. The residue is redissolved in tetrahydrofuran and stirred with another 1 g. batch of manganese dioxide as above, repeating the operation twice. After final evaporation of the solvent and purification of the residue by chromatography on Florisil there is obtained the pure 9-hydroxyimino-11α-hydroxy-15-ketoprosta-4,5,13-trans-trienoic acid methyl ester (XXIII,R and $R^5$ = H; $R^{1'''}$ = hydroxy; $n$ = 4).

By repeating the above procedure but using as starting materials the remaining 9-hydroxyimino compounds obtained in Example 30, there are produced the corresponding 15-keto derivatives, namely:

9-hydroxyimino-15-ketoprosta-4,5,13-trans-trienoic acid methyl ester,
   4-methyl-9-hydroxyimino-11α-hydroxy-15-ketoprosta-4,5,13-trans-trienoic acid methyl ester,
   6-methyl-9-hydroxyimino-11α-hydroxy-15-ketoprosta-4,5,13-trans-trienoic acid methyl ester,
   4,6-dimethyl-9-hydroxyimino-11α-hydroxy-15-ketoprosta-4,5,13-trans-trienoic acid methyl ester,
   4-propyl-6-methyl-9-hydroxyimino-11α-hydroxy-15-ketoprosta-4,5,13-trans-trienoic acid methyl ester,
   9-hydroxyimino-11α-hydroxy-15-keto-20-bisnorprosta-4,5,13-trans-trienoic acid methyl ester,
   9-hydroxyimino-11α-hydroxy-15-keto-20-methylprosta-4,5,13-trans-trienoic acid methyl ester,
   9-hydroxyimino-11α-hydroxy-15-keto-20-ethylprosta-4,5,13-trans-trienoic acid methyl ester and
   4-methyl-9-hydroxyimino-11α-hydroxy-15-keto-20-ethylprosta-4,5,13-trans-trienoic acid methyl ester.

EXAMPLE 31A

By repeating the method of Example 31, 8R-9-hydroxyimino-11α,15α-dihydroxyprosta-4,5,13-trans-trienoic acid methyl ester is converted into 8R-9-hydroxyimino-11α-hydroxy-15-ketoprosta-4,5,13-trans-trienoic acid methyl ester (8R-antimer of XXIII, R and $R^5$ = H; $R^{1'''}$ = hydroxy; $n$ = 4).

By repeating the same procedure but using as starting materials the remaining 8R-9-hydroxyimino compounds obtained in Example 30A, there are produced the corresponding 15-keto derivatives, namely:

8R-9-hydroxyimino-15-ketoprosta-4,5,13-trans-trienoic acid methyl ester,
   8R-4-methyl-9-hydroxyimino-11α-hydroxy-15-ketoprosta-4,5,13-trans-trienoic acid methyl ester,
   8R-6-methyl-9-hydroxyimino-11α-hydroxy-15-ketoprosta-4,5,13-trans-trienoic acid methyl ester,
   8R-4,6-dimethyl-9-hydroxyimino-11α-hydroxy-15-ketoprosta-4,5,13-trans-trienoic acid methyl ester, 8R-4-propyl-6-methyl-9-hydroxyimino-11α-hydroxy-15-ketoprosta-4,5,13-trans-trienoic acid methyl ester, 8R-9-hydroxyimino-11α-hydroxy-15-keto-20-bisnorprosta-4,5,13-trans-trienoic acid methyl ester, 8R-9-hydroxyimino-11α-hydroxy-15-keto-20-methylprosta-4,5,13-trans-trienoic acid methyl ester, 8R-9-hydroxyimino-11α-hydroxy-15-keto-20-ethylprosta-4,5,13-trans-trienoic acid methyl ester and 8R-4-methyl-9-hydroxyimino-11α-hydroxy-15-keto-20-ethylprosta-4,5,13-trans-trienoic acid methyl ester.

EXAMPLE 32

A. To a stirred mixture of 3 ml. of hexamethyldisilazane and 0.6 ml. of trimethylchlorosilane there is added a solution of 200 mg. of 9-hydroxyimino-11α-hydroxy-15-ketoprosta-4,5,13-trans-trienoic acid methyl ester in 15 ml. of anhydrous tetrahydrofuran, under an argon atmosphere and the resulting mixture is stirred at room temperature, under anhydrous conditions for 16 hours. It is then evaporated to dryness under reduced pressure. The residue is dissolved in 10 ml. of toluene and the solvent eliminated under vacuo, repeating the operation several times, thus obtaining the crude 9-trimethylsilyloxyimino-11α-trimethylsilyloxy-15-ketoprosta-4,5,13-trans-trienoic acid methyl ester (XXIV, R and $R^5$ = H; $n$ = 4).

B. The foregoing crude product is dissolved in 20 ml. of anhydrous diethyl ether, and the resulting solution is cooled to −78°C in a dry ice-acetone bath. to the stirred cold solution is added dropwise an ether solution of 1.1 molar equivalents of methyllithium (2.7 ml. of 0.22M methyllithium in ether) under stirring and under an argon atmosphere. The resulting stirred mixture is allowed to attain room temperature, and stirred 2 additional hours at this temperature. It is then poured into saturated ammonium chloride solution, the ethereal phase is separated, washed with saturated sodium chloride solution, dried over magnesium sulfate and evaporated to dryness under vacuo, thus obtaining the crude 9-trimethylsilyloxyimino-11α-trimethylsilyloxy-15-hydroxy-15-methylprosta-4,5,13-trans-trienoic acid methyl ester. (Mixture of 15α and 15α compounds). (XXV, R and $R^5$ = H; $R^6$ = Me; $R^7$ = trimethylsilyl; $R^{7'}$ = trimethylsilyloxy; $n$ = 4).

C. A solution of 250 mg. of the crude 9-trimethylsilyloxyimino-11α-trimethylsilyloxy-15{-hydroxy-15{ -methylprosta-4,5,13-trans-trienoic acid methyl ester in 10 ml. of 70 percent aqueous methanol is kept at room temperature for 18 hours under carbon dioxide atmosphere. The reaction mixture is then evaporated to dryness under reduced pressure and the residue purified by thin layer chromatography using ethyl acetate-ether (75:25) as eluant, thus obtaining the individual isomers, i.e., 9-hydroxyimino-11α,15α-dihydroxy-15β-methylprosta-4,5,13-trans-trienoic acid methyl ester and 9-hydroxyimino-11α,15β-dihydroxy-15α-methylprosta-4,5,13-trans-trienoic acid methyl ester in pure form.

D. To a stirred solution of 150 mg. of 9-hydroxyimino-11α,15α-dihydroxy-15β-methylprosta-4,5,13-trans-trienoic acid methyl ester in 3 ml. of methanol is added a solution of 150 mg. of thallium (III) nitrate in 3 ml. of methanol. The reaction mixture is stirred at room temperature for 10 minutes, and the formed precipitate separated by filtration and washed with methanol. To the filtrate are added 5 ml. of dilute acetic acid and the mixture is stirred for 5 minutes, it is then extracted with ether and the organic extract washed with saturated sodium chloride solution, dried over magnesium sulfate and evaporated to dryness under reduced pressure. The residue is purified by chromatography on Florisil. The fractions eluted with diethyl ether-ethyl acetate (9:1) afford the pure 9-keto-11α,15α-dihydroxy-15β-methylprosta-4,5,13-trans-trienoic acid methyl ester (XXVI, R and $R^5$ = H; $R^{1''}$ = hydroxy; $R^6$ = methyl; n = 4).

By repeating the procedures described in this Example but using as starting materials in part A the compounds listed below:

4-methyl-9-hydroxyimino-11α-hydroxy-15-ketoprosta-4,5,13-trans-trienoic acid methyl ester, 6-methyl-9-hydroxyimino-11α-hydroxy-15-ketoprosta-4,5,13-trans-trienoic acid methyl ester, 4,6-dimethyl-9-hydroxyimino-11α-hydroxy-15-ketoprosta-4,5,13-trans-trienoic acid methyl ester, 4-propyl-6-methyl-9-hydroxyimino-11α-hydroxy-15-ketoprosta-4,5,13-trans-trienoic acid methyl ester, 9-hydroxyimino-11α-hydroxy-15-keto-20-bisnorprosta-4,5,13-trans-trienoic acid methyl ester, 9-hydroxyimino-11α-hydroxy-15-keto-20-methylprosta-4,5,13-trans-trienoic acid methyl ester, 9-hydroxyimino-11α-hydroxy-15-keto-20-ethylprosta-4,5,13-trans-trienoic acid methyl ester and 4-methyl-9-hydroxyimino-11αhydroxy-15-keto-20-ethylprosta-4,5,13-trans-trienoic acid methyl ester, there are obtained as final products, respectively:

4,15β-dimethyl-9-keto-11α,15α-dihydroxyprosta-4,5,13-trans-trienoic acid methyl ester and 4,15α-dimethyl-9-keto-11α,15β-dihydroxyprosta-4,5,13-trans-trienoic acid methyl ester;

6,15β-dimethyl-9-keto-11α,15α-dihydroxyprosta-4,5,13-trans-trienoic acid methyl ester and 6,15α-dimethyl-9-keto-11α,15β-dihydroxyprosta-4,5,13-trans-trienoic acid methyl ester;

4,6,15β-trimethyl-9-keto-11α,15α-dihydroxyprosta-4,5,13-trans-trienoic acid methyl ester and 4,6,15-α-trimethyl-9-keto-11α,15β-dihydroxyprosta-4,5,13-trans-trienoic acid methyl ester;

4-propyl-6,15β-dimethyl-9-keto-11α,15α-dihydroxyprosta-4,5,13-trans-trienoic acid methyl ester and 4-propyl-6,15α-dimethyl-9-keto-11α,15β-dihydroxyprosta-4,5,13-trans-trienoic acid methyl ester;

9-keto-11α,15α-dihydroxy-15β-methyl-20-bisnorprosta-4,5,13-trans-trienoic acid methyl ester and 9-keto-11α,15β-dihydroxy-15α-methyl-20-bisnorprosta-4,5,13-trans-trienoic acid methyl ester;

9-keto-11α,15α-dihydroxy-15β,20-dimethylprosta-4,5,13-trans-trienoic acid methyl ester and 9-keto-11α,15β-dihydroxy-15α,20-dimethylprosta-4,5,13-trans-trienoic acid methyl ester;

9-keto-11α,15α-dihydroxy-15β-methyl-20-ethylprosta-4,5,13-trans-trienoic acid methyl ester and 9-keto-11α,15β-dihydroxy-15α-methyl-20-ethylprosta-4,5,13-trans-trienoic acid methyl ester and 4,15β-dimethyl-9-keto-11α,15α-dihydroxy-20-ethylprosta-4,5,13-trans-trienoic acid methyl ester and 4,15α-dimethyl-9-keto-11α,15β-dihydroxy-20-ethylprosta-4,5,13-trans-trienoic acid methyl ester.

Similarly, by repeating the procedures of parts B and D, using 9-hydroxyimino-15-ketoprosta-4,5,13-trans-trienoic acid methyl ester as starting material there is obtained a mixture of 9-keto-15α-hydroxy-15β-methylprosta-4,5,13-trans-trienoic acid methyl ester and the 15β-hydroxy-15α-methyl isomer, (XXVI, R, $R^5$ and $R^{1'''}$ = H; $R^6$ = methyl; $n$ = 4), which is separated by chromatography on Florisil.

EXAMPLE 32A

In accordance with the methods described in Example 32, parts A, B, C and D, 8R-9-hydroxyimino-11α-hydroxy-15-ketoprosta-4,5,13-trans-trienoic acid methyl ester is converted successively into:

8R-9-trimethylsilyloxyimino-11α-trimethylsilyloxy-15-ketoprosta-4,5,13-trans-trienoic acid methyl ester, 8R-9-trimethylsilyoxyimino-11α-trimethylsilyloxy-15{-hydroxy-15{-methylprosta-4,5,13-trans-trienoic acid methyl ester, 8R-9-hydroxyimino-11α,15{-hydroxy-15{-methylprosta-4,5,13-trans-trienoic acid methyl ester and 8R-9-keto-11α,15}-dihydroxy-15{-methylprosta-4,5,13-trans-trienoic acid methyl ester (8R-antimers of XXVI, R and $R^5$ = H; $R^{1'''}$ = hydroxy; $R^6$ = methyl; $n$ = 4) separating the 15α-hydroxy-15β-methyl and 15β-hydroxy-15α-methyl isomers by t.l.c.

Likewise, but using as starting materials in part A the remaining 8R-15-keto compounds obtained in Example 31A, there are produced as final products, respectively:

8R-4,15β-dimethyl-9-keto-11α,15α-dihydroxyprosta-4,5,13-trans-trienoic acid methyl ester and 8R-4,15α-dimethyl-9-keto-11α,15β-dihydroxyprosta-4,5,13-trans-trienoic acid methyl ester;

8R-6,15β-dimethyl-9-keto-11α,15α-dihydroxyprosta-4,5,13-trans-trienoic acid methyl ester and 8R-6,15α-dimethyl-9-keto-11α,15β-dihydroxyprosta-4,5,13-trans-trienoic acid methyl ester;

8R-4,6,15β-trimethyl-9-keto-11α,15α-dihydroxyprosta-4,5,13-trans-trienoic acid methyl ester and 8R-4,6,15α-trimethyl-9-keto-11α,15β-dihydroxyprosta-4,5,13-trans-trienoic acid methyl ester;

8R-4-propyl-6,15β-dimethyl-9-keto-11α,15α-dihydroxyprosta-4,5,13-trans-trienoic acid methyl ester and 8R-4-propyl-6,15α-dimethyl-9-keto-11α,15β-dihydroxyprosta-4,5,13-trans-trienoic acid methyl ester;

8R-9-keto-11α,15α-dihydroxy-15β-methyl-20-bisnorprosta-4,5,13-trans-trienoic acid methyl ester and 8R-9-keto-11α,15β-dihydroxy-15α-methyl-20-bisnorprosta-4,5,13-trans-trienoic acid methyl ester;

8R-9-keto-11α,15α-dihydroxy-15β,20-dimethylprosta-4,5,13-trans-trienoic acid methyl ester and 8R-9-keto-11α,15β-dihydroxy-15α,20-dimethylprosta-4,5,13-trans-trienoic acid methyl ester;

8R-9-keto-11α,15α-dihydroxy-15β-methyl-20-ethylprosta-4,5,13-trans-trienoic acid methyl ester and 8R-9-keto-11α,15β-dihydroxy-15α-methyl-20-ethylprosta-4,5,13-trans-trienoic acid methyl ester and 8R-4,15β-dimethyl-9-keto-11α,15α-dihydroxy-20-ethylprosta-4,5,13-trans-trienoic acid methyl ester and 8R-4,15α-dimethyl-9-keto-11α,15β-dihydroxy-20-ethylprosta-4,5,13-trans-trienoic acid methyl ester.

Similarly, by repeating the procedures of parts B and D of Example 32, using 8R-9-hydroxyimino-15-ketoprosta-4,5,13-trans-trienoic acid methyl ester as starting material there is obtained a mixture of 8R-9-keto-15α-hydroxy-15β-methylprosta-4,5,13-trans-trienoic acid methyl ester and the 8R-15β-hydroxy-15α-methyl isomer (8R-antimers of XXVI, R, $R^5$ and $R^1$ = H; $R^6$ = methyl; $n$ = 4) which are separated by chromatography on Florisil.

EXAMPLE 33

In accordance with the method described in Example 28, 9-keto-11α,15α-dihydroxy-15β-methylprosta-4,5,13-trans-trienoic acid methyl ester is converted into 9-keto-11α,15α-dihydroxy-15β-methylprosta-4,5,13-trans-trienoic acid. (XXVII; R and $R^5$ = H; $R^{1'''}$ = hydroxy; $R^6$ = methyl; $n$ = 4).

Likewise, the remaining compounds obtained as final products in Example 32 are converted into the corresponding free acids.

EXAMPLE 33A

In accordance with the method described in Example 28, 8R-9-keto-11α,15α-dihydroxy-15β-methylprosta-4,5,13-trans-trienoic acid methyl ester is converted into 8R-9-keto-11α,15α-dihydroxy-15β-methylprosta-4,5,13-trans-trienoic acid (8R-antimer of XXVII, R and $R^5$ = H; $R^{1'''}$ = hydroxy; $R^6$ = methyl; $n$ = 4).

Likewise, the remaining compounds obtained as final products in Example 32A are converted into the corresponding free acids.

EXAMPLE 34

A mixture of 100 mg. of 9β,11α,15α-trihydroxyprosta-4,5,13-trans-trienoic acid methyl ester, 10 ml. of methanol, 10 ml. of water and 400 mg. of potassium carbonate is kept at 40°C for 18 hours under nitrogen atmosphere. At the end of this time the reaction mixture is diluted with water and evaporated to half volume under reduced pressure. It is then acidified with 2N-hydrochloric acid to pH 2 and extracted several times with ethyl acetate. The combined organic extracts are dried over magnesium sulfate and evaporated to dryness under reduced pressure, thus obtaining 9β,11α,15α-trihydroxyprosta-4,5,13-trans-trienoic acid (XVI, R and $R^5$ = H; $R^{1'''}$ = hydroxy; $R^{4'}$ = H; $n$ =4).

In a similar manner from the corresponding methyl esters there are produced the following compounds:

9β,15α-dihydroxyprosta-4,5,13-trans-trienoic acid,

9β,15α-dihydroxy-20-ethylprosta-4,5,13-trans-trienoic acid,

9β,11α,15α-trihydroxy-20-bisnorprosta-4,5,13-trans-trienoic acid,

9β,11α,15α-trihydroxy-20-ethylprosta-4,5,13-trans-trienoic acid,

9β,11α,15α-trihydroxy-20-pentylprosta-4,5,13-trans-trienoic acid, 4-methyl-9β,11α,15α-trihydroxyprosta-4,5,13-trans-trienoic acid, 6-methyl-9β,11α,15α-trihydroxyprosta-4,5,13-trans-trienoic acid and 4-propyl-6-methyl-9β,11α,15α-trihydroxyprosta-4,5,13-trans-trienoic acid.

EXAMPLE 34A

By following the method of Example 34, 8R-9β,11α,15α-trihydroxyprosta-4,5,13-trans-trienoic acid methyl ester is converted into 8R-9β,11α,15α-trihydroxyprosta-4,5,13-trans-trienoic acid (8R-antimer of XVI, R and $R^5$ = H; $R^{1'''}$ = hydroxy; $R^{4''}$ = H; $n$ = 4).

In a similar manner from the corresponding methyl esters there are produced the following compounds:

8R-9β,15α-dihydroxyprosta-4,5,13-trans-trienoic acid, 8R-9β,15α-dihydroxy-20-ethylprosta-4,5,13-trans-trienoic acid, 8R-9β,11α,15α-trihydroxy-20-bisnorprosta-4,5,13-trans-trienoic acid, 8R-9β,11α,15α-trihydroxy-20-ethylprosta-4,5,13-trans-trienoic acid, 8R-9β,11α,15α-trihydroxy-20-pentylprosta-4,5,13-trans-trienoic acid, 8R-4-methyl-9β,11α,15α-trihydroxyprosta-4,5,13-trans-trienoic acid, 8R-6-methyl-9β,11α,15α-trihydroxyprosta-4,5,13-trans-trienoic acid and 8R-4-propyl-6-methyl-9β,11α,15α-trihydroxyprosta-4,5,13-trans-trienoic acid.

EXAMPLE 35

To a solution of 100 mg. of 9α,11α,15α-trihydroxyprosta-4,5,13-trans-trienoic acid in 5 ml. of methylene chloride is added an ethereal solution of diazomethane until the color of the reagent persists in the mixture. The reaction mixture is maintained at room temperature for 1 hour and is then evaporated to dryness under reduced pressure, thus obtaining 9α,11α,15α-trihydroxyprosta-4,5,13-trans-trienoic acid methyl ester.

In a similar manner, 4-ethyl-9-keto-11α,15α-dihydroxyprosta-4,5,13-trans-trienoic acid, 4-methyl-9α,11α,15α-trihydroxyprosta-4,5,13-trans-trienoic acid, 9α,15α-dihydroxyprosta-4,5,13-trans-trienoic acid, 9α,15α-dihydroxy-20-ethylprosta-4,5,13-trans-trienoic acid, 4,6-dimethyl-9α,11α,15α-trihydroxyprosta-4,5,13-trans-trienoic acid, 9-keto-11α,15α-dihydroxy-20-norprosta-4,5,13-trans-trienoic acid, 9-keto-11α,15α-dihydroxy-20-methylprosta-4,5,13-trans-trienoic acid, 9-keto-15α-hydroxy-20-ethylprosta-4,5,13-trans-trienoic acid, 6-methyl-9-keto-11α,15α-dihydroxy-20-pentylprosta-4,5,13-trans-trienoic acid, 9α,11α,15α-trihydroxy-20-norprosta-4,5,13-trans-trienoic acid and 4,6-dimethyl-9α,11α,15α-trihydroxy-20-ethylprosta-4,5,13-trans-trienoic acid are converted into the corresponding methyl esters.

Likewise, the ethyl esters of the foregoing acids are produced using diazoethane in lieu of diazomethane.

EXAMPLE 35A

By repeating the method of Example 35, 8R-9α,11α,15α-trihydroxyprosta-4,5,13-trans-trienoic acid is converted into the corresponding methyl ester.

In a similar manner, 8R-4-ethyl-9-keto-11α,15α-dihydroxyprosta-4,5,13-trans-trienoic acid, 8R-4-methyl-9α,11α,15α-trihydroxyprosta-4,5,13-trans-trienoic acid, 8R-9α,15α-dihydroxyprosta-4,5,13-trans-trienoic acid, 8R-9α,15α-dihydroxy-20-ethylprosta-4,5,13-trans-trienoic acid, 8R-4,6-dimethyl-9α,11α,15α-trihydroxyprosta-4,5,13-trans-trienoic acid, 8R-9-keto-11α,15α-dihydroxy-20-norprosta-4,5,13-trans-trienoic acid, 8R-9-keto-11α,15α-dihydroxy-20-methylprosta-4,5,13-trans-trienoic acid, 8R-9-keto-15α-hydroxy-20-ethylprosta-4,5,13-trans-trienoic acid, 8R-6-methyl-9-keto-11α,15α-dihydroxy-20-pentylprosta-4,5,13-trans-trienoic acid, 8R-9α,11α,15α-trihydroxy-20-norprosta-4,5,13-trans-trienoic acid and 8R- 4,6-dimethyl-9α,11α,15α-trihydroxy-20-ethylprosta-4,5,13-trans-trienoic acid are converted into the corresponding methyl esters.

Likewise, the ethyl esters of the foregoing 8R-prostatrienoic acids are produced using diazoethane in lieu of diazomethane.

EXAMPLE 36

To a solution of 100 mg. of 9-keto-11α,15α-dihydroxyprosta-4,5,13-trans-trienoic acid in 10 ml. of methanol is added 2.6 ml. of a 0.1N solution of sodium hydroxide, and the mixture is stirred at room temperature for 1 hour. It is then evaporated to dryness under reduced pressure, to give the sodium salt of 9-keto-11α,15α-dihydroxyprosta-4,5,13-trans-trienoic acid.

By employing 1.1 molar equivalents of potassium hydroxide (in the form of a 0.1N solution) in place of sodium hydroxide in the above procedure the potassium salt of 9-keto-11α,15α-dihydroxyprosta-4,5,13-trans-trienoic acid is obtained.

Similarly, the sodium and potassium salts of the other prostatrienoic acid derivatives obtained in Examples 5, 6, 8, 9, 10, 11, 12, 17, 19, 20, 28 and 33 are produced.

EXAMPLE 36A

By following the method of Example 36, 8R-9α,11α,15α-trihydroxyprosta-4,5,13-trans-trienoic acid is treated with 1.1 molar equivalents of 0.1N solution of sodium hydroxide, to yield the corresponding sodium salt.

By employing 1.1 molar equivalents of potassium hydroxide (in the form of a 0.1N solution) in place of sodium hydroxide the potassium salt of 8R-9α,11α,15α-trihydroxyprosta-4,5,13-trans-trienoic acid is obtained.

Similarly, the sodium and potassium salts of the other 8R-prostatrienoic acid derivatives obtained in Examples 5A, 6A, 8A, 9A, 10A, 11A, 12A, 17A, 19A, 20A, 28A and 33A are produced.

EXAMPLE 37

To a solution of 100 mg. of 9α,11α,15α-trihydroxyprosta-4,5,13-trans-trienoic acid in 10 ml. of methanol is added a mixture of 3 ml. of concentrated ammonium hydroxide solution and 5 ml. of methanol. The resulting mixture is stirred for 2 hours at room temperature and then evaporated to dryness, to yield the ammonium salt of 9α,11α, 15α-trihydroxyprosta-4,5,13-trans-trienoic acid.

By employing dimethylamine, diethylamine or dipropylamine in place of ammonium hydroxide in the above process the corresponding salts of 9α,11α, 15α-trihydroxyprosta-4,5,13-trans-trienoic acid are obtained.

In a similar manner, the ammonium, dimethylamine, diethylamine and dipropylamine salts of the other prostanoic acid derivatives of the previous Examples can be prepared, e.g., the amine salts of 9-keto-11α,15α-dihydroxyprosta-4,5,13-trans-trienoic acid.

4-ethyl-9-keto-11α,15α-dihydroxyprosta-4,5,13-trans-trienoic acid,
9α,15α-dihydroxyprosta-4,5,13-trans-trienoic acid,
4-methyl-9α,11α,15α-trihydroxyprosta-4,5,13-trans-trienoic acid,
4-propyl-9α,11α,15α-trihydroxyprosta-4,5,13-trans-trienoic acid,
6-methyl-9-keto-15α-hydroxyprosta-4,5,13-trans-trienoic acid,
4,6-dimethyl-9-keto-11α,15α-dihydroxyprosta-4,5,13-trans-trienoic acid,
4-methyl-6-ethyl-9α,11α,15α-trihydroxyprosta-4,5,13-trans-trienoic acid,
9α,15α-dihydroxy-15β-methylprosta-4,5,13-trans-trienoic acid,
9-keto-11α,15α-dihydroxy-15β-methylprosta-4,5,13-trans-trienoic acid,
9-keto-11α,15α-dihydroxy-20-norprosta-4,5,13-trans-trienoic acid,
9-keto-11α,15α-dihydroxy-20-ethylprosta-4,5,13-trans-trienoic acid,
9β,11α,15α-trihydroxyprosta-4,5,13-trans-trienoic acid, etc.

EXAMPLE 37A

By following the method of Example 37, 8R-9α,11α,15α-trihydroxyprosta-4,5,13-trans-trienoic acid is converted into the corresponding ammonium salt.

By employing dimethylamine, diethylamine or dipropylamine in place of ammonium hydroxide the corresponding salts of 8R-9α,11α,15α-trihydroxyprosta-4,5,13-trans-trienoic acid are obtained.

In a similar manner, the ammonium, dimethylamine, diethylamine and dipropylamine salts of the other 8R-prostanoic acid derivatives of the previous Examples can be prepared, e.g., the amine salts of 8R-9-keto-11α,15α-dihydroxyprosta-4,5,13-trans-trienoic acid,
8R-4-ethyl-9-keto-11α,15α-dihydroxyprosta-4,5,13-trans-trienoic acid,
8R-9α,15α-dihydroxyprosta-4,5,13-trans-trienoic acid,
8R-4-methyl-9α,11α,15α-trihydroxyprosta-4,5,13-trans-trienoic acid,
8R-4-propyl-9α,11α,15α-trihydroxyprosta-4,5,13-trans-trienoic acid,
8R-6-methyl-9-keto-15α-hydroxyprosta-4,5,13-trans-trienoic acid,
8R-4,6-dimethyl-9-keto-11α,15α-dihydroxyprosta-4,5,13-trans-trienoic acid,
8R-9α,15α-dihydroxy-15β-methylprosta-4,5,13-trans-trienoic acid,
8R-9-keto-11α,15α-dihydroxy-15β-methylprosta-4,5,13-trans-trienoic acid,
8R-9-keto-11α,15α-dihydroxy-20-norprosta-4,5,13-trans-trienoic acid,
8R-9-keto-11α,15α-dihydroxy-20-ethylprosta-4,5,13-trans-trienoic acid,
8R-9β,11α,15α-trihydroxyprosta-4,5,13-trans-trienoic acid, etc.

EXAMPLE 38

A mixture of 100 mg. of 9α,11α,15α-trihydroxyprosta-4,5,13-trans-trienoic acid methyl ester, 0.4 ml. of pyridine and 0.8 ml. of acetic anhydride is kept at room temperature for 1 hour. The reaction mixture is then evaporated to dryness under reduced pressure and the residue is dissolved in ethyl acetate. Fifty milligrams of sodium bisulfate are added and the solution is filtered through Celite, diatomaceous earth. The filtrate is evaporated to dryness under reduced pressure to yield 9α,11α,15α-tricacetoxyprosta-4,5,13-trans-trienoic acid methyl ester.

By the same process but using propionic, caproic and cyclopentylpropionic anhydrides as esterifying agents there are produced the corresponding triesters of the methyl ester of 9α,11α,15α-trihydroxyprosta-4,5,13-trans-trienoic acid.

In a similar manner, other prostatrienoic acid derivatives obtained in Examples 6, 8, 9, 10, 11, 12, 17, 19, 20, 34 and 35 are converted into the corresponding diesters or triesters.

Representative compounds thus obtained are:
9-keto-11α,15α-diacetoxyprosta-4,5,13-trans-trienoic acid,
9-keto-11α,15α-diacetoxyprosta-4,5,13-trans-trienoic acid methyl ester,
9-keto-11α,15α-dipropionoxyprosta-4,5,13-trans-trienoic acid ethyl ester,
9α,15α-diacetoxyprosta-4,5,13-trans-trienoic acid,
9α,11α,15α-triacetoxy-4-methylprosta-4,5,13-trans-trienoic acid,
9α,11α,15α-tripropionoxy-4-ethylprosta-4,5,13-trans-trienoic acid,
9α,11α,15α-tricaproxy-4-propylprosta-4,5,13-trans-trienoic acid,
9-keto-11α,15α-diacetoxy-4-methylprosta-4,5,13-trans-trienoic acid methyl ester,
9-keto-11α,15α-diacetoxy-4-ethylprosta-4,5,13-trans-trienoic acid methyl ester,
6-methyl-9-keto-11α,15α-diacetoxyprosta-4,5,13-trans-trienoic acid,
4-methyl-6-ethyl-9keto-11α,15α-dipropionoxyprosta-4,5,13-trans-trienoic acid,
4,6-dimethyl-9α,11α,15α-triacetoxyprosta-4,5,13-trans-trienoic acid,
4-propyl-6-methyl-9α,11α,15α-tricaproxyprosta-4,5,13-trans-trienoic acid,
9-keto-11α,15α-diacetoxy-20-ethylprosta-4,5,13-trans-trienoic acid,
9-keto-15α-propionoxy-20-ethylprosta-4,5,13-trans-trienoic acid,
9α,11α,15α-triacetoxy-20-bisnorprosta-4,5,13-trans-trienoic acid,
9β,11α,15α-tricaproxyprosta-4,5,13-trans-trienoic acid and 9α,11α,15α-triacetoxy-20-pentylprosta-4,5,13-trans-trienoic acid, etc.

EXAMPLE 38A

By treating 8R-9α,11α,15α-trihydroxyprosta-4,5,13-trans-trienoic acid methyl ester with acetic anhydride in pyridine, in accordance with the method of Example 38, there is obtained 8R-9α,11α,15α-triacetoxyprosta-4,5,13-trans-trienoic acid methyl ester.

By the same process but using propionic, caproic and cyclopentylpropionic anhydrides as esterifying agents there are produced the corresponding triesters of the methyl ester of 8R-9α,11α,15α-trihydroxyprosta-4,5,13-trans-trienoic acid.

In a similar manner, other prostatrienoic acid derivatives obtained in Examples 6A, 8A, 9A, 10A, 11A, 12A, 17A, 19A, 20A, 34A and 35A can be converted into the corresponding diesters or triesters.

Representative compounds thus obtained are:
8R-9-keto-11α,15α-diacetoxyprosta-4,5,13-trans-trienoic acid,
8R-9-keto-11α, 15α-diacetoxyprosta-4,5,13-trans-trienoic acid methyl ester,
8R-9-keto-11α,15α-dipropionoxyprosta-4,5,13-trans-trienoic acid ethyl ester,
8R-9α,15α-diacetoxyprosta-4,5,13-trans-trienoic acid,
8R-9α,11α,15α-triacetoxy-4-methylprosta-4,5,13-trans-trienoic acid,
8R-9α,11α,15α-tripropionoxy-4-ethylprosta-4,5,13-trans-trienoic acid,
8R-9α,11α,15α-tricaproxy-4-propylprosta-4,5,13-trans-trienoic acid,
8R-9-keto-11α,15α-diacetoxy-4-methylprosta-4,5,13-trans-trienoic acid methyl ester,
8R-9-keto-11α,15α-diacetoxy-4-ethylprosta-4,5,13-trans-trienoic acid methyl ester,
8R-6-methyl-9-keto-11α,15α-diacetoxyprosta-4,5,13-trans-trienoic acid,
8R-4-methyl-6-ethyl-9-keto-11α,15α-dipropionoxyprosta-4,5,13-trans-trienoic acid,
8R-4,6-dimethyl-9α,11α,15α-triacetoxyprosta-4,5,13-trans-trienoic acid,
8R-4-propyl-6-methyl-9α,11α,15 -tricaproxyprosta-4,5,13-trans-trienoic acid,
8-R9-keto-11α,15α-diacetoxy-20-ethylprosta-4,5,13-trans-trienoic acid,
8R-9-keto-15α-propionoxy-20-ethylprosta-4,5,13-trans-trienoic acid,
8R-9α,11α,15α-triacetoxy-20-bisnorprosta-4,5,13-trans-trienoic acid,
8R-9β,11α,15α-tricaproxyprosta-4,5,13-trans-trienoic acid and
8R-9α,11α,15α-triacetoxy-20-pentylprosta-4,5,13-trans-trienoic acid, etc.

EXAMPLE 39

A solution of 100 mg. of 9α,11α-bis(trimethylsilyloxy)-15-ketoprosta-4,5,13-trans-trienoic acid methyl ester in 20 ml. of anhydrous ether is cooled to −20°C and treated dropwise, under stirring and under argon atmosphere with 6 molar equivalents of 3N methylmagnesium bromide solution in ether. The temperature of the reaction mixture is allowed to rise to 0°C, 6 additional molar equivalents of methylmagnesium bromide solution are added, and the resulting mixture is stirred for 2 hours more, at the end of which time there are added 5 ml. of methanol. The resulting mixture is diluted with ether and washed several times with saturated sodium chloride solution. The ethereal extract is then dried over magnesium sulfate and evaporated to dryness under vacuo to yield the crude 9α,11-α-bis(trimethylsilyloxy-15{-hydroxy-15{-methylprosta-4,5,13-trans-trienoic acid methyl ester, which upon hydrolysis of the protecting trimethylsilyloxy groups and purification by thin layer chromatography, as described in Example 26, part C, gives rise to the pure 9α,11α,15α-trihydroxy- 15β-methylprosta-4,5,13-trans-trienoic acid methyl ester and 9α,11α,15β-trihydroxy-15α-methylprosta-4,5,13-trans-trienoic acid methyl ester (XX, R and $R^5$ = H; $R^{1'''}$ = hydroxy; $R^6$ = methyl; $n$ = 4), identical to the compounds obtained in Example 26.

EXAMPLE 39A

Example 39 is repeated using 8R-9α,11α-bis(trimethylsilyloxy-15-ketoprosta-4,5,13-trans-trienoic acid methyl ester as starting material obtaining as final products 8R-9α,11α,15α-trihydroxy-15β-methylprosta-4,5,13-trans-trienoic acid methyl ester and 8R-9α,11α,15β-trihydroxy-15α-methylprosta-4,5,13-trans-trienoic acid methyl ester (8R-antimers of XX, R and $R^5$ = H; $R^{1'''}$ = hydroxy; $R^6$ = methyl; $n$ = 4) identical to the compounds obtained in Example 26A.

EXAMPLE 40

To 280 mg. of 9α,11α-dihydroxy-15-ketoprosta-4,5,13-trans-trienoic acid methyl ester are added 6 ml. of a (1:1) mixture of N-trimethylsilyldiethylamine and anhydrous acetone, and the reaction mixture is kept at room temperature, under argon atmosphere for 6 hours. The reaction mixture is then evaporated to dryness under reduced pressure and the oily residue is dissolved in 10 ml. of anhydrous tetrahydrofuran. The resulting solution is cooled to −78°C and treated dropwise, under argon atmosphere, with 1.4 ml. of 2N methylmagnesium bromide in ether, maintaining the temperature of the reaction mixture below −60°C. The reaction mixture is stirred at −78°C for 5 hours further, diluted with saturated ammonium chloride solution and extracted with ether. The organic extract is washed with saturated ammonium chloride solution, dried over magnesium sulfate and evaporated to dryness under vacuo. The residue is dissolved in 10 ml. of 70 percent aqueous methanol and treated with 0.1 ml. of a mixture of acetic acid water (0.2:3 ), maintaining the reaction mixture at 0°C for 18 hours. It is then evaporated to dryness under vacuo and the residue purified by thin layer chromatography using a mixture of methylene chloride-ether-methanol (50:45:5) as eluant, thus obtaining 9α,11α,15α-trihydroxy-15β-methylprosta-4,5,13-trans-trienoic acid methyl ester and 9α,11α,15-β-trihydroxy-15α-methylprosta-4,5,13-trans-trienoic acid methyl ester in pure form, identical to the products obtained in Example 26.

EXAMPLE 40A

By following the method of Example 40, 8R-9α,11α-dihydroxy-15-ketoprosta-4,5,13-trans-trienoic acid methyl ester is converted into 8R-9α,11α,15α-trihydroxy-15β-methylprosta-4,5,13-trans-trienoic acid methyl ester and 8R-9α,11α,15β-trihydroxy-15α-methylprosta-4,5,13-trans-trienoic acid methyl ester, identical to the products obtained in Examples 26A and 39A.

What is claimed is:

1. A compound selected from the group consisting of racemic mixtures and 8R-antimers of those represented by the formulas:

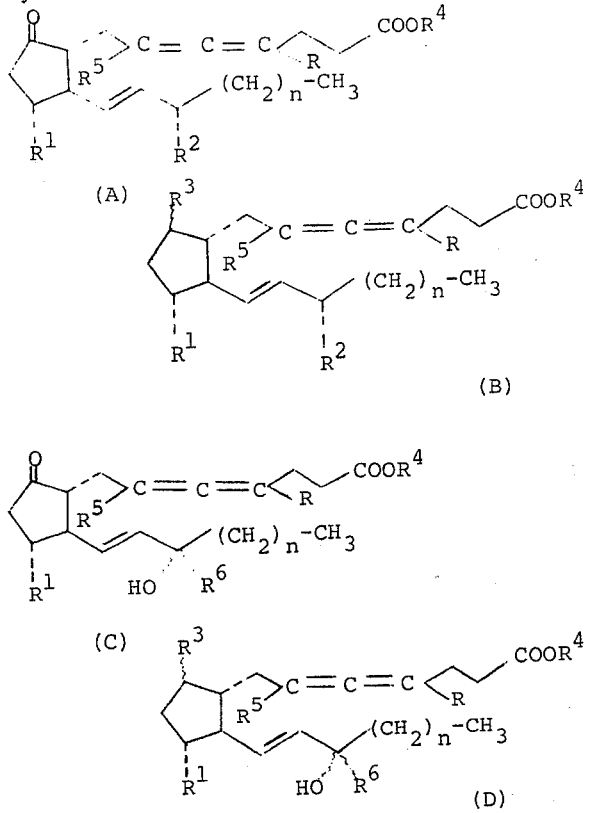

wherein each of R and $R^5$ represents hydrogen, methyl ethyl or propyl;

$R^1$ represents hydrogen, hydroxy, tetrahydrofuran-2-yloxy, tetrahydropyran-2-yloxy, 4-methoxytetrahydropyran-4-yloxy, a hydrocarbon carboxylic acyloxy group containing from 1 to 12 carbon atoms or a substituted hydrocarbon carboxylic acyloxy group having from 1 to 12 carbon atoms wherein the substituent is selected from the group consisting of hydroxy, alkoxy containing up to twelve carbon atoms, nitro, amino and halogen;

each of $R^2$ and $R^3$ represents hydroxy, tetrahydrofuran-2-yloxy, tetrahydropyran-2-yloxy, 4-methoxytetrahydropyran-4-yloxy, a hydrocarbon carboxylic acyloxy group containing from 1 to 12 carbon atoms or a substituted hydrocarbon carboxylic acyloxy group having from 1 to 12 carbon atoms wherein the substituent is selected from the group consisting of hydroxy, alkoxy containing up to twelve carbon atoms, nitro, amino and halogen;

$R^6$ represents methyl, ethyl or propyl;

$R^4$ represents hydrogen, a lower alkyl group or the pharmaceutically acceptable, non-toxic salts of compounds in which $R^4$ is hydrogen;

n is an integer of from 2 to 9, and the wavy lines ( ) indicate the α or β configuration, or mixtures thereof, provided that when $R^6$ is α, the hydroxyl group, attached to the same carbon atom as $R^6$, is β; and when $R^6$ is β, the hydroxyl group, attached to the same carbon atom as $R^6$, is α; and further provided that in formulas (A) and (B) and R and $R^5$ are hydrogen and $R^1$ is other than hydrogen n is only 4.

2. A compound according to claim 1 wherein said compound is a racemic mixture.

3. A compound according to claim 2 wherein $R^1$, $R^2$ and $R^3$ are hydroxy and R, $R^4$ and $R^5$ are hydrogen.

4. A compound according to claim 2 wherein R, $R^1$, $R^4$ and $R^5$ are hydrogen and $R^2$ and $R^3$ are hydroxy.

5. A compound according to claim 2 wherein R is methyl, ethyl or propyl, $R^1$, $R^2$ and $R^3$ are hydroxy and $R^4$ and $R^5$ are hydrogen.

6. A compound according to claim 2 wherein R is methyl, ethyl or propyl, $R^2$ and $R^3$ are hydroxy and $R^1$, $R^4$ and $R^5$ are hydrogen.

7. A compound according to claim 2 wherein $R^5$ is methyl, ethyl or propyl, $R^1$, $R^2$ and $R^3$ are hydroxy and R and $R^4$ are hydrogen.

8. A compound according to claim 2 wherein $R^5$ is methyl, ethyl or propyl, $R^2$ and $R^3$ are hydroxy and R, $R^1$ and $R^4$ are hydrogen.

9. A compound according to claim 2 wherein each of R and $R^5$ are methyl, ethyl or propyl, $R^1$, $R^2$ and $R^3$ are hydroxy and $R^4$ is hydrogen.

10. A compound according to claim 2 wherein each of R and $R^5$ are methyl, ethyl or propyl, $R^2$ and $R^3$ are hydroxy and $R^1$ and $R^4$ are hydrogen.

11. A compound according to claim 2 wherein n is 4.

12. A compound according to claim 2 formula (A) wherein R, $R^4$ and $R^5$ are hydrogen, $R^1$ and $R^2$ are hydroxy and n is 4, 9-keto-11α,15α-dihydroxyprosta-4,5,13-trans-trienoic acid, and the non-toxic pharmaceutically acceptable salts thereof.

13. A compound according to claim 2 formula (A) wherein R and $R^5$ are hydrogen, $R^4$ is methyl, $R^1$ and $R^2$ are hydroxy, and n is 4, 9-keto-11α,15α-dihydroxyprosta-4,5,13-trans-trienoic acid methyl ester.

14. A compound according to claim 2 formula (A) wherein R, $R^1$, $R^4$ and $R^5$ are hydrogen, $R^2$ is hydroxy and n is 4, 9-keto-15α-hydroxyprosta-4,5,13-trans-trienoic acid, and the non-toxic, pharmaceutically acceptable salts thereof.

15. A compound according to claim 2 formula (A) wherein R is methyl, $R^4$ and $R^5$ are hydrogen, $R^1$ and $R^2$ are hydroxy and n is 4, 4-methyl-9-keto-11α,15α-dihydroxyprosta-4,5,13-trans-trienoic acid and the non-toxic, pharmaceutically acceptable salts thereof.

16. A compound according to claim 2 formula (A) wherein R is methyl, $R^1$, $R^4$ and $R^5$ are hydrogen, $R^2$ is hydroxy and n is 4, 4-methyl-9-keto-15α-hydroxyprosta-4,5,13-trans-trienoic acid, and the non-toxic, pharmaceutically acceptable salts thereof.

17. A compound according to claim 2 formula (A) wherein R and $R^4$ are hydrogen, $R^5$ is methyl, $R^1$ and $R^2$ are hydroxy, and n is 4, 6-methyl-9-keto-11α,15α-dihydroxyprosta-4,5,13-trans-trienoic acid, and the non-toxic, pharmaceutically acceptable salts thereof.

18. A compound according to claim 2 formula (A) wherein R, $R^1$ and $R^4$ are hydrogen, $R^5$ is methyl, $R^2$ is hydroxy and n is 4, 6-methyl-9-keto-15α-hydroxyprosta-4,5,13-trans-trienoic acid, and the non-toxic, pharmaceutically acceptable salts thereof.

19. A compound according to claim 2 formula (A) wherein R and $R^5$ are methyl, $R^1$ and $R^2$ are hydroxy, $R^4$ is hydrogen and n is 4, 4,6-dimethyl-9-keto-11α,15α-dihydroxyprosta-4,5,13-trans-trienoic acid, 20. A compound according to claim 2 formula (A) wherein R and $R^5$ are methyl, $R^2$ is hydroxy, $R^1$ and $R^4$ are hydrogen and n is 4, 4,6-dimethyl-9-keto-15α-hydroxyprosta-4,5,13-trans-trienoic acid and the non-toxic, pharmaceutically acceptable salts thereof.

21. A compound according to claim 2 formula (A) wherein R, $R^1$, $R^4$ and $R^5$ are hydrogen, $R^2$ is hydroxy and n is 6, 9-keto-15α-hydroxy-20-ethylprosta-4,5,13-trans-trienoic acid and the non-toxic, pharmaceutically acceptable salts thereof.

22. A compound according to claim 2 formula (B) wherein R, $R^4$ and $R^5$ are hydrogen, $R^1$, $R^2$ and $R^3$ are hydroxy, the wavy line indicates the α-configuration and n is 4, 9α,11α,15α-trihydroxyprosta-4,5,13-trans-trienoic acid, and the non-toxic, pharmaceutically acceptable salts thereof.

23. A compound according to claim 2 formula (B) wherein R and $R^5$ are hydrogen, $R^4$ is methyl, $R^1$, $R^2$ and $R^3$ are hydroxy, the wavy line indicates the α configuration and n is 4, 9α,11α,15α-trihydroxyprosta-4,5,13-trans-trienoic acid methyl ester.

24. A compound according to claim 2 formula (B) wherein R, $R^4$ and $R^5$ are hydrogen, $R^1$, $R^2$ and $R^3$ are hydroxy, the wavy line indicates the β-configuration and n is 4, 9β,11α,15α-trihydroxyprosta-4,5,13-trans-trienoic acid and the non-toxic, pharmaceutically acceptable salts thereof.

25. A compound according to claim 2 formula (B) wherein R, $R^4$ and $R^5$ are hydrogen, $R^1$, $R^2$ and $R^3$ are hydroxy, the wavy lines indicates the β-configuration and n is 6, 9β,11α,15α-trihydroxy-20-ethylprosta-4,5,13-trans-trienoic acid and the non-toxic, pharmaceutically acceptable salts thereof.

26. A compound according to claim 2 formula (B) wherein R, $R^1$, $R^4$ and $R^5$ are hydrogen, $R^2$ and $R^3$ are hydroxy the wavy line indicates the α-configuration and n is 4, 9α,15α-diydroxyprosta-4,5,13-trans-trienoic acid and the non-toxic, pharmaceutically acceptable salts thereof.

27. A compound according to claim 2 formula (B) wherein R, $R^1$, $R^4$ and $R^5$ are hydrogen, $R^2$ and $R^3$ are hydroxy, the wavy line indicates the β-configuration and n is 4, 9β,15α-dihydroxyprosta-4,5,13-trans-trienoic acid and the non-toxic, pharmaceutically acceptable salts thereof.

28. A compound according to claim 2 formula (B) wherein R, $R^1$, $R^4$ and $R^5$ are hydrogen, $R^2$ and $R^3$ are hydroxy, the wavy line indicates the α-configuration and n is 6, 9α,15α-dihydroxy-20-ethylprosta-4,5,13-trans-trienoic acid and the non-toxic, pharmaceutically acceptable salts thereof.

29. A compound according to claim 2 formula (B) wherein R, $R^1$, $R^4$ and $R^5$ are hydrogen, $R^2$ and $R^3$ are hydroxy, the wavy line indicates the β-configuration and n is 6, 9β,15α-dihydroxy-20-ethylprosta-4,5,13-trans-trienoic acid and the non-toxic, pharmaceutically acceptable salts thereof.

30. A compound according to claim 2 formula (B) wherein R is methyl, $R^4$ and $R^5$ are hydrogen, $R^1$, $R^2$ and $R^3$ are hydroxy, the wavy line indicates the α-configuration and n is 4, 4-methyl-9α,11α,15α-trihydroxyprosta-4,5,13-trans-trienoic acid and the non-toxic, pharmaceutically acceptable salts thereof.

31. A compound according to claim 2 formula (B) wherein R is methyl, $R^1$, $R^4$ and $R^5$ are hydrogen, $R^2$ and $R^3$ are hydroxy, the wavy line indicates the α-configuration and n is 4, 4-methyl-9α,15α-dihydroxyprosta-4,5,13-trans-trienoic acid, and the non-toxic, pharmaceutically acceptable salts thereof.

32. A compound according to claim 2 formula (B) wherein $R^5$ is methyl, R and $R^4$ are hydrogen, $R^1$, $R^2$ and $R^3$ are hydroxy, the wavy line indicates the α-configuration and n is 4, 6-methyl-9α,11α,15α-trihydroxyprosta-4,5,13-trans-trienoic acid and the non-toxic, pharmaceutically acceptable salts thereof.

33. A compound according to claim 2 formula (B) wherein $R^5$ is methyl, R, $R^1$ and $R^4$ are hydrogen, $R^2$ and $R^3$ are hydroxy, the wavy line indicates the α-configuration and n is 4, 6-methyl-9α,15α-dihydroxyprosta-4,5,13-trans-trienoic acid and the non-toxic, pharmaceutically acceptable salts thereof.

34. A compound according to claim 2 formula (B) wherein R and $R^5$ are methyl, $R^1$, $R^2$ and $R^3$ are hydroxy, $R^4$ is hydrogen, the wavy line indicates the α-configuration and n is 4, 4,6-dimethyl-9α,11α,15α-trihydroxyprosta-4,5,13-trans-trienoic acid and the non-toxic, pharmaceutically acceptable salts thereof.

35. A compound according to claim 2 formula (B) wherein R and $R^5$ are methyl, $R^2$ and $R^3$ are hydroxy, $R^1$ and $R^4$ are hydrogen, the wavy line indicates the α-configuration and n is 4, 4,6-dimethyl-9α,15α-dihydroxyprosta-4,5,13-trans-trienoic acid and the non-toxic, pharmaceutically acceptable salts thereof.

36. A compound according to claim 2 formulas (C) and (D) wherein the hydroxy group at C–15 is in the α-configuration and the alkyl group at said position is in the β-configuration.

37. A compound according to claim 2, formulas (C) and (D) wherein the hydroxy group at C–15 is in the β-configuration and the alkyl group at said position is in the α-configuration.

38. A compound according to claim 2, formula (C) wherein R, $R^4$ and $R^5$ are hydrogen, $R^1$ is hydroxy, $R^6$ is β-methyl and n is 4, 9-keto-11α,15α-dihydroxy-15β-methylprosta-4,5,13-trans-trienoic acid, and the non-toxic, pharmaceutically acceptable salts thereof.

39. A compound according to claim 2, formula (C) wherein R, $R^1$, $R^4$ and $R^5$ are hydrogen, $R^6$ is β-methyl and n is 4, 9-keto-15α-hydroxy-15β-methylprosta-4,5,13-trans-trienoic acid, and the non-toxic, pharmaceutically acceptable salts thereof.

40. A compound according to claim 2, formula (D) wherein R, $R^4$ and $R^5$ are hydrogen, $R^1$ is hydrogen, $R^1$ is hydroxy, $R^3$ is α-hydroxy, $R^6$ is β-methyl and n is 4, 9α,11α,15α-trihydroxy-15β-methylprosta-4,5,13-trans-trienoic acid and the non-toxic, pharmaceutically acceptable salts thereof.

41. A compound according to claim 2 formula (D) wherein R, $R^1$, $R^4$ and $R^5$ are hydrogen, $R^3$ is α-hydroxy, $R^6$ is β-methyl and n is 4, 9α,15α-dihydroxy-15β-methylprosta-4,5,13-trans-trienoic acid and the non-toxic, pharmaceutically acceptable salts thereof.

42. A compound according to claim 1 wherein said compound is a 8R-antimer.

43. A compound according to claim 42 wherein $R^1$, $R^2$ and $R^3$ are hydroxy and R, $R^4$ and $R^5$ are hydrogen.

44. A compound according to claim 42 wherein R, $R^1$, $R^4$ and $R^5$ are hydrogen and $R^2$ and $R^3$ are hydroxy.

45. A compound according to claim 42 wherein R is methyl, ethyl or propyl, $R^1$, $R^2$ and $R^3$ are hydroxy and $R^4$ and $R^5$ are hydrogen.

46. A compound according to claim 42 wherein R is methyl, ethyl or propyl, $R^2$ and $R^3$ are hydroxy and $R^1$, $R^4$ and $R^5$ are hydrogen.

47. A compound according to claim 42 wherein $R^5$ is methyl, ethyl or propyl, $R^1$, $R^2$ and $R^3$ are hydroxy and R and $R^4$ are hydrogen.

48. A compound according to claim 42 wherein $R^5$ is methyl, ethyl or propyl, $R^2$ and $R^3$ are hydroxy and R, $R^1$ and $R^4$ are hydrogen.

49. A compound according to claim 42 wherein each of R and $R^5$ are methyl, ethyl or propyl, $R^1$, $R^2$ and $R^3$ are hydroxy and $R^4$ is hydrogen.

50. A compound according to claim 42 wherein each of R and $R^5$ are methyl, ethyl or propyl, $R^2$ and $R^3$ are hydroxy and $R^1$ and $R^4$ are hydrogen.

51. A compound according to claim 42 wherein $n$ is 4.

52. A compound according to claim 42 formula (A) wherein R, $R^4$ and $R^5$ are hydrogen, $R^1$ and $R^2$ are hydroxy and $n$ is 4, 8R-9-keto-11α,15α-dihydroxyprosta-4,5,13-trans-trienoic acid, and the non-toxic pharmaceutically acceptable salts thereof.

53. A compound according to claim 42 formula (A) wherein R and $R^5$ are hydrogen, $R^4$ is methyl, $R^1$ and $R^2$ are hydroxy, and $n$ is 4, 8R-9-keto-11α,15α-dihydroxyprosta-4,5,13-trans-trienoic acid methyl ester.

54. A compound according to claim 42 formula (A) wherein R, $R^1$, $R^4$ and $R^5$ are hydrogen, $R^2$ is hydroxy and $n$ is 4, 8R-9-keto-15α-hydroxyprosta-4,5,13-trans-trienoic acid, and the non-toxic, pharmaceutically acceptable salts thereof.

55. A compound according to claim 42 formula (A) wherein R is methyl, $R^4$ and $R^5$ are hydrogen, $R^1$ and $R^2$ are hydroxy and $n$ is 4, 8R-4-methyl-9-keto-11α,15α-dihydroxyprosta-4,5,13-trans-trienoic acid the non-toxic, pharmaceutically acceptable salts thereof.

56. A compound according to claim 42 formula (A) wherein R is methyl, $R^1$, $R^4$ and $R^5$ are hydrogen, $R^2$ is hydroxy and $n$ is 4, 8R-4-methyl-9-keto-15α-hydroxyprosta-4,5,13-trans-trienoic acid, and the non-toxic, pharmaceutically acceptable salts thereof.

57. A compound according to claim 42 formula (A) wherein R and $R^4$ are hydrogen, $R^5$ is methyl, $R^1$ and $R^2$ are hydroxy, and $n$ is 4, 8R-6-methyl-9-keto-11α,15α-dihydroxyprosta-4,5,13-trans-trienoic acid, and the non-toxic, pharmaceutically acceptable salts thereof.

58. A compound according to claim 42 formula (A) wherein R, $R^1$ and $R^4$ are hydrogen, $R^5$ is methyl, $R^2$ is hydroxy $n$ is 4, 8R-6-methyl-9-keto-15α-hydroxyprosta-4,5,13-trans-trienoic acid, and the non-toxic, pharmaceutically acceptable salts thereof.

59. A compound according to claim 42 formula (A) wherein R and $R^5$ are methyl, $R^1$ and $R^2$ are hydroxy, $R^4$ is hydrogen and $n$ is 4, 8R-4,6-dimethyl-9-keto-11α,15α-dihydroxyprosta-4,5,13-trans-trienoic acid, and the non-toxic, pharmaceutically acceptable salts thereof.

60. A compound according to claim 42 formula (A) wherein R and $R^5$ are methyl, $R^2$ is hydroxy, $R^1$ and $R^4$ are hydrogen and $n$ is 4, 8R-4,6-dimethyl-9-keto-15α-hydroxyprosta-4,5,13-trans-trienoic acid and the non-toxic, pharmaceutically acceptable salts thereof.

61. A compound according to claim 42 formula (A) wherein R, $R^4$ and $R^5$ are hydrogen, $R^1$ and $R^2$ are hydroxy, and $n$ is 6, 8R-9-keto-11α,15α-dihydroxy-20-ethylprosta-4,5,13-trans-trienoic acid and the non-toxic, pharmaceutically acceptable salts thereof.

62. A compound according to claim 42 formula (A) wherein R, $R^1$, $R^4$ and $R^5$ are hydrogen, $R^2$ is hydroxy and $n$ is 6, 8R-9-keto-15α-hydroxy-20-ethylprosta-4,5,13-trans-trienoic acid and the non-toxic, pharmaceutically acceptable salts thereof.

63. A compound according to claim 42 formula (B) wherein R, $R^4$ and $R^5$ are hydrogen, $R^1$, $R^2$ and $R^3$ are hydroxy, the wavy line indicates the α-configuration and $n$ is 4, 8R-9α,11α,15α-trihydroxyprosta-4,5,13-trans-trienoic acid, and the non-toxic, pharmaceutically acceptable salts thereof.

64. A compound according to claim 42 formula (B) wherein R and $R^5$ are hydrogen, $R^4$ is methyl, $R^1$, $R^2$ and $R^3$ are hydroxy, the wavy line indicates the α-configuration and $n$ is 4, 8R-9α,11α,15α-trihydroxyprosta-4,5,13-trans-trienoic acid methyl ester.

65. A compound according to claim 42, formula (B) wherein R, $R^4$ and $R^5$ are hydrogen, $R^1$, $R^2$ and $R^3$ are hydroxy, the wavy line indicates the α-configuration and $n$ is 6, 8R-9α,11α,15α-trihydroxy-20-ethylprosta-4,5,13-trans-trienoic acid and the non-toxic, pharmaceutically acceptable salts thereof.

66. A compound according to claim 42 formula (B) wherein R, $R^4$ and $R^5$ are hydrogen, $R^1$, $R^2$ and $R^3$ are hydroxy, the wavy line indicates the β-configuration and $n$ is 4, 8R-9β,11α,15α-trihydroxyprosta-4,5,13-trans-trienoic acid and the non-toxic, pharmaceutically acceptable salts thereof.

67. A compound according to claim 42 formula (B) wherein R, $R^4$ and $R^5$ are hydrogen, $R^1$, $R^2$ and $R^3$ are hydroxy, the wavy line indicates the β-configuration and $n$ is 6, 8R-9β,11α,15α-trihydroxy-20-ethylprosta-4,5,13-trans-trienoic acid and the non-toxic, pharmaceutically acceptable salts thereof.

68. A compound according to claim 42 formula (B) wherein R, $R^1$, $R^4$ and $R^5$ are hydrogen, $R^2$ and $R^3$ are hydroxy, the wavy line indicates the α-configuration and $n$ is 4, 8R-9α,15α-dihydroxyprosta-4,5,13-trans-trienoic acid and the non-toxic, pharmaceutically acceptable salts thereof.

69. A compound according to claim 42 formula (B) wherein R, $R^1$, $R^4$ and $R^5$ are hydrogen, $R^2$ and $R^3$ are hydroxy, the wavy line indicates the β-configuration and $n$ is 4, 8R-9β,15α-dihydroxyprosta-4,5,13-trans-trienoic acid and the non-toxic, pharmaceutically acceptable salts thereof.

70. A compound according to claim 42 formula (B) wherein R, $R^1$, $R^4$ and $R^5$ are hydrogen, $R^2$ and $R^3$ are hydroxy, the wavy line indicate the α-configuration and $n$ is 6, 8R-9α,15α-dihydroxy-20-ethylprosta-4,5,13-trans-trienoic acid and the non-toxic, pharmaceutically acceptable salts thereof.

71. A compound according to claim 42 formula (B) wherein R, $R^1$, $R^4$ and $R^5$ are hydrogen, $R^2$ and $R^3$ are hydroxy, the wavy line indicates the β-configuration and $n$ is 6, 8R-9β,15α-dihydroxy-20-ethylprosta-4,5,13-trans-trienoic acid and the non-toxic, pharmaceutically acceptable salts thereof.

72. A compound according to claim 42 formula (B) wherein R is methyl, $R^4$ and $R^5$ are hydrogen, $R^1$, $R^2$ and $R^3$ are hydroxy, the wavy line indicates the α-configuration and $n$ is 4, 8R-4-methyl-9α,11α,15α-trihydroxyprosta-4,5,13-trans-trienoic acid the non-toxic, pharmaceutically acceptable salts thereof.

73. A compound according to claim 43 formula (B) wherein R is methyl, $R^1$, $R^4$ and $R^5$ are hydrogen, $R^2$ and $R^3$ are hydroxy, the wavy line indicates the α-configuration and n is 4, 8R-4-methyl-9α,15α-dihydroxyprosta-4,5,13-trans-trienoic acid, and the non-toxic, pharmaceutically acceptable salts thereof.

74. A compound according to claim 42 formula (B) wherein $R^5$ is methyl, R and $R^4$ are hydrogen, $R^1$, $R^2$ and $R^3$ are hydroxy, the wavy line indicates the α-configuration and n is 4, 8R-6-methyl-9α, α,15α-trihydroxyprosta-4,5,13-trans-trienoic acid and the non-toxic, pharmaceutically acceptable salts thereof.

75. A compound according to claim 42 formula (B) wherein $R^5$ is methyl, R, $R^1$ and $R^4$ are hydrogen, $R^2$ and $R^3$ are hydroxy, the wavy line indicates the α-configuration and n is 4, 8R-6-methyl-9α,15α-dihydroxyprosta-4,5,13-trans-trienoic acid and the non-toxic, pharmaceutically acceptable salts thereof.

76. A compound according to claim 42 formula (B) wherein R and $R^5$ are methyl, $R^1$, $R^2$ and $R^3$ are hydroxy, $R^4$ is hydrogen, the wavy line indicates the α-configuration and n is 4, 8R-4,6-dimethyl-9α,11α,15α-trihydroxyprosta-4,5,13-trans-trienoic acid and the non-toxic, pharmaceutically acceptable salts thereof.

77. A compound according to claim 42 formula (B) wherein R and $R^5$ are methyl, $R^2$ and $R^3$ are hydroxy, $R^1$ and $R^4$ are hydrogen, the wavy line indicates the α-configuration and n is 4, 8R-4,6-dimethyl-9α,15α-dihydroxyprosta-4,5,13-trans-trienoic acid and the non-toxic, pharmaceutically acceptable salts thereof.

78. A compound according to claim 42 formulas (C) and (D) wherein the hydroxy group at C–15 is in the α-configuration and the alkyl group at said position is in the β-configuration.

79. A compound according to claim 42, formulas (C) and (D) wherein the hydroxy group at C–15 is in the β-configuration and the alkyl group at said position is in the α-configuration.

80. A compound according to claim 42, formula (C) wherein R, $R^4$ and $R^5$ are hydrogen, $R^1$ is hydroxy, $R^6$ is β-methyl and n is 4, 8-R9-keto-11α,15α-dihydroxy-1562-methylprosta-4,5,13-trans-trienoic acid, and the non-toxic, pharmaceutically acceptable salts thereof.

81. A compound according to claim 42, formula (C) wherein R, $R^1$, $R^4$ and $R^5$ are hydrogen, $R^6$ is β-methyl and n is 4, 8R-9-keto-15α-hydroxy-15β-methylprosta-4,5,13-trans-trienoic acid, and the non-toxic, pharmaceutically acceptable salts thereof.

82. A compound according to claim 42, formula (D) wherein R, $R^4$ and $R^5$ are hydrogen, $R^1$ is hydroxy, $R^3$ is α-hydroxy, $R^6$ is β-methyl and n is 4, 8R-9α,11α,15α-trihydroxy-15β-methylprosta-4,5,13-trans-trienoic acid and the non-toxic, pharmaceutically acceptable salts thereof.

83. A compound according to claim 42 formula (D) wherein R, $R^1$, $R^4$ and $R^5$ are hydrogen, $R^3$ is a α-hydroxy, $R^6$ is β-methyl and n is 4, 8R-9α,15α-dihydroxy-15β-methylprosta-4,5,13-trans-trienoic acid and the non-toxic, pharmaceutically acceptable salts thereof.

84. A compound according to claim 2 formula (D) wherein R and $R^5$ are hydrogen, $R^1$ is hydroxy, $R^3$ is α-hydroxy, $R^4$ and $R^6$ are methyl and n is 4,9α,11α,15{-trihydroxy-15{-methylprosta-4,5,13-trans-trienoic acid methyl ester.

85. A compound according to claim 2 formula (D) wherein R and $R^5$ are hydrogen, $R^1$ is hydroxy, $R^3$ is α-hydroxy, $R^4$ is methyl, $R^6$ is β-methyl and n is 4,9α,11α,15α-trihydroxy-15β-methylprosta-4,5,13-trans-trienoic acid methyl ester.

86. A compound according to claim 2 formula (D) wherein R and $R^5$ are hydrogen, $R^1$ is hydroxy, $R^3$ is α-hydroxy, $R^4$ is methyl, $R^6$ is α-methyl and n is 4,9α,11α,15β-trihydroxy-15α-methylprosta-4,5,13-trans-trienoic acid methyl ester.

* * * * *

UNITED STATES PATENT OFFICE
CERTIFICATE OF CORRECTION

Patent No. 3,879,438   Dated April 22, 1975

Inventor(s) Pierre Crabbe Et Al

It is certified that error appears in the above-identified patent and that said Letters Patent are hereby corrected as shown below:

Column 1, line 38, "Bergstrom" should read --- Bergström ---.
Column 6, line 12, "aromatic," should read --- aromatic), ---.
Column 9, line 53, "compund" should read --- compound ---.
Column 16, line 17, "30°" should read --- 30°C. ---.  Column 16, line 42, "22° and 25°" should read --- 22°C. and 25°C. ---.
Column 17, line 54, "25°" should read --- 25°C. ---.  Column 21, line 33, "$R^9$'and $R^9$" should read --- $R^9$ and $R^9$'---.  Column 26, line 49, "20°" should read --- 20°C. ---.  Column 26, line 53, "-20°" should read --- 20°C. ---.  Column 26, line 66, "bocarbonate" should read --- bicarbonate ---.  Column 28, line 23, "(3:2the" should read --- (3:2). The ---.  Column 29, line 48, "5°" should read --- 5°C. ---.  Column 31, lines 12 and 13, "1-'R" should read --- 1'R- ---.  Column 31, lines 48 and 49, "1-'R" should read --- 1'$\overline{R}$- ---.  Column 31, line 56, "32" should read --- = ---.  Column 3$\overline{3}$, line 22, "formycyclopent" should read --- formylcyclopent ---.  Column 33, line 33, "1:R" should read --- 1'R ---.  Column 35, line 66, "1'R.40' " should read --- 1'$\underline{R}$-4' ---.  Column 36, line 19, "5'β(" should read --- 5'β-( ---.  Column 37, line 16, "1' " should read --- 1" ---.  Column 37, line 29, " 1" " should read --- -1" ---.  Column 37, line 37, "1,2-" should read --- 1,2'- ---.  Column 37, line 60, "2'α" should read --- [2'α ---.  Column 37, line 63, "2'α" should read --- [2'α ---.  Column 37, line 63, "5'α" should read --- 5'β---.  Column 38, line 10, " 5 - " should read --- 5'β.  Column 38, line 21, " 1,2- " should read 1,2'- ---.  Column 38, line 38, "tetrahydropyranyloxytridec" should read --- tetrahydropyranyloxydec ---.  Column 40, line 27, "8R1" should read --- 8$\underline{R}$-1 ---. Column 40, line 54, "6 , " should read --- 6$\xi$, ---.  Column 41, line 15, "13trans" should read --- 13-trans ---.  Column 41, line 21, " 6 , " should read --- 6$\xi$, ---.  Column 41, line 23, "EXAMPLES 2A" should read --- EXAMPLE 2-A. ---.  Column 41, line 32, "6 , " should read --- 6$\xi$, ---.  Column 41, line 38, "1A"

UNITED STATES PATENT OFFICE
CERTIFICATE OF CORRECTION

Patent No. 3,879,438                Dated  April 22, 1975

Inventor(s)  Pierre Crabbe Et Al

It is certified that error appears in the above-identified patent and that said Letters Patent are hereby corrected as shown below:

should read --- 1-A ---. Column 41, line 65, delete "-transene,". Column 42, lines 2 and 3, "1,-6 " should read ---1,6 --- Column 42, line 4, "13-Trans" should read --- 13-trans ---. Column 42, line 9, "4-ny" should read --- 4-yn ---. Column 42, line 28, "3A" should read --- 3-A ---. Column 43, line 13, "$R^1$" should read --- $R^{1'}$ ---. Column 43, line 14, "remianing" should read --- remaining ---. Column 43, line 28, "4A" should read --- 4-A ---. Column 44, line 34, "5A" should read --- 5-A ---. Column 44, line 49, "norporsta" should read --- norprosta ---. Column 44, line 61, "norporsta" should read --- norprosta ---. Column 45, line 38, "$R^1$" should read $R^{1''}$ ---. Column 45, line 48, "$R^1$ " should read --- $R^{1''}$ ---. Column 46, line 53, " 6 ," should read --- $6\xi$, ---. Column 47, line 45, "7A" should read --- 7-A ---. Column 51, line 13, "5'α" should read --- 5'β ---. Column 51, line 16, "15' " should read --- 15α ---. Column 51, line 23, "5'α" should read --- 5'β ---. Column 51, line 30, "8R1" should read --- 8R-1 --- and "6 ," should read --- $6\xi$, ---. Column 51, line 36, "8R1" should read --- 8R-1 ---. Column 51, line 52, "tal4, " should read ta-4 ---. Column 56, line 6, "6 -" should read --- $6\xi$- ---. Column 56, line 30, "960 - " should read --- 9α- ---. Column 56, line 61, "6 -" should read --- $6\xi$- ---. Column 57, line 34, "20-1norprosst" should read --- 20-norprost ---. Column 58, lines 27 and 28, "1,6$\xi$-methyl-1,6$\xi$          ,9α" should read --- 1,6$\xi$,9α ---. Column 58, line 37, "11    60" should read --- 11α ---. Column 59, lines 1 thru 4, "-bistetrahydropyranyloxyprosta-R-6-propyl-1,9α-diacetoxy-11α,15α-distetkrahydropyranylooxy-prosta-4,5,13-trans-triene," should read --- 8R-6-propyl-1,9α-diacetoxy-11α,15α-bistetrahydropyranyloxyprosta-4,5,13-trans-triene, ---. Column 65, line 44, "0-keto" should read --- 9-keto ---. Column 70, lines 26 and 27, "$R^5$ = H; $R^{1''}$ = hydroxy; $R^{4'}$ = hydroxy; $R^4$ inch = methyl, n =4). should read --- $R^5$ = H;

UNITED STATES PATENT OFFICE
CERTIFICATE OF CORRECTION

Patent No. 3,879,438          Dated   April 22, 1975

Inventor(s)   Pierre Crabbe Et Al

It is certified that error appears in the above-identified patent and that said Letters Patent are hereby corrected as shown below:

$R^{1''}$ = hydroxy; $R^{4'}$ = methyl, n = 4). ---. Column 70, line 51, "15α-hydroxy" should read --- 15α-dihydroxy ---. Column 71, line 13, "90α," should read --- 9α, ---. Column 79, line 45, "15 -hydroxy-15 -" should read --- 15ξ-hydroxy-15ξ- ---. Column 79, line 46, "15α" should read --- 15β ---. Column 83, lines 42 and 43, "1-5α" should read --- 15α- ---. Column 89, Claim 1, line 61, "( )" should read --- (ξ) ---. Column 96, Claim 80, line 5, "1562" should read --- 15β ---.

*Signed and Sealed this*

*thirtieth* Day of *March 1976*

[SEAL]

*Attest:*

RUTH C. MASON
*Attesting Officer*

C. MARSHALL DANN
*Commissioner of Patents and Trademarks*